(12) United States Patent
Yoshitomi et al.

(10) Patent No.: US 10,558,092 B2
(45) Date of Patent: Feb. 11, 2020

(54) DISPLAY DEVICE, MODULE, AND ELECTRONIC DEVICE

(71) Applicant: Semiconductor Energy Laboratory Co., Ltd., Atsugi-shi, Kanagawa-ken (JP)

(72) Inventors: Shuhei Yoshitomi, Kanagawa (JP); Daisuke Kubota, Kanagawa (JP); Koji Kusunoki, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 224 days.

(21) Appl. No.: 15/455,244

(22) Filed: Mar. 10, 2017

(65) Prior Publication Data

US 2017/0269440 A1 Sep. 21, 2017

(30) Foreign Application Priority Data

Mar. 15, 2016 (JP) ................................ 2016-050824
May 20, 2016 (JP) ................................ 2016-101543

(51) Int. Cl.
*G02F 1/1343* (2006.01)
*G02F 1/1368* (2006.01)
(Continued)

(52) U.S. Cl.
CPC ...... *G02F 1/134309* (2013.01); *G02F 1/1368* (2013.01); *G06F 1/3265* (2013.01);
(Continued)

(58) Field of Classification Search
None
See application file for complete search history.

(56) References Cited

U.S. PATENT DOCUMENTS 5,136,407 A * 8/1992 Clerc ................ G02F 1/134336
349/130
6,421,036 B1 * 7/2002 Watanabe ......... G02F 1/134363
345/87
(Continued)

FOREIGN PATENT DOCUMENTS

JP 2007-096055 A 4/2007
JP 2007-123861 A 5/2007
(Continued)

OTHER PUBLICATIONS

JPO English machine translation of JP2015052758A (Year: 2015).*
(Continued)

*Primary Examiner* — Edward J Glick
*Assistant Examiner* — David Y Chung
(74) *Attorney, Agent, or Firm* — Fish & Richardson P.C.

(57) ABSTRACT

A high-definition liquid crystal display device is provided. A liquid crystal display device with a high aperture ratio is provided. A liquid crystal display device with a high contrast ratio and display quality is provided. A liquid crystal display device capable of being driven at a low voltage is provided. The display device includes, between a pair of substrates, a pixel electrode, a first common electrode, a second common electrode, and a liquid crystal layer. The pixel electrode and the first common electrode are positioned between the liquid crystal layer and one of the substrates. The second common electrode is positioned between the liquid crystal layer and the other substrate. The same potential is supplied to the first common electrode and the second common electrode. The first common electrode includes a portion overlapping with the second common electrode between the display regions of two adjacent subpixels that exhibit different colors. At least one of the pixel electrode and the first common electrode (Continued)

includes a portion that does not overlap with the second common electrode in the display region of the subpixel.

16 Claims, 47 Drawing Sheets

(51) Int. Cl.
*G06F 1/3234* (2019.01)
*G02F 1/1362* (2006.01)

(52) U.S. Cl.
CPC .......... *G02F 1/136286* (2013.01); *G02F 2001/134345* (2013.01); *G02F 2201/121* (2013.01); *G02F 2201/123* (2013.01)

(56) References Cited

U.S. PATENT DOCUMENTS

| | | | |
|---|---|---|---|
| 7,674,650 B2 | 3/2010 | Akimoto et al. | |
| 7,732,819 B2 | 6/2010 | Akimoto et al. | |
| 7,910,490 B2 | 3/2011 | Akimoto et al. | |
| 7,932,521 B2 | 4/2011 | Akimoto et al. | |
| 7,995,181 B2 | 8/2011 | Choi et al. | |
| 8,164,697 B2 | 4/2012 | Iwamoto et al. | |
| 8,274,077 B2 | 9/2012 | Akimoto et al. | |
| 8,466,463 B2 | 6/2013 | Akimoto et al. | |
| 8,482,005 B2 | 7/2013 | Yamazaki et al. | |
| 8,629,069 B2 | 1/2014 | Akimoto et al. | |
| 8,669,550 B2 | 3/2014 | Akimoto et al. | |
| 8,790,959 B2 | 7/2014 | Akimoto et al. | |
| 8,796,069 B2 | 8/2014 | Akimoto et al. | |
| 9,099,562 B2 | 8/2015 | Akimoto et al. | |
| 2005/0260359 A1 | 11/2005 | Kunimatsu et al. | |
| 2006/0113536 A1 | 6/2006 | Kumomi et al. | |
| 2006/0146243 A1* | 7/2006 | Nakanishi | G02F 1/133707 349/139 |
| 2007/0225096 A1* | 9/2007 | Fujita | G02F 1/134363 474/202 |
| 2007/0279359 A1 | 12/2007 | Yoshida et al. | |
| 2008/0308805 A1 | 12/2008 | Akimoto et al. | |
| 2010/0182273 A1 | 7/2010 | Noguchi et al. | |
| 2011/0051064 A1 | 3/2011 | Matsumori et al. | |
| 2011/0090416 A1 | 4/2011 | Arasawa et al. | |
| 2011/0115997 A1 | 5/2011 | Kim | |
| 2011/0121290 A1 | 5/2011 | Akimoto et al. | |
| 2011/0134345 A1 | 6/2011 | Yamazaki et al. | |
| 2012/0075238 A1 | 3/2012 | Minami et al. | |
| 2013/0077038 A1 | 3/2013 | Rho et al. | |
| 2014/0016056 A1 | 1/2014 | Miyake et al. | |
| 2014/0104507 A1 | 4/2014 | Yamazaki et al. | |
| 2014/0104508 A1 | 4/2014 | Yamazaki et al. | |
| 2014/0104524 A1 | 4/2014 | Lee et al. | |
| 2014/0111561 A1 | 4/2014 | Iyama et al. | |
| 2014/0118639 A1* | 5/2014 | Matsushima | G02F 1/13338 349/12 |
| 2014/0347588 A1 | 11/2014 | Hatsumi et al. | |
| 2015/0185578 A1* | 7/2015 | Hirosawa | G02F 1/133707 349/43 |
| 2015/0340513 A1 | 11/2015 | Akimoto et al. | |
| 2016/0178971 A1* | 6/2016 | Xiong | G02F 1/134309 349/38 |
| 2017/0115525 A1* | 4/2017 | Okita | G02F 1/133345 |

FOREIGN PATENT DOCUMENTS

| | | |
|---|---|---|
| JP | 2007-248999 A | 9/2007 |
| JP | 2014-102499 A | 6/2014 |
| JP | 2015-043070 A | 3/2015 |
| JP | 2015-052758 A | 3/2015 |
| JP | 2015-125224 A | 7/2015 |

OTHER PUBLICATIONS

International Search Report (Application No. PCT/IB2017/051278) dated May 30, 2017.
Written Opinion (Application No. PCT/IB2017/051278) dated May 30, 2017.
Hatsumi.R et al., "Driving Method of FFS-Mode OS-LCD for Reducing Eye Strain", SID Digest '13 : SID International Symposium Digest of Technical Papers, May 21, 2013, pp. 338-341.

* cited by examiner

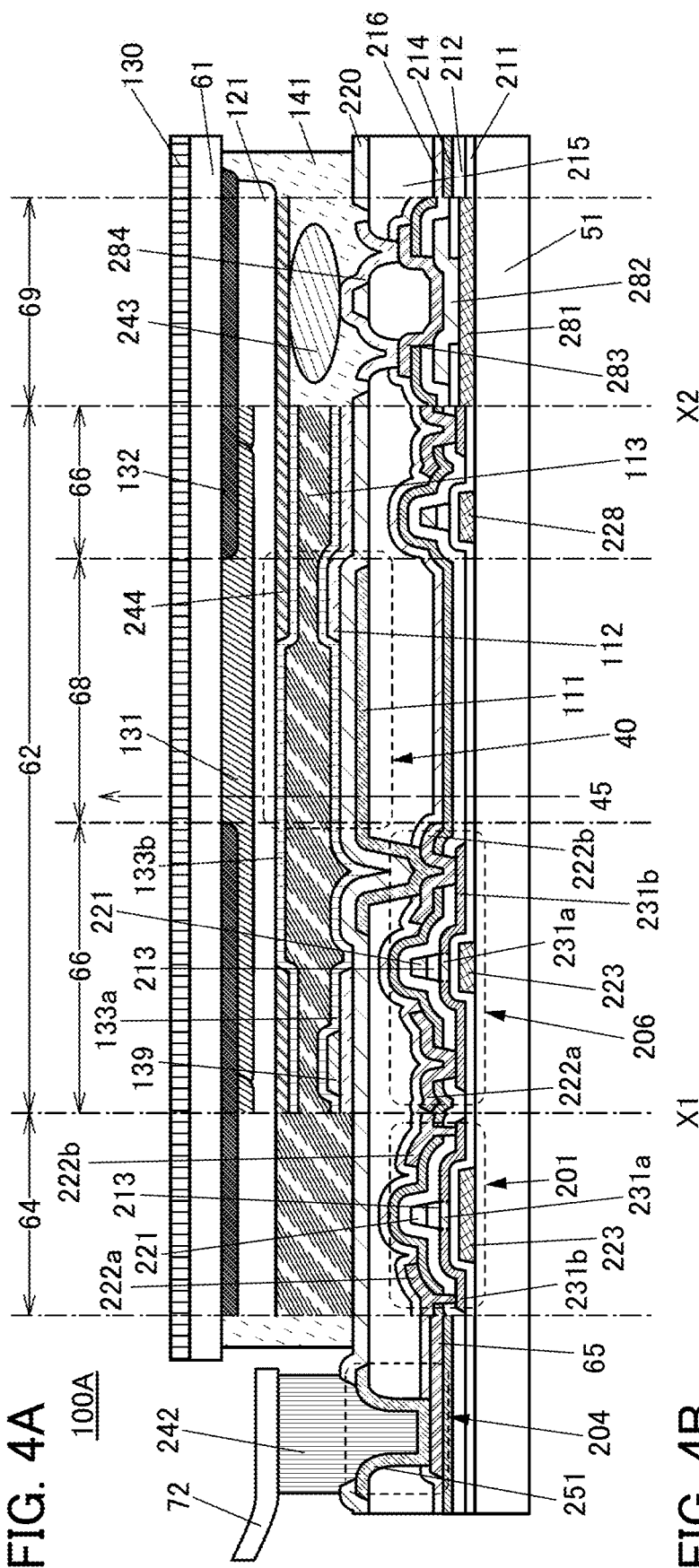
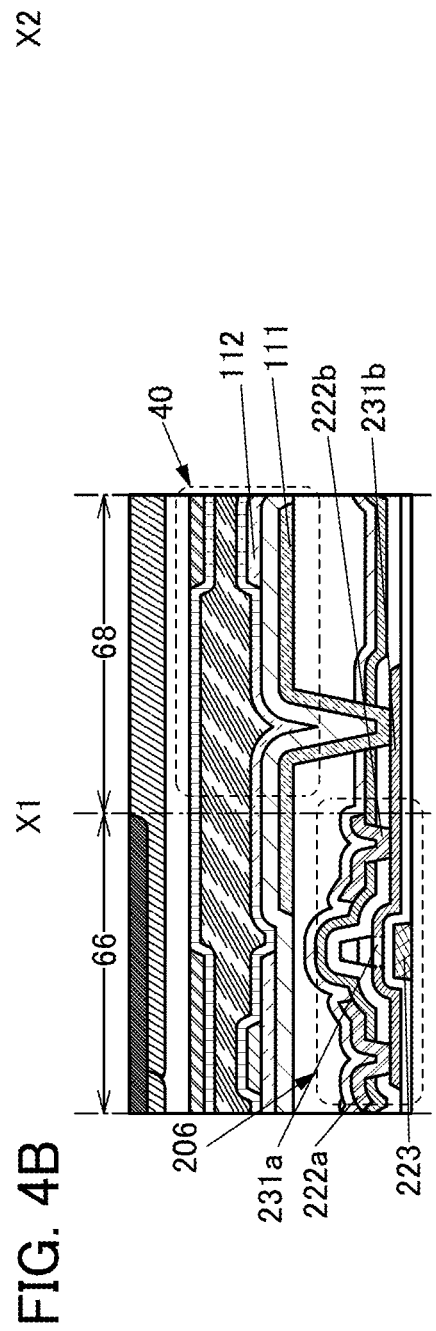
FIG. 4A
FIG. 4B

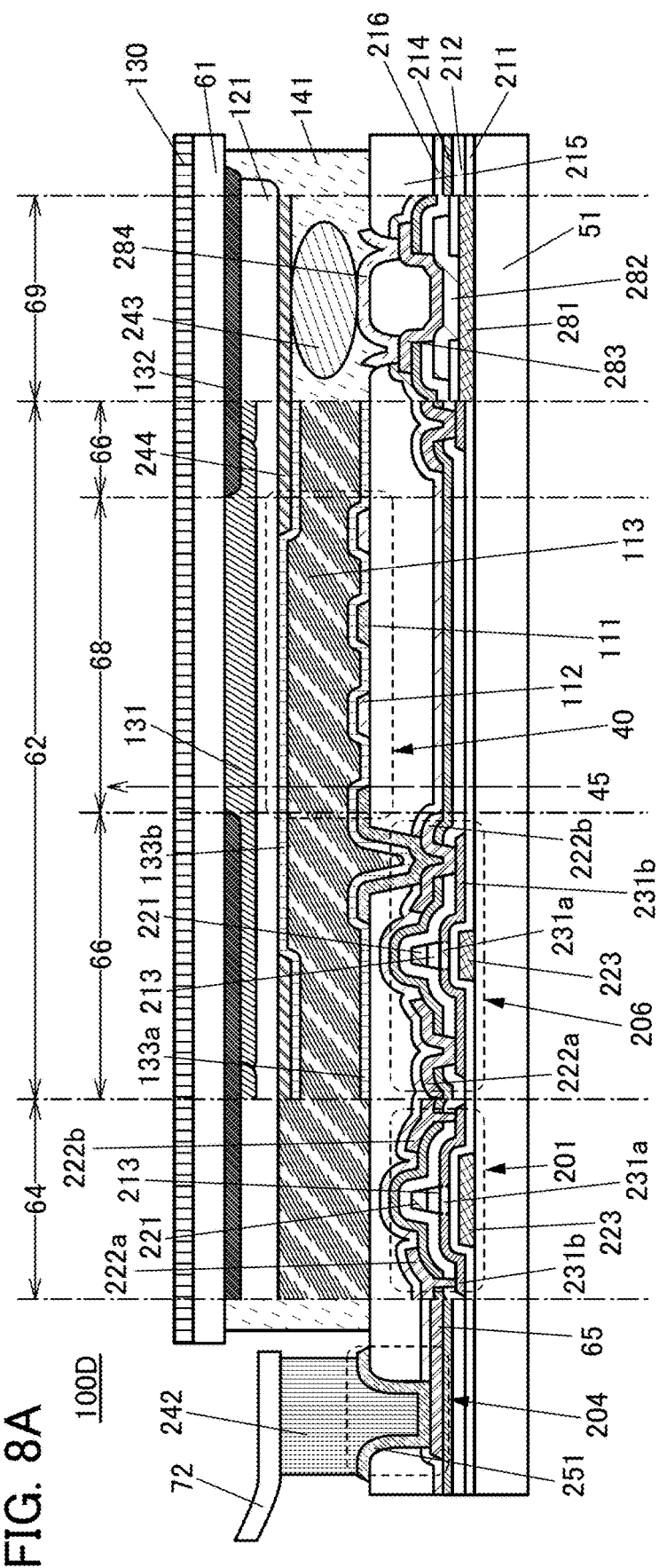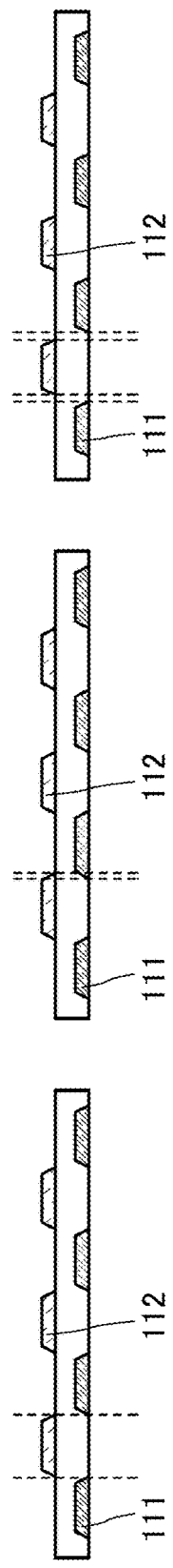

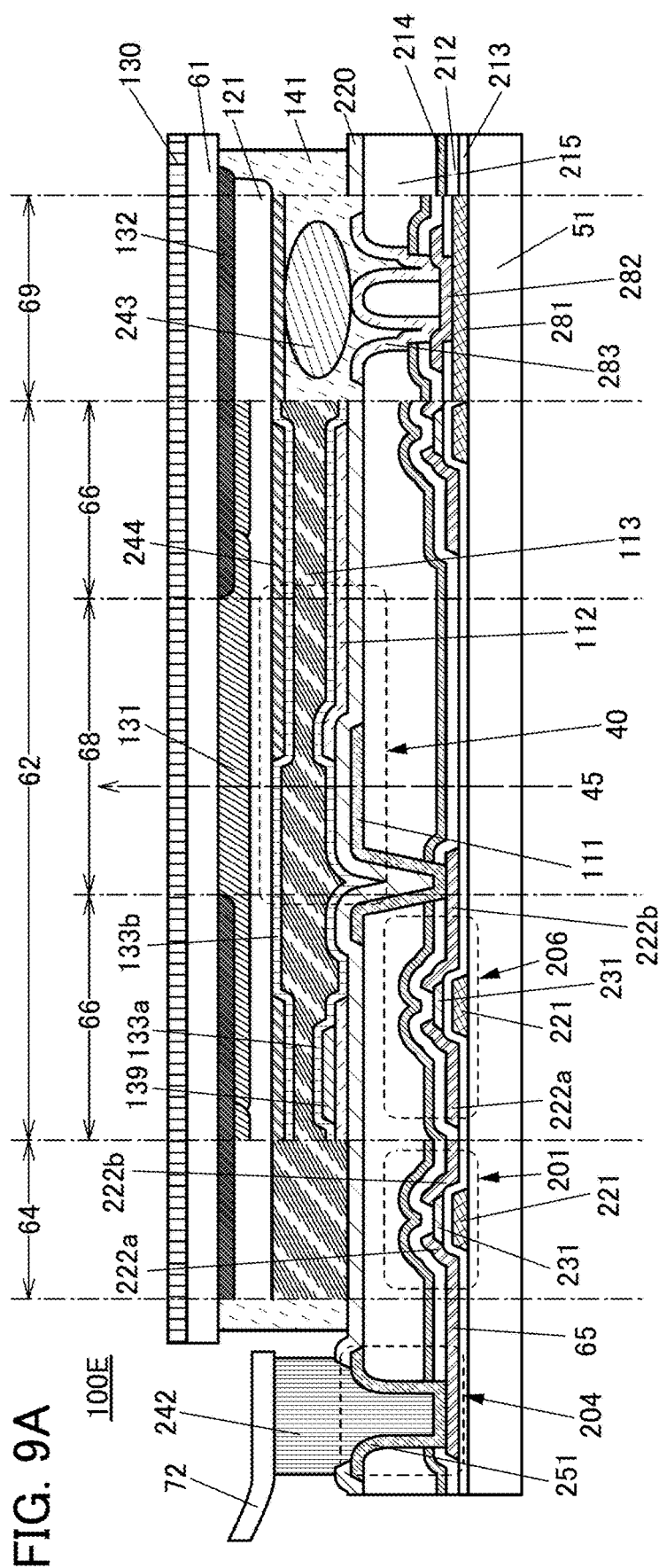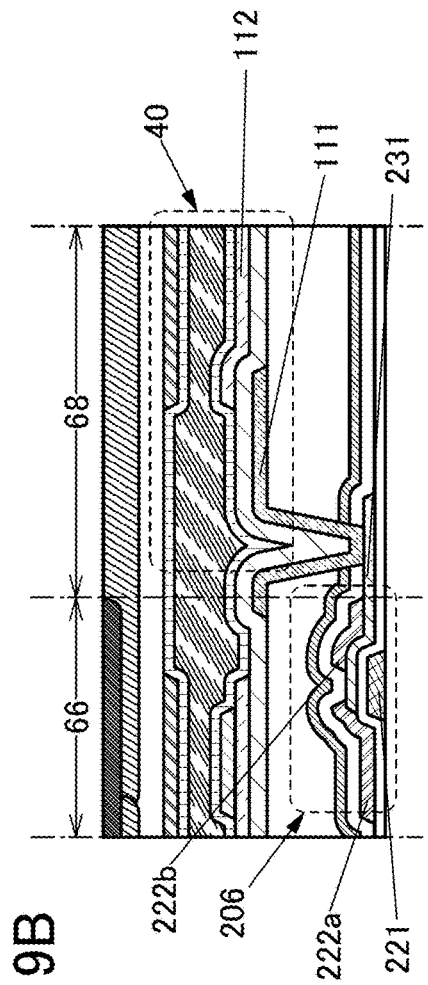

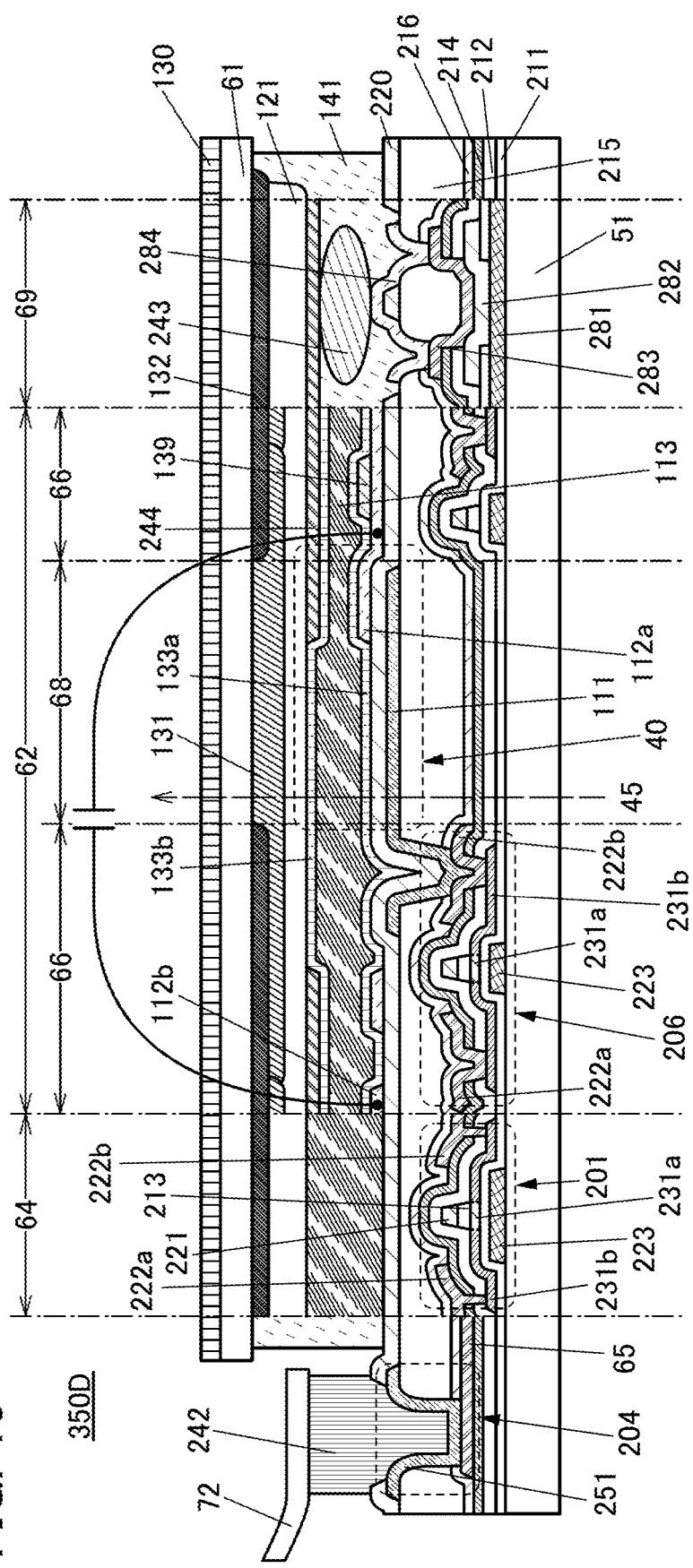

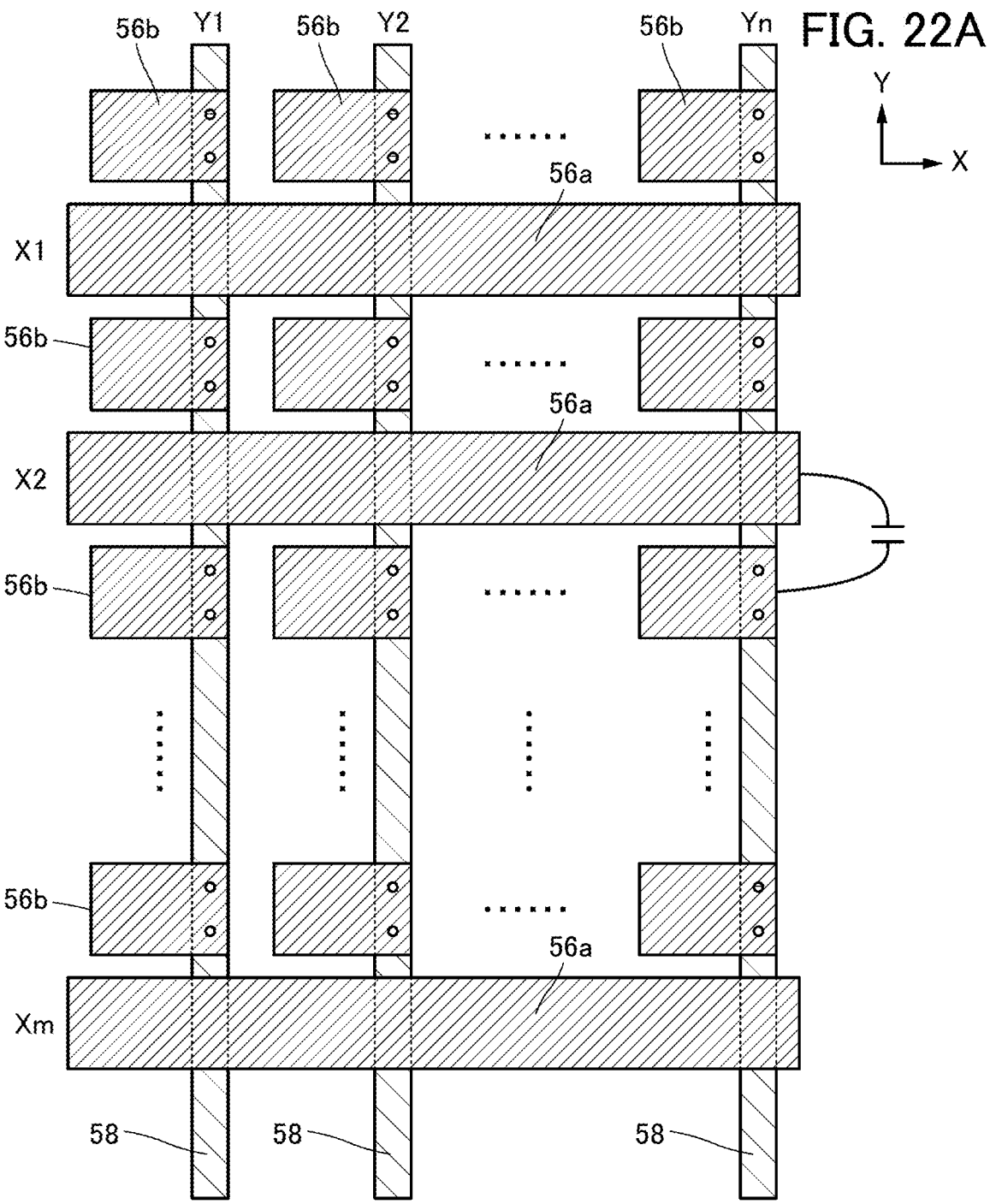
FIG. 22A
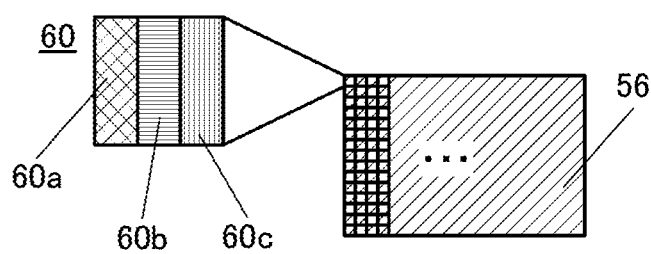
FIG. 22B
FIG. 22C

FIG. 25A1
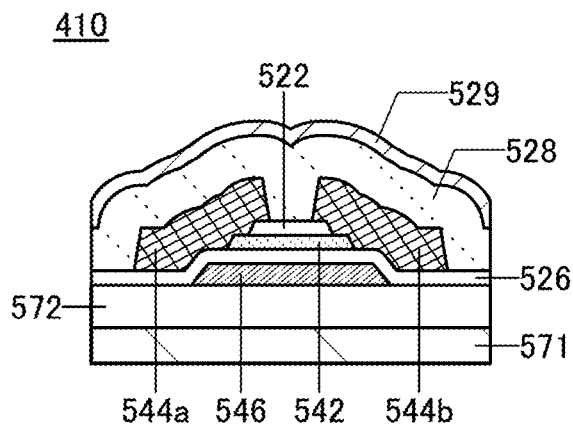
FIG. 25A2
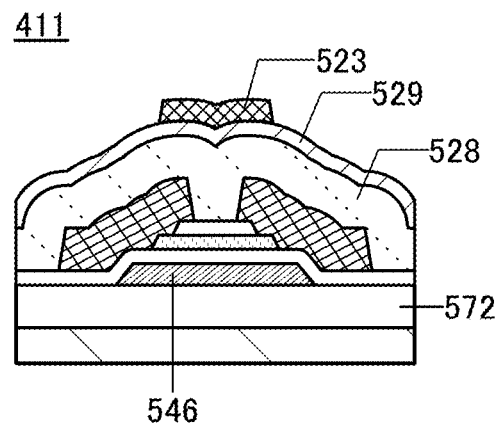
FIG. 25B1
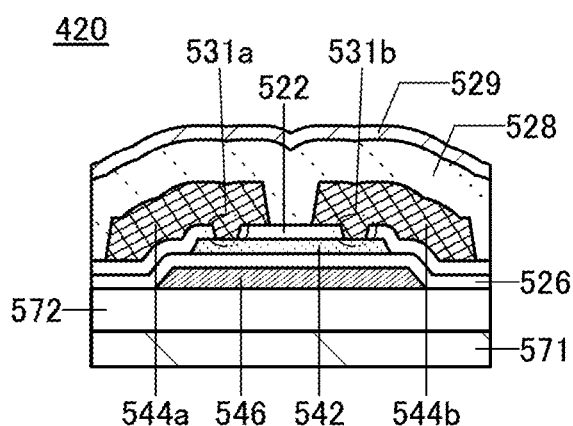
FIG. 25B2
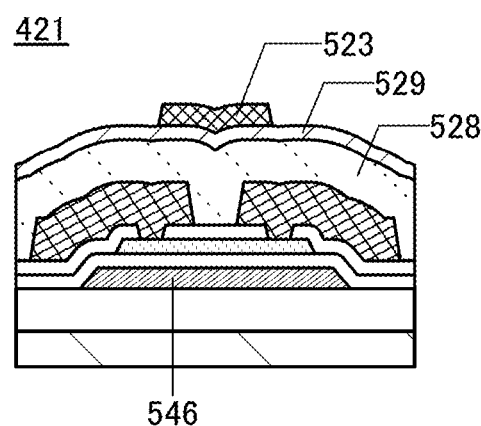
FIG. 25C1
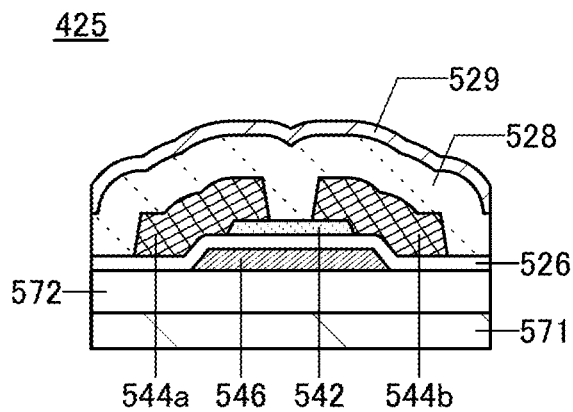
FIG. 25C2
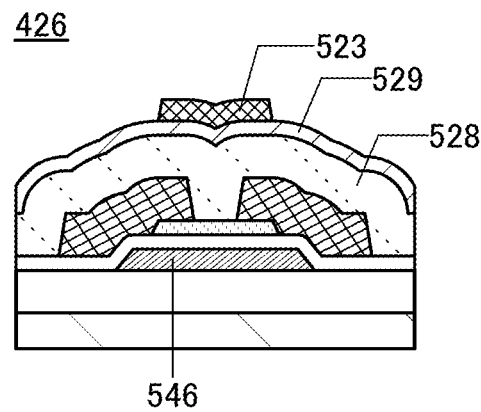

FIG. 26A1
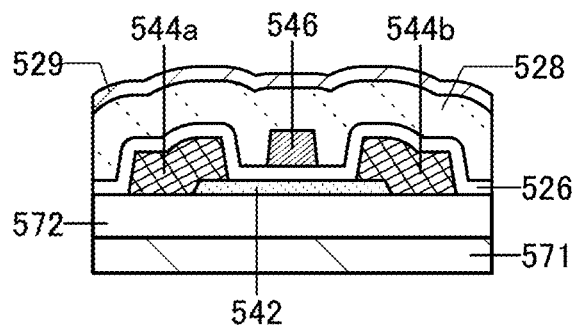
FIG. 26A2
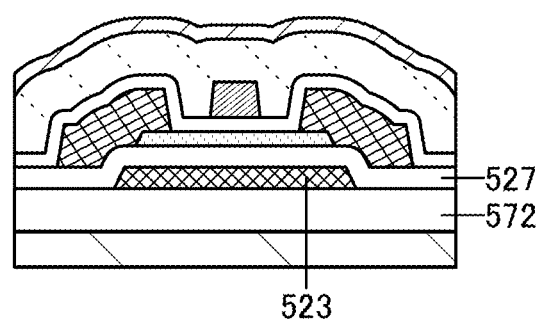
FIG. 26A3
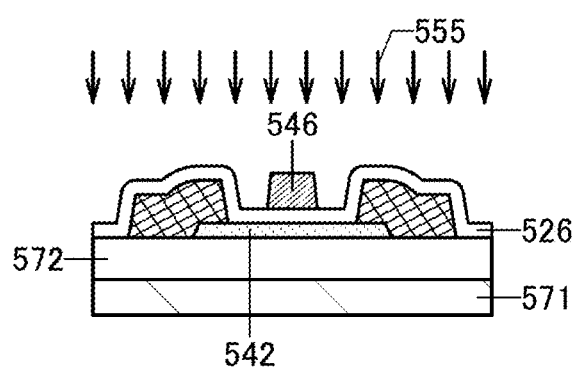
FIG. 26B1
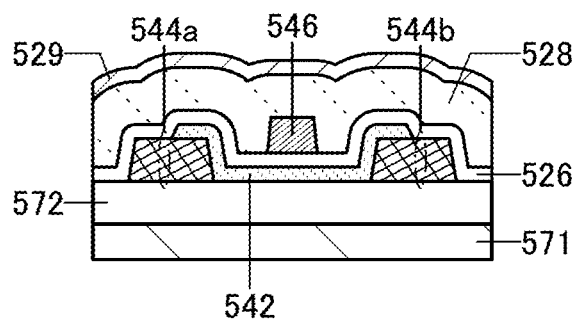
FIG. 26B2
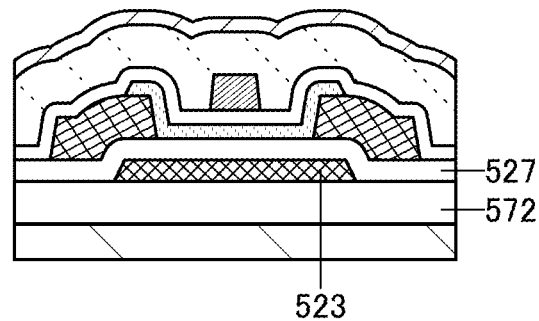

FIG. 27A1
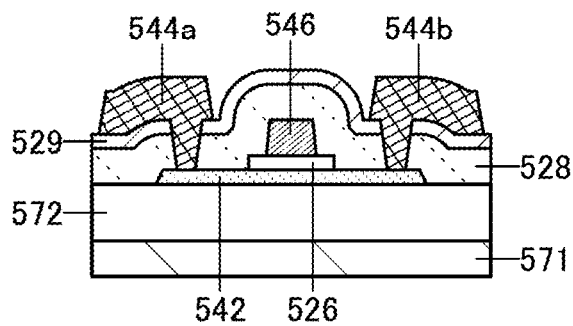
FIG. 27A2
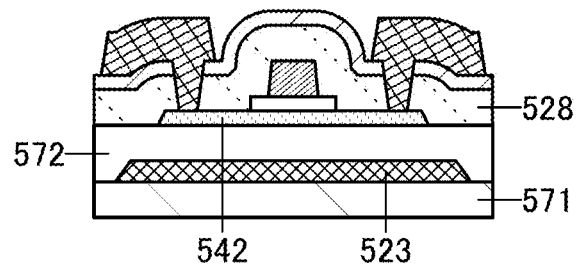
FIG. 27A3
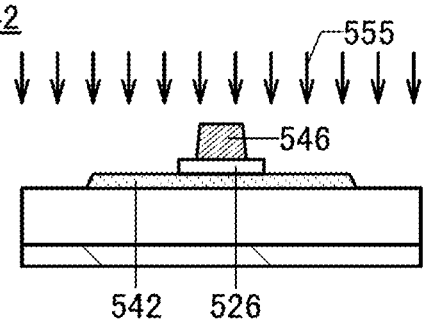
FIG. 27B1
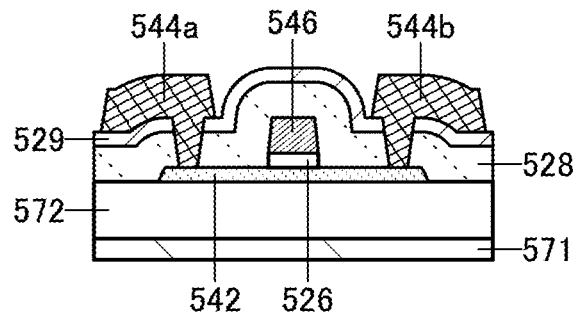
FIG. 27B2
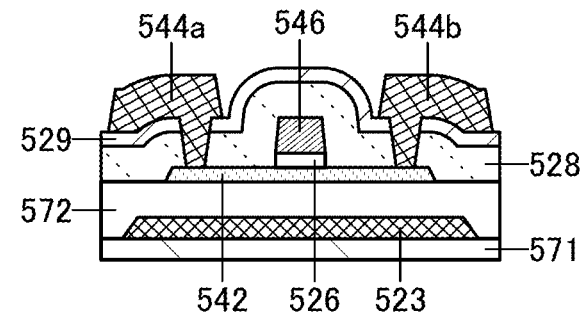
FIG. 27C1
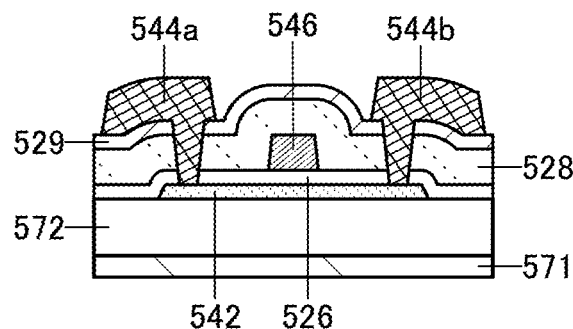
FIG. 27C2
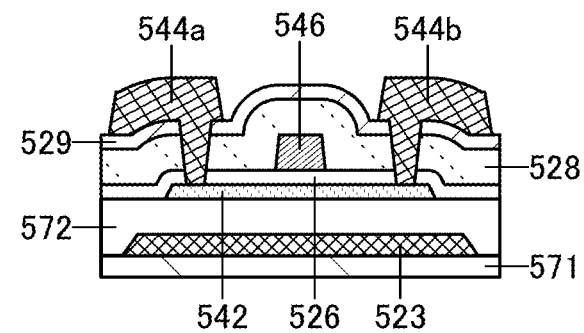

FIG. 28A
FIG. 28B
FIG. 28C
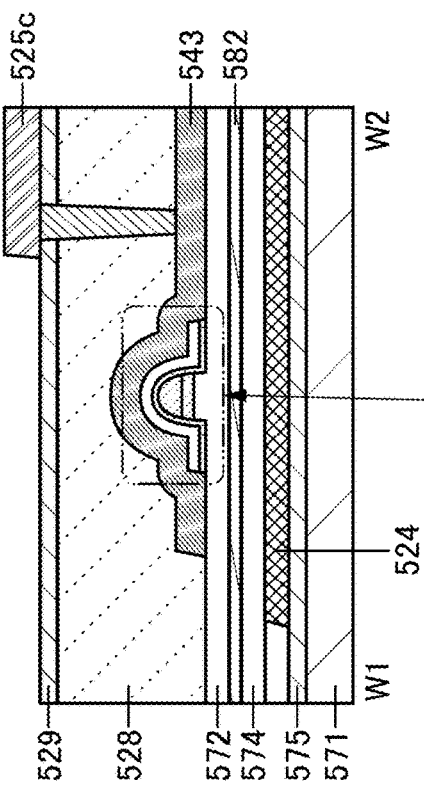
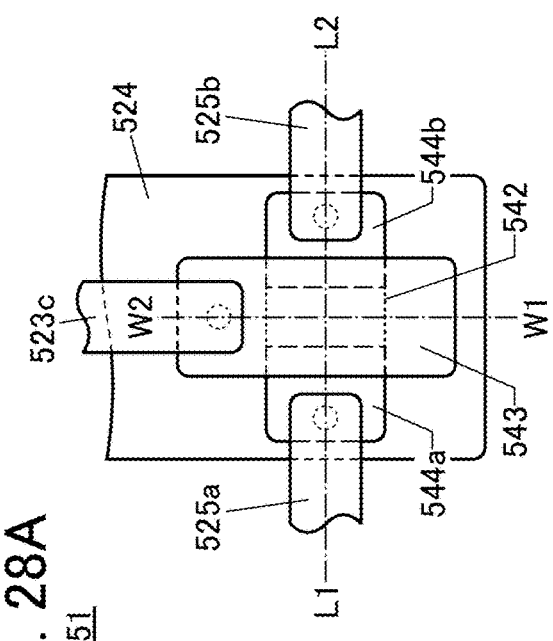
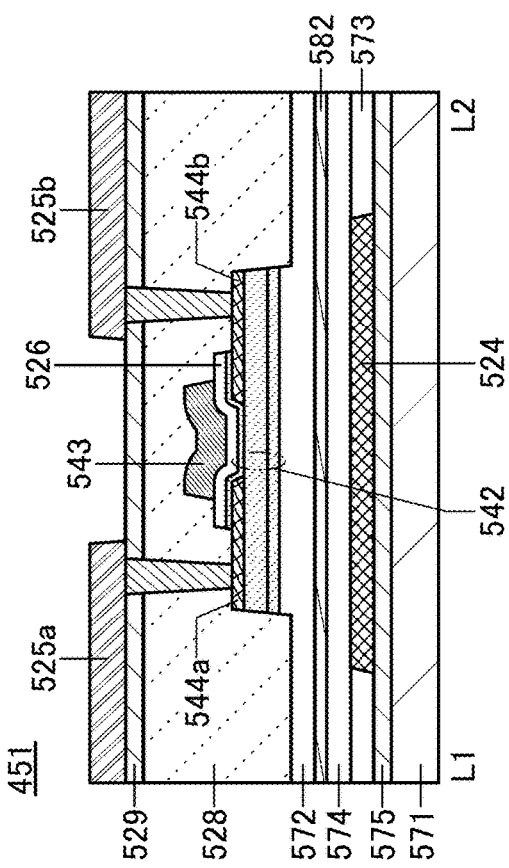

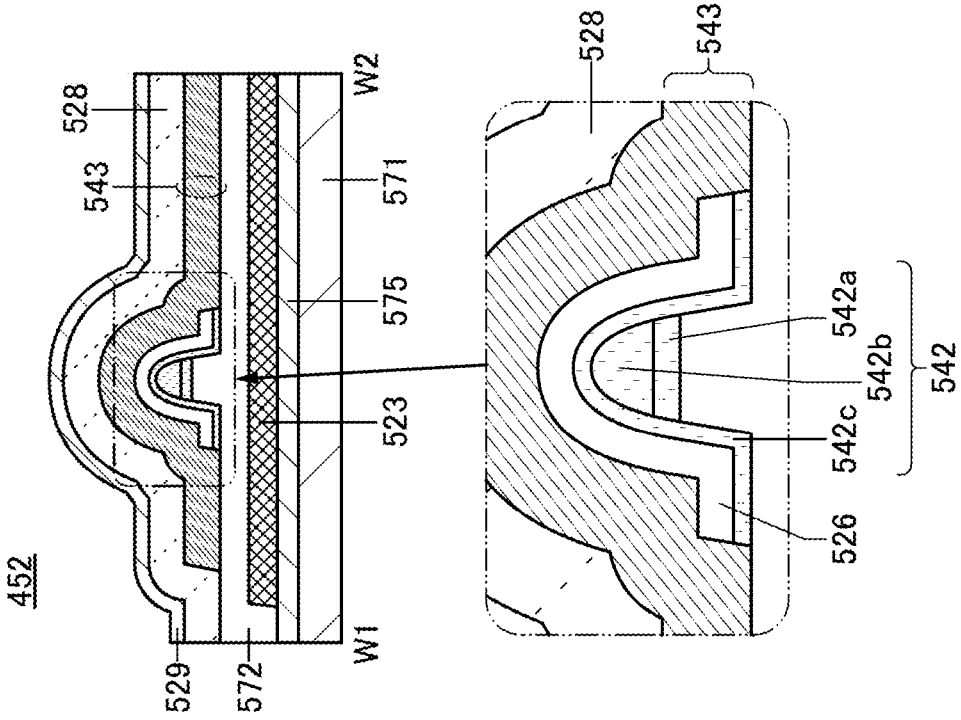
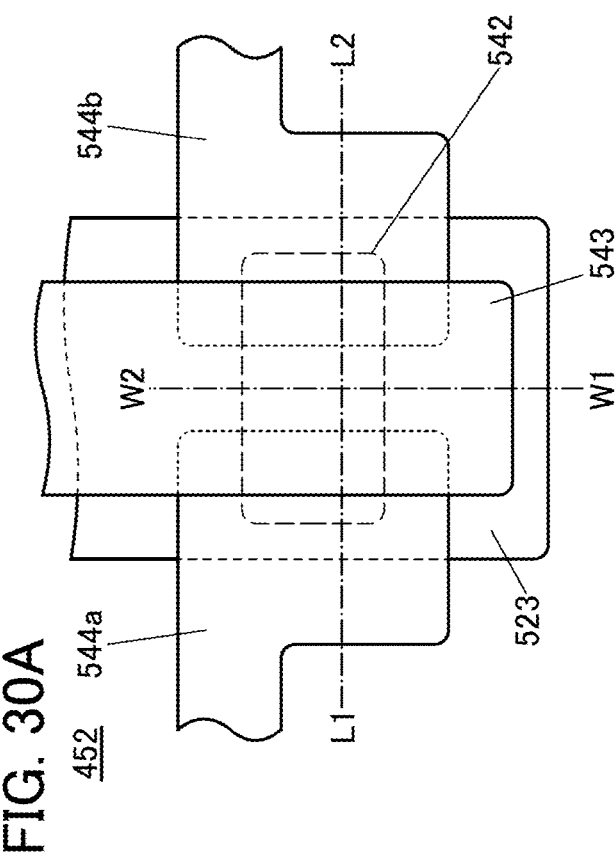
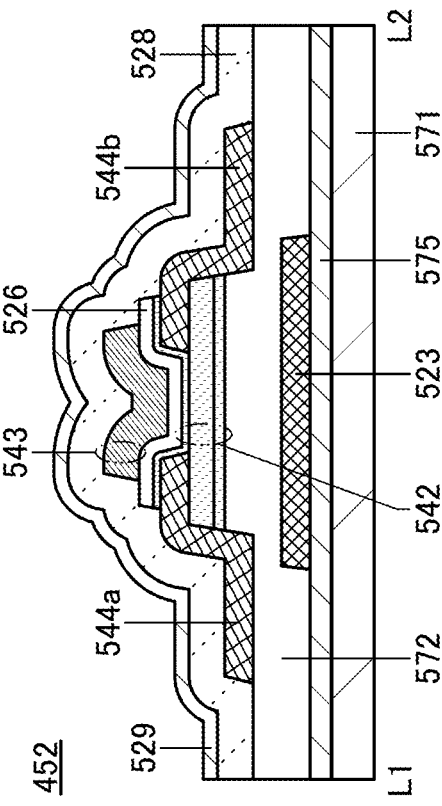
FIG. 30A
FIG. 30B
FIG. 30C

454

454

454

454a

454a

454a

448

448

448

FIG. 39A
FIG. 39B
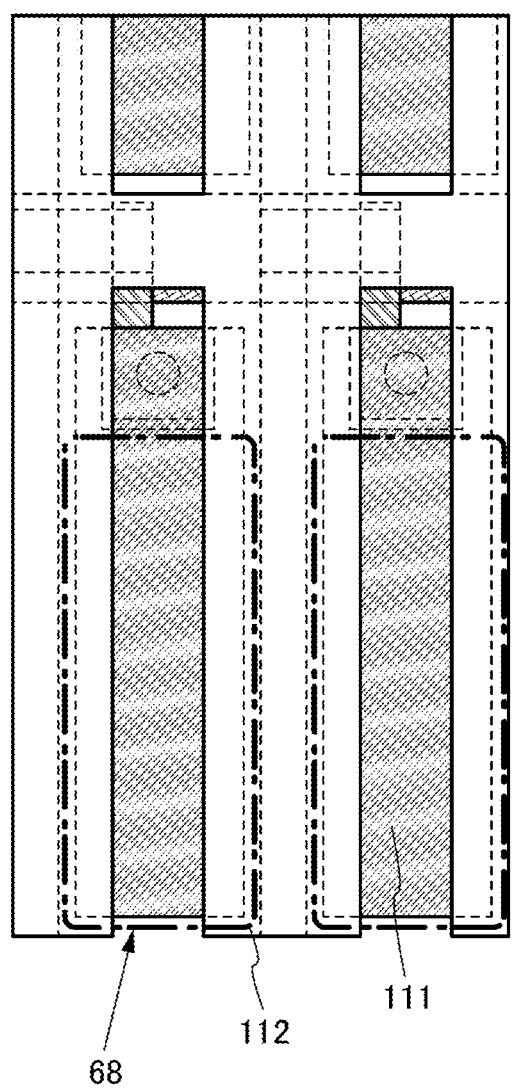
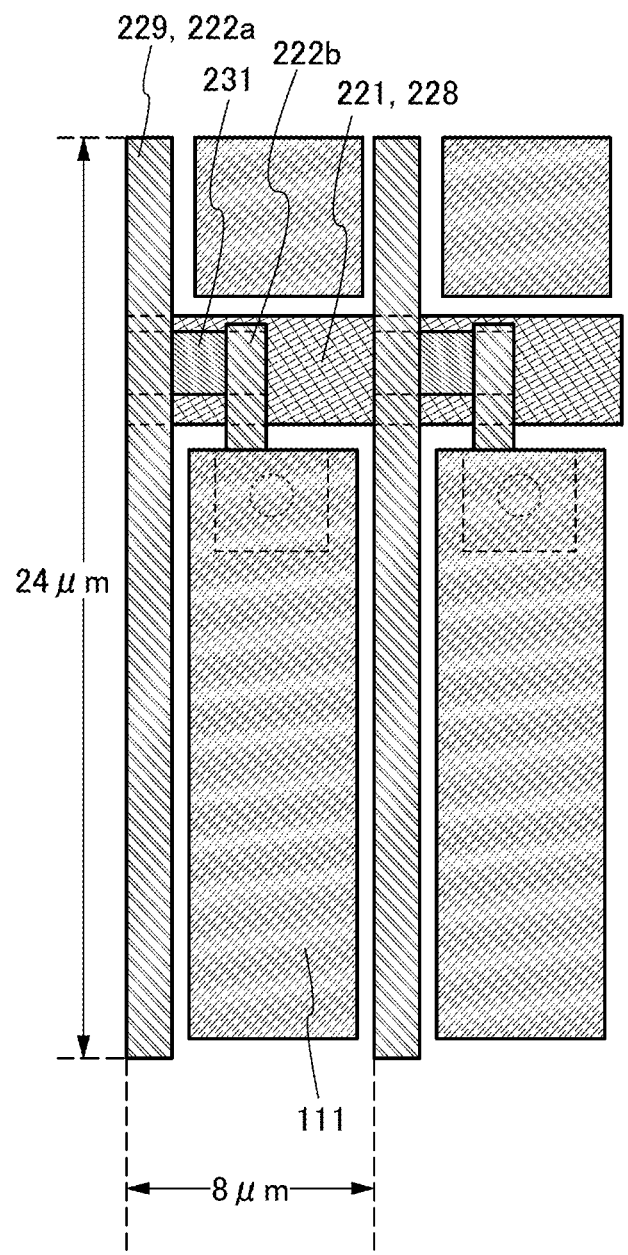

G B R

G

DISPLAY DEVICE, MODULE, AND ELECTRONIC DEVICE

TECHNICAL FIELD

One embodiment of the present invention relates to a liquid crystal display device, a module, and an electronic device.

Note that one embodiment of the present invention is not limited to the above technical field. Examples of the technical field of one embodiment of the present invention include a semiconductor device, a display device, a light-emitting device, a power storage device, a memory device, an electronic device, a lighting device, an input device (such as a touch sensor), an input/output device (such as a touch panel), a method for driving any of them, and a method for manufacturing any of them.

BACKGROUND ART

Transistors used for most flat panel displays typified by liquid crystal display devices and light-emitting display devices are formed using silicon semiconductors such as amorphous silicon, single-crystal silicon, and polycrystalline silicon provided over glass substrates. The transistors using such a silicon semiconductor are utilized for integrated circuits (ICs) and the like.

In recent years, techniques in which a metal oxide that exhibits semiconductor characteristics is used instead of a silicon semiconductor in a transistor have attracted attention. Note that in this specification, a metal oxide that exhibits semiconductor characteristics is referred to as an oxide semiconductor. For example, Patent Documents 1 and 2 disclose techniques for the fabrication of a transistor using zinc oxide or an In—Ga—Zn-based oxide as an oxide semiconductor and the use of the transistor as a switching element or the like in a pixel of a display device.

REFERENCE

Patent Document

[Patent Document 1] Japanese Published Patent Application No. 2007-123861

[Patent Document 2] Japanese Published Patent Application No. 2007-096055

DISCLOSURE OF INVENTION

An object of one embodiment of the present invention is to provide a high-definition liquid crystal display device. Another object of one embodiment of the present invention is to provide a liquid crystal display device with a high aperture ratio. Another object of one embodiment of the present invention is to provide a liquid crystal display device with a high contrast ratio and display quality. Another object of one embodiment of the present invention is to provide a liquid crystal display device capable of being driven at a low voltage. Another object of one embodiment of the present invention is to provide a liquid crystal display device with low power consumption. Another object of one embodiment of the present invention is to provide a highly reliable liquid crystal display device. Another object of one embodiment of the present invention is to provide a novel liquid crystal display device.

Note that the description of these objects does not exclude the existence of other objects. In one embodiment of the present invention, there is no need to achieve all the objects. Other objects can be derived from the description of the specification, the drawings, the claims, and the like.

A display device of one embodiment of the present invention includes, between a pair of substrates, a pixel electrode, a first common electrode, a second common electrode, and a liquid crystal layer. The pixel electrode and the first common electrode are positioned between the liquid crystal layer and one of the substrates. The second common electrode is positioned between the liquid crystal layer and the other substrate. The same potential is supplied to the first common electrode and the second common electrode. The first common electrode includes a portion overlapping with the second common electrode between the display regions of two adjacent subpixels that exhibit different colors. At least one of the pixel electrode and the first common electrode includes a portion that does not overlap with the second common electrode in the display region of the subpixel.

The second common electrode preferably includes an opening in the display region of a subpixel. When the thickness of the liquid crystal layer is denoted by d, the width of the opening is preferably greater than or equal to d/6 and narrower than the width of the subpixel. When the thickness of the liquid crystal layer is denoted by d, the distance between the openings is preferably greater than or equal to d and less than or equal to 2.5d. The thickness d of the liquid crystal layer is preferably greater than or equal to 1 μm and less than or equal to 3 μm.

The first common electrode may be electrically connected to the second common electrode. Alternatively, a potential may be independently supplied to the first common electrode and the second common electrode. For example, the first common electrode and the second common electrode may be electrically connected to different power source lines.

A liquid crystal included in the liquid crystal layer preferably has a negative dielectric anisotropy.

The display device preferably includes a transistor that includes an oxide semiconductor in its channel formation region. The transistor is electrically connected to the pixel electrode. The semiconductor layer of the transistor preferably includes, for example, indium, zinc, and one of aluminum, gallium, yttrium, and tin.

Preferably, the display device includes a scan line and a signal line, the direction in which the scan line extends intersects with the direction in which the signal line extends, and a plurality of subpixels exhibiting the same color are aligned in a direction intersecting with the direction in which the signal line extends.

One embodiment of the present invention is a module that includes the display device according to any of the above, where a connector such as a flexible printed circuit (FPC) board or a tape carrier package (TCP) is connected or an IC is implemented with a method such as a chip on glass (COG) method or a chip on film (COF) method.

In one embodiment of the present invention, the above structures may be applied to an input/output device (e.g., a touch panel) instead of the display device.

One embodiment of the present invention is an electronic device including the aforementioned module and at least one of an antenna, a battery, a housing, a camera, a speaker, a microphone, and a control button.

According to one embodiment of the present invention, a high-definition liquid crystal display device can be provided. According to another embodiment of the present invention, a liquid crystal display device with a high aperture ratio can be provided. According to another embodiment of the present invention, a liquid crystal display device with a high contrast ratio and display quality can be provided. According to another embodiment of the present invention, a liquid crystal display device capable of being driven at a low voltage can be provided. According to another embodiment of the present invention, a liquid crystal display device with low power consumption can be provided. According to another embodiment of the present invention, a highly reliable liquid crystal display device can be provided. According to another embodiment of the present invention, a novel liquid crystal display device can be provided.

Note that the description of these effects does not exclude the existence of other effects. In one embodiment of the present invention, there is no need to achieve all the effects. Other effects can be derived from the description of the specification, the drawings, the claims, and the like.

BRIEF DESCRIPTION OF DRAWINGS

In the accompanying drawings:

FIGS. 4A and 4B are cross-sectional views illustrating examples of a display device;

FIGS. 8A to 8D are cross-sectional views illustrating examples of a display device;

FIGS. 9A and 9B are cross-sectional views illustrating examples of a display device;

FIG. 19 is a cross-sectional view illustrating an example of a touch panel;

FIGS. 22A to 22C are top views illustrating examples of a sensor element and a pixel;

FIGS. 25A1, 25A2, 25B1, 25B2, 25C1, and 25C2 are cross-sectional views illustrating examples of a transistor;

FIGS. 26A1 to 26A3, 26B1, and 26B2 are cross-sectional views illustrating examples of a transistor;

FIGS. 27A1 to 27A3, 27B1, 27B2, 27C1, and 27C2 are cross-sectional views illustrating examples of a transistor;

FIGS. 28A to 28C are a top view and cross-sectional views illustrating an example of a transistor;

FIGS. 30A to 30C are a top view and cross-sectional views illustrating an example of a transistor;

FIGS. 39A and 39B illustrate pixel layouts in Example 1;

BEST MODE FOR CARRYING OUT THE INVENTION

Figure 1A:
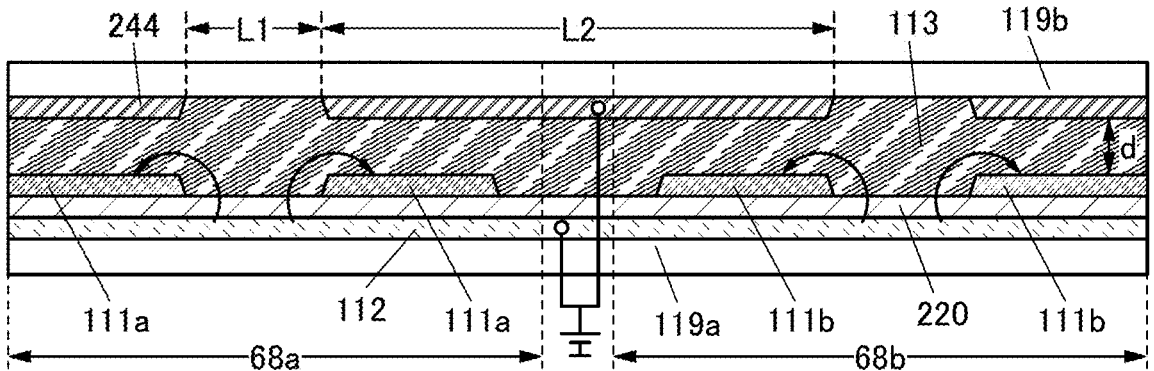
FIGS. 1A to 1D are cross-sectional views illustrating examples of a liquid crystal element.

Embodiments will be described in detail with reference to the drawings. Note that the present invention is not limited to the description below, and it is easily understood by those skilled in the art that modes and details can be modified in various ways without departing from the spirit and scope of the present invention. Therefore, the present invention should not be construed as being limited to the description in the following embodiments.

Note that in the structures of the invention described below, the same portions or portions having similar functions are denoted by the same reference numerals in different drawings, and the description of such portions is not repeated. Furthermore, the same hatching pattern is applied to portions having similar functions, and the portions are not especially denoted by reference numerals in some cases.

The position, size, range, or the like of each structure illustrated in drawings is not accurately represented in some cases for easy understanding. Therefore, the disclosed invention is not necessarily limited to the position, size, range, or the like disclosed in the drawings.

Note that the terms "film" and "layer" can be interchanged with each other depending on the case or circumstances. For example, the term "conductive layer" can be changed into the term "conductive film". Also, the term "insulating film" can be changed into the term "insulating layer".

(Embodiment 1)

In this embodiment, a display device of one embodiment of the present invention will be described with reference to FIGS. 1A to 24C.

The display device of one embodiment of the present invention includes a pixel electrode, a first common electrode, a second common electrode, and a liquid crystal layer. Each of the pixel electrode and the first common electrode faces the second common electrode with the liquid crystal layer therebetween in the thickness direction of the display device. The same potential is supplied to the first common electrode and the second common electrode. The first common electrode includes a portion overlapping with the second common electrode between the display regions of two adjacent subpixels that exhibit different colors. At least one of the pixel electrode and the first common electrode includes a portion that does not overlap with the second common electrode in the display region of the subpixel.

The display device includes a plurality of pixels and has a function of displaying images.

A pixel includes a plurality of subpixels. For example, a subpixel exhibiting a red color, a subpixel exhibiting a green color, and a subpixel exhibiting a blue color form one pixel, and thus full-color display can be achieved in a display portion. Note that the color exhibited by subpixels is not limited to red, green, and blue. For example, a subpixel exhibiting white, yellow, magenta, cyan, or the like may be used for a pixel. Note that in this specification and the like, a subpixel is simply referred to as a pixel in some cases.

Examples of a driving method of a liquid crystal display device include the following: frame inversion driving, where the positive and negative electrodes are inverted (i.e., the polarities of the signals are inverted) frame by frame; gate-line inversion driving, where the positive and negative electrodes are inverted row by row; source-line inversion driving, where the positive and negative electrodes are inverted column by column; and dot-line inversion driving, where the positive and negative electrodes are inverted column by column and row by row. The burn-in of the images can be prevented by inverting the polarities of the signals using these driving methods. The source-line inversion driving is preferably used in terms of power consumption.

An increase in the definition of a liquid crystal display device reduces the width (distance) between pixels and the width (distance) between subpixels. Hence, for example, when the source-line inversion driving is employed for a display device using a liquid crystal element with a horizontal electric field mode, a horizontal electric field is generated between adjacent subpixels, which might cause alignment defects of liquid crystals and light leakage to an adjacent subpixel. The light leakage reduces the display quality of the display device. A decrease in display quality can be reduced when a light-blocking layer or the like covers a portion that is prone to light leakage; however, this might reduce the aperture ratio.

Thus, in one embodiment of the present invention, between display regions of two subpixels that exhibit different colors, the liquid crystal layer is interposed between a pair of electrodes (the first common electrode and the second common electrode) supplied with the same potential. This prevents a horizontal electric field from being generated between the adjacent two subpixels. As a result, the alignment defects of liquid crystals can be prevented to reduce light leakage, increasing the contrast ratio of the display device.

In one embodiment of the present invention, at least one of the pixel electrode and the first common electrode includes a portion that does not overlap with the second common electrode in the display region of the subpixel. As a result, the driving voltage of a liquid crystal element is unlikely to increase even when the second common electrode is provided.

<1-1. Structure Example 1 of Display Device>

FIGS. 1A to 1D illustrate cross-sectional views of the display device of one embodiment of the present invention.

The display device illustrated in FIG. 1A includes a substrate 119a, a substrate 119b, a pixel electrode 111a, a pixel electrode 111b, a first common electrode 112, a liquid crystal layer 113, a second common electrode 244, and an insulating layer 220.

The display device illustrated in FIG. 1A includes display regions 68a and 68b. The display regions 68a and 68b are display regions of subpixels that exhibit different colors (i.e., openings in the subpixels).

The pixel electrodes 111a and 111b and the first common electrode 112 are positioned between the liquid crystal layer 113 and the substrate 119a. The second common electrode 244 is positioned between the liquid crystal layer 113 and the substrate 119b. The same potential is supplied to the first common electrode 112 and the second common electrode 244.

In the display device illustrated in FIG. 1A, the first common electrode 112 is over the substrate 119a, the insulating layer 220 is over the first common electrode 112, and the island-shaped pixel electrodes 111a and 111b are over the insulating layer 220. The pixel electrode is provided in each subpixel. In the display region, the pixel electrode has an opening or an aperture (also referred to as a slit or the like).

Figure 1B:
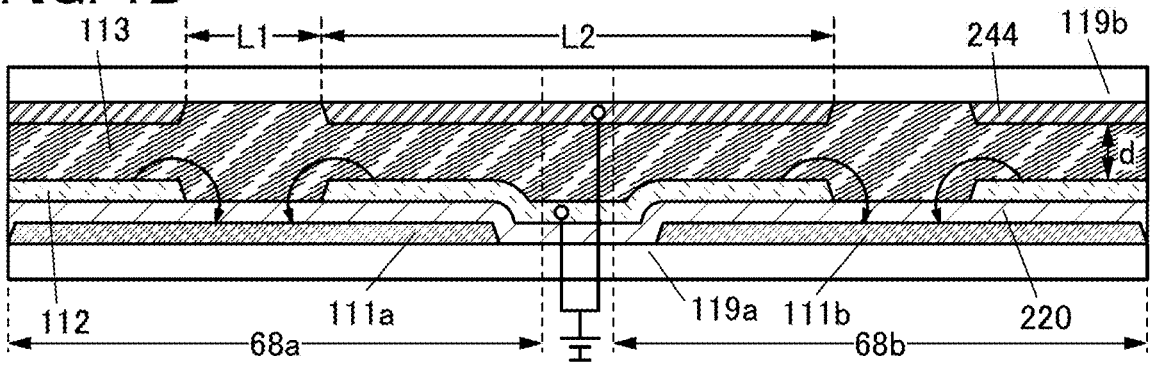

The display device illustrated in FIG. 1B is different from that in FIG. 1A in the stacking order of the pixel electrode and the first common electrode.

In the display device illustrated in FIG. 1B, the island-shaped pixel electrodes 111a and 111b are over the substrate 119a, the insulating layer 220 is over the pixel electrodes 111a and 111b, and the first common electrode 112 is over the insulating layer 220. In the display region, the first common electrode 112 has an opening or an aperture (also referred to as a slit or the like).

In each of the display regions 68a and 68b, a voltage can be applied between the pixel electrode and the first common electrode 112 (see arrows in FIGS. 1A and 1B). In contrast, between the display regions 68a and 68b, the liquid crystal layer 113 is interposed between the first common electrode 112 and the second common electrode 244 supplied with the same potential (a constant potential, a common potential). The common potential supplied to the electrode on the substrate 119b side prevents the electric field from spreading from the pixel electrode to the electrodes in adjacent subpixels. As a result, the alignment defects of liquid crystals can be prevented to reduce light leakage, increasing the contrast ratio of the display device.

In FIG. 1A, the first common electrode 112 has a portion that does not overlap with the second common electrode 244 in each of the display regions 68a and 68b. In FIG. 1B, the pixel electrode 111a has a portion that does not overlap with the second common electrode 244 in the display region 68a, and the pixel electrode 111b has a portion that does not overlap with the second common electrode 244 in the display region 68b. As compared with the case where the second common electrode 244 is provided in the entire display region of the subpixel, an increase in the driving voltage of the liquid crystal element can be reduced when the second common electrode 244 is partly provided.

In FIGS. 1A and 1B, L1 denotes the length of the display region of the subpixel where the second common electrode 244 is not provided, and L2 denotes the length of the second common electrode 244 that is provided across two subpixels. In FIG. 1A, the thickness of the liquid crystal layer 113 between the pixel electrode and the second common electrode 244 is denoted by d. In FIG. 1B, the thickness of the liquid crystal layer 113 between the first common electrode 112 and the second common electrode 244 is denoted by d. The thickness d of the liquid crystal layer refers to the thickness of the liquid crystal layer 113 between the second common electrode 244 and one of the pixel electrode and the first common electrode 112 that is closer to the second common electrode 244 in the thickness direction of the liquid crystal layer 113. The thickness d of the liquid crystal layer can also be referred to as a cell gap or the minimum distance between the second common electrode 244 and one of the pixel electrode and the first common electrode 112.

Figure 2A:
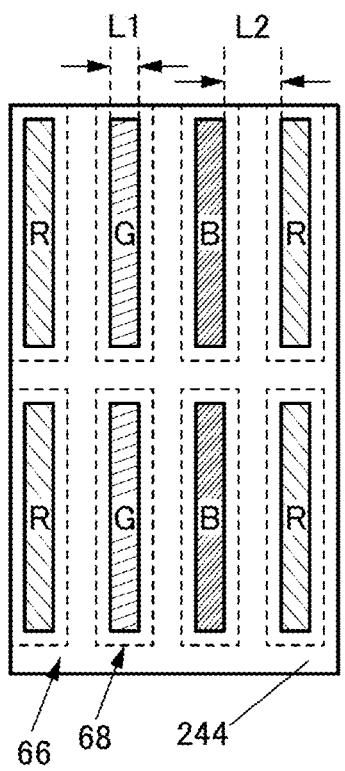
FIGS. 2A to 2C are top views illustrating layouts of a second common electrode.
Figure 2B:
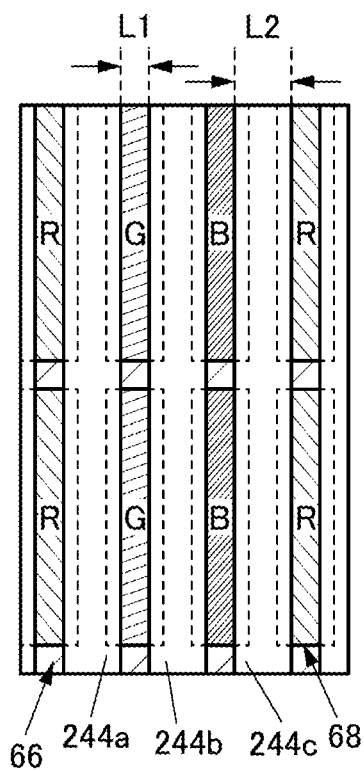
Figure 2C:
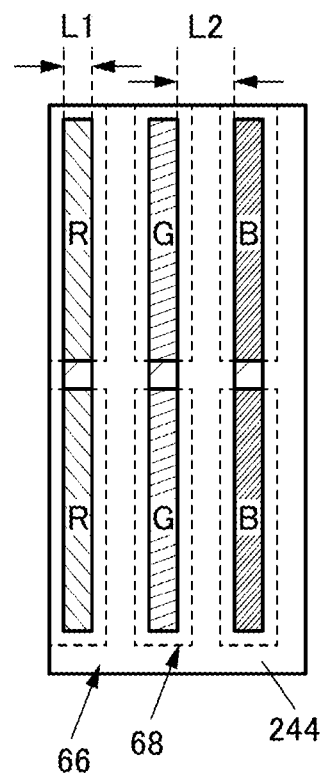

FIGS. 2A to 2C illustrate layout examples of the second common electrode 244.

In the examples shown here, one pixel is composed of three subpixels of a red subpixel (R), a green subpixel (G), and a blue subpixel (B). A region other than a display region 68 in a subpixel is denoted by a non-display region 66.

FIG. 2A shows an example in which the second common electrode 244 has an opening. The opening is positioned in at least part of the display region 68. The opening may be extended in the non-display region 66.

In FIG. 2A, the length L1 is equal to the width of the opening. In other words, the length L1 is the length of a short side of the opening, the length of the opening in the direction where subpixels exhibiting different colors are aligned, or the like.

In FIG. 2A, the length L2 is equal to the distance between openings. In other words, the length L2 is the distance or the like of openings in the direction where subpixels exhibiting different colors are aligned.

FIG. 2B shows an example in which a plurality of second common electrodes 244 are provided in a stripe pattern. The direction in which the second common electrodes 244 are aligned intersects with the direction in which subpixels exhibiting the same color are aligned.

One of the second common electrodes 244 is provided across two adjacent subpixels exhibiting different colors. For example, the second common electrode 244a is provided across the red subpixel (R) and the green subpixel (G).

In FIG. 2B, the length L1 is equal to the distance between two adjacent second common electrodes.

In FIG. 2B, the length L2 is equal to the width of the second common electrode. In other words, the length L2 is the length of a short side of the second common electrode, the length of the second common electrode in the direction where subpixels exhibiting different colors are aligned, or the like.

Note that the second common electrode 244 illustrated in FIG. 2B can be regarded as a comb-like electrode. In that case, the second common electrodes 244a, 244b, and 244c are connected to one another in a portion not illustrated in FIG. 2B. The length L1 can be the distance between teeth whereas the length L2 can be the width of a tooth.

FIG. 2C shows an example in which the opening in the second common electrode 244 is across two adjacent subpixels exhibiting the same color. The opening may be positioned in the display region 68 in a plurality of subpixels exhibiting the same color.

The second common electrode 244 is preferably provided in a larger area to have a lower resistance. For example, the resistance of the second common electrode 244 can be lower in the structure of FIG. 2A than in the structures of FIGS. 2B and 2C.

Figure 1C:
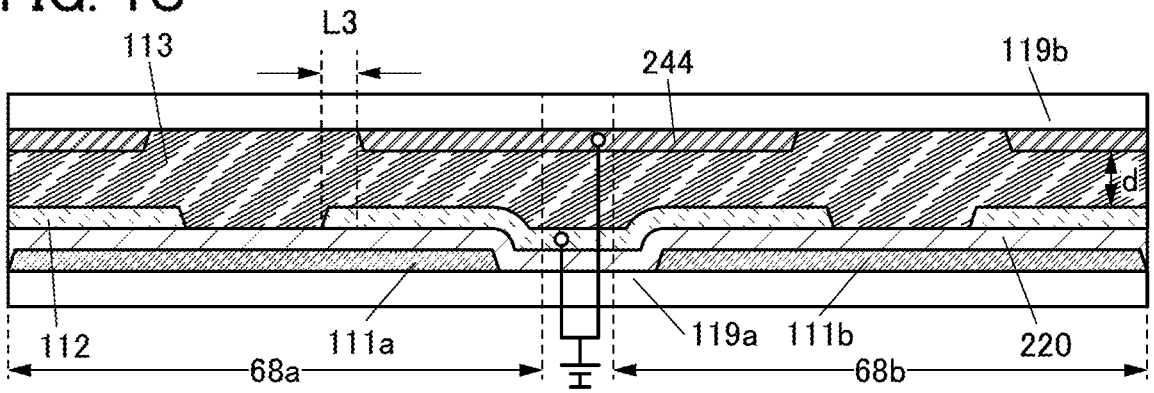
Figure 1D:
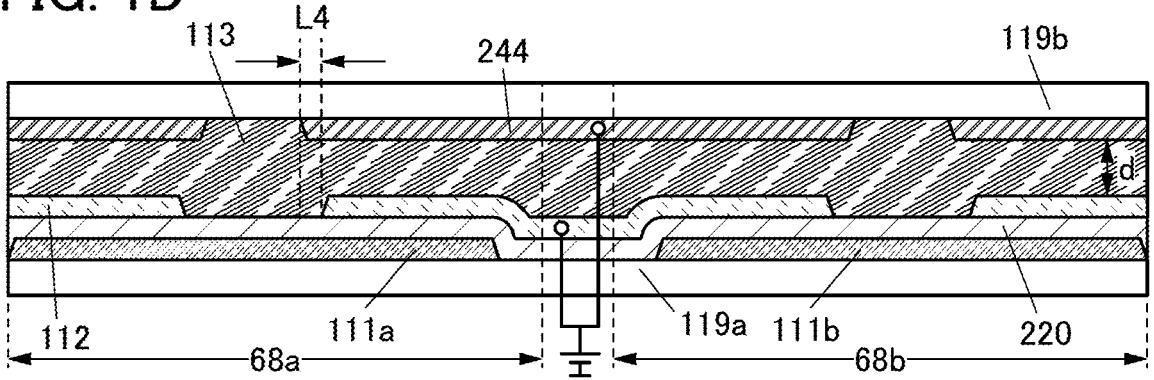

The following description is made on the case where the second common electrode 244 in FIGS. 1A to 1D has the layout illustrated in FIG. 2A. In FIGS. 1A to 1D, the second common electrode 244 has an opening in the display region 68. In FIGS. 1B to 1D, the first common electrode 112 has an opening in the display region 68.

FIGS. 1C and 1D are different from FIG. 1B in the shape of the second common electrode 244.

As illustrated in FIG. 1C, the first common electrode 112 may also have a portion that does not overlap with the second common electrode 244 in each of the display regions 68a and 68b.

In FIG. 1B, the width of the opening in the first common electrode 112 is equal to the width of the opening in the second common electrode 244.

In FIG. 1C, the width of the opening in the second common electrode 244 is greater than the width of the opening in the first common electrode 112.

In FIG. 1D, the width of the opening in the second common electrode 244 is narrower than the width of the opening in the first common electrode 112.

Seen from the direction perpendicular to the thickness of the liquid crystal layer 113, the length from an end portion of the opening in the second common electrode 244 to an end portion of the opening in the first common electrode 112 is denoted by L3 in FIG. 1C and L4 in FIG. 1D.

When the second common electrode 244 is provided in a larger area in a subpixel, the spread of the electric field from the pixel electrode to the electrodes in adjacent subpixels can be more reduced. In other words, light leakage can be reduced with a shorter length L1 or a longer length L2. Also, a decrease in the length L3 shown in FIG. 1C can reduce light leakage, and an increase in the length L4 shown in FIG. 1D can reduce light leakage.

When the second common electrode 244 is provided in a smaller area in the display region of a subpixel, an increase in the driving voltage of the liquid crystal element due to the second common electrode 244 can be reduced. In other words, an increase in the driving voltage of the liquid crystal element can be reduced with a longer length L1 or a shorter length L2. Also, an increase in the length L3 shown in FIG. 1C can reduce an increase in the driving voltage of the liquid crystal element, and a decrease in the length L4 shown in FIG. 1D can reduce an increase in the driving voltage of the liquid crystal element.

The liquid crystal layer with a smaller thickness d can increase the effect of the second common electrode 244 and reduce the generation of the horizontal electric field between two subpixels. A reduction in the thickness d of the liquid crystal layer results in an increase in the length L1 (a decrease in the length L2). As a result, both light leakage and an increase in driving voltage can be prevented.

In view of the above, when the thickness of the liquid crystal layer is denoted by d, the length L1 is preferably greater than or equal to d/6, more preferably greater than or equal to d/2.

When the thickness of the liquid crystal layer is denoted by d, the length L2 is preferably greater than or equal to d and less than or equal to 2.5d, more preferably greater than or equal to 1.2d and less than or equal to 2.4d. The condition of the length L2 affects the contrast ratio of the display device. The condition of the length L1 affects the driving voltage of the display device. Hence, the condition of the length L2, which affects display quality, is preferably given priority in the fabrication of the display device.

The thickness d of the liquid crystal layer is preferably greater than or equal to 1 μm and less than or equal to 3 μm, more preferably greater than or equal to 1.5 μm and less than or equal to 3 μm.

According to one embodiment of the present invention, light leakage between adjacent subpixels can be prevented and therefore, the distance between the subpixels can be reduced. This increases the aperture ratio of the subpixel, increases the definition of the display device, improves the display quality of the display device, and reduces an increase in driving voltage. Furthermore, a higher aperture ratio increases the light extraction efficiency. As a result, the power consumption of the display device can be reduced.

<1-2. Structure Example 2 of Display Device>

Figure 3A:
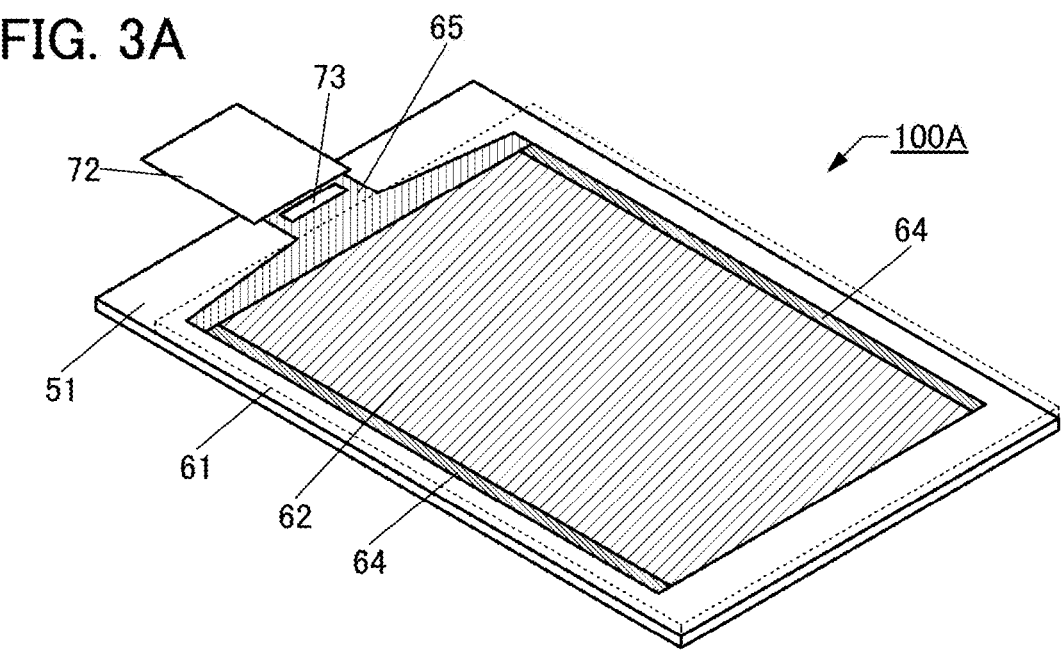
FIG. 3A is a perspective view illustrating an example of a display device.

FIG. 3A and FIG. 4A illustrate an example of the display device. FIG. 3A is a perspective view of a display device 100A, and FIG. 4A is a cross-sectional view of the display device 100A. For clarity, components such as a polarizer 130 are not drawn in FIG. 3A. FIG. 3A illustrates a substrate 61 with a dotted line.

The display device 100A includes a display portion 62 and a driver circuit portion 64. An FPC 72 and an IC 73 are implemented on the display device 100A.

The display portion 62 includes a plurality of pixels and has a function of displaying images.

The display device 100A may include one or both of a scan line driver circuit and a signal line driver circuit. The display device 100A may include none of the scan line driver circuit and the signal line driver circuit. When the display device 100A includes a sensor such as a touch sensor, the display device 100A may include a sensor driver circuit. In this embodiment, the driver circuit portion 64 is exemplified as including the scan line driver circuit. The scan line driver circuit has a function of outputting scan signals to the scan lines included in the display portion 62.

In the display device 100A, the IC 73 is mounted on a substrate 51 by a COG method or the like. The IC 73 includes, for example, any one or more of a signal line driver circuit, a scan line driver circuit, and a sensor driver circuit.

The FPC 72 is electrically connected to the display device 100A. The IC 73 and the driver circuit portion 64 are supplied with signals or power from the outside through the FPC 72. Furthermore, signals can be output to the outside from the IC 73 through the FPC 72.

An IC may be mounted on the FPC 72. For example, an IC including any one or more of a signal line driver circuit, a scan line driver circuit, and a sensor driver circuit may be mounted on the FPC 72.

A wiring 65 supplies signals and power to the display portion 62 and the driver circuit portion 64. The signals and power are input to the wiring 65 from the outside through the FPC 72, or from the IC 73.

Figure 3B:
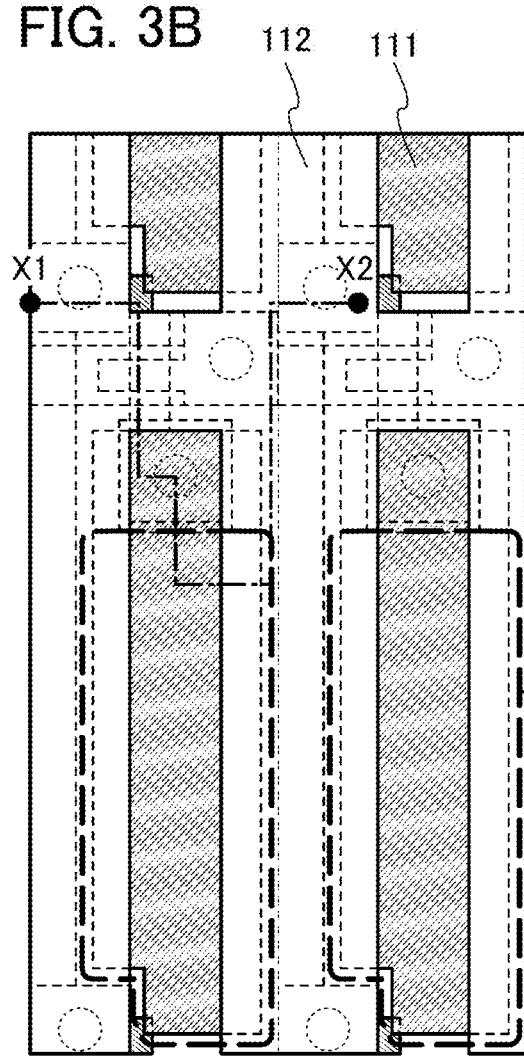
FIGS. 3B and 3C are top views illustrating examples of subpixels.
Figure 3C:
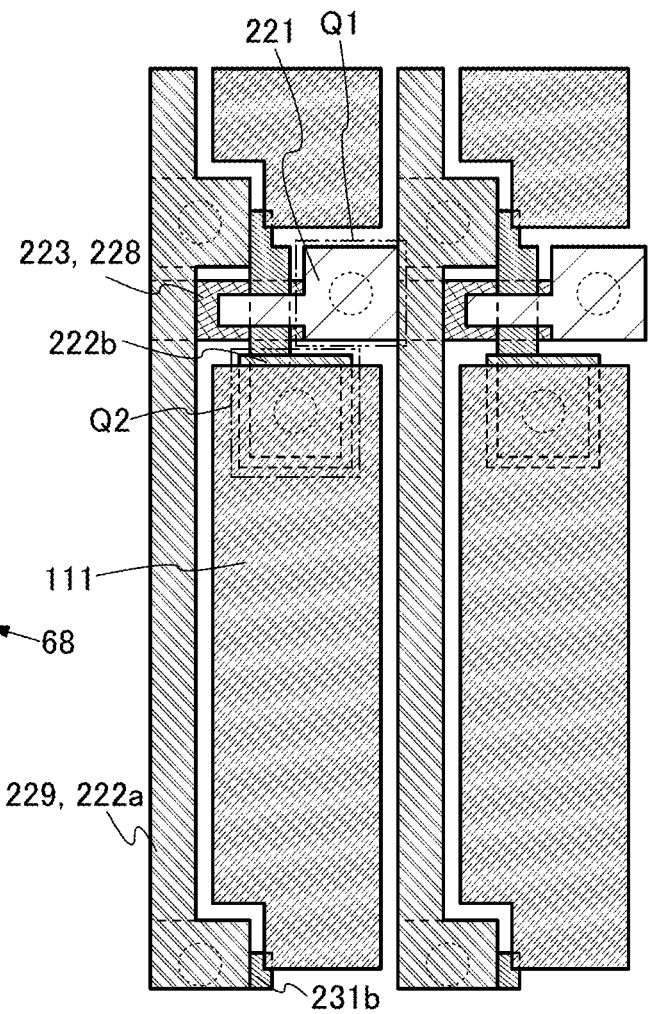

FIGS. 3B and 3C are top views of subpixels included in the display device 100A.

FIG. 4A is a cross-sectional view including the display portion 62, the driver circuit portion 64, and the wiring 65. FIG. 4A includes a cross-sectional view along dashed-dotted line X1-X2 in FIG. 3B. In FIG. 4A and the subsequent cross-sectional views of the display device, the display portion 62 includes the display region 68 in a subpixel and the non-display region 66 around the display region 68.

FIG. 3B is a top view seen from the first common electrode 112 side and illustrates a layered structure from a gate 223 to the first common electrode 112 in the subpixel (see FIG. 4A). In FIG. 3B, the display region 68 in the subpixel is outlined in a bold dotted line. FIG. 3C is a top view of the layered structure of FIG. 3B except for the first common electrode 112.

The display device 100A is an example of a transmissive liquid crystal display device that includes a liquid crystal element with a horizontal electric field mode.

As illustrated in FIG. 4A, the display device 100A includes the substrate 51, a transistor 201, a transistor 206, a liquid crystal element 40, an auxiliary wiring 139, an alignment film 133a, an alignment film 133b, a connection portion 204, an adhesive layer 141, a coloring layer 131, a light-blocking layer 132, an overcoat 121, the substrate 61, the polarizer 130, and the like.

The liquid crystal element 40 is provided in the display region 68. The liquid crystal element 40 is a liquid crystal element with fringe field switching (FFS) mode.

The liquid crystal element 40 includes a pixel electrode 111, the first common electrode 112, the second common electrode 244, and the liquid crystal layer 113. The alignment of the liquid crystal layer 113 can be controlled with the electric field generated between the pixel electrode 111 and the first common electrode 112. The liquid crystal layer 113 is positioned between the alignment films 133a and 133b.

In a connection portion 69, the second common electrode 244 is electrically connected to a conductive layer provided on the substrate 51 side. Hence, a potential can be supplied to the second common electrode 244 through the FPC 72. This is preferable because there is no need of connecting the FPC and the like on the substrate 61 side and the structure of the display device can be more simplified.

The connection portion 69 may be part of the display portion 62. Alternatively, the connection portion 69 may be outside of the display portion 62, and for example, may be provided between the display portion 62 and the driver circuit portion 64.

The first common electrode 112 and the second common electrode 244 can be supplied with the same potential. For example, when the first common electrode 112 and a conductive layer 284 are electrically connected to each other or made of a film (the same film), the second common electrode 244 is electrically connected to the first common electrode 112.

Note that the second common electrode 244 is not necessarily electrically connected to the first common electrode 112. In the case where the first common electrode 112 and the second common electrode 244 are electrically connected to different power source lines, the same potential is supplied to the two power source lines so that the first common electrode 112 and the second common electrode 244 can be supplied with the same potential.

In the connection portion 69, a conductive layer 281 is connected to a conductive layer 282, the conductive layer 282 is connected to a conductive layer 283, the conductive layer 283 is connected to the conductive layer 284, the conductive layer 284 is connected to a connector 243, and the connector 243 is connected to the second common electrode 244. The conductive layer 281, the conductive layer 282, and the conductive layer 283 can be formed using the same material and the same fabrication step as those used in the gate 223 of the transistor, the gate 221 of the transistor, and the conductive layers 222a and 222b, respectively. Fabricating the conductive layers in the connection portion 69 in such a manner, i.e., using the same materials and the same processes as the conductive layers used in the display portion 62 and the driver circuit portion 64, is preferable because the number of process steps is not increased.

As the connector 243, a conductive particle can be used, for example. A particle of an organic resin, silica, or the like coated with a metal material can be used as the conductive particle. Nickel or gold is preferably used as the metal material because contact resistance can be decreased. A use of a particle coated with layers of two or more kinds of metal materials, such as a particle coated with nickel and further with gold, is also preferable. A material capable of elastic deformation or plastic deformation is preferably used as the connector 243. As illustrated in FIG. 4A and the like, the conductive particle has a shape that is vertically crushed in some cases. With the crushed shape, the contact area between the connector 243 and a conductive layer electrically connected to the connector 243 can be increased, thereby reducing contact resistance and reducing issues such as disconnection.

The connector 243 is preferably provided so as to be covered with the adhesive layer 141. For example, the connector 243 may be dispersed within the adhesive layer 141 before the curing thereof.

In FIG. 4A, the pixel electrode 111 is electrically connected to a low-resistance region 231b through the conductive layer 222b.

As illustrated in FIG. 4B, the pixel electrode 111 may be directly connected to the low-resistance region 231b. In that case, a semiconductor layer (a channel region 231a and the low-resistance region 231b) preferably contains a material transmitting visible light, such as an oxide semiconductor. This allows the pixel electrode 111 and the connection portion of the transistor to be provided in the display region 68, increasing the aperture ratio of the subpixel and the definition of the display device. Note that the low-resistance region 231b may be electrically connected to the conductive layer 222b. The conductive layer 222b can serve as an auxiliary electrode of the low-resistance region 231b. The transistor does not necessarily include the conductive layer 222b.

The first common electrode 112 may have a top-surface shape (also referred to as a planar shape) that has a comb-like shape or a top-surface shape that is provided with a slit. FIGS. 3B and 3C and FIG. 4A illustrate an example where one opening is provided in the first common electrode 112 in the display region 68 of one subpixel. As the display device has higher definition, the area of the display region 68 in one subpixel becomes smaller. Thus, the number of openings provided in the first common electrode 112 is not limited to more than one; one opening can be provided. That is, in a display device with high definition, the area of the pixel (subpixel) is small; therefore, an adequate electric field for the alignment of liquid crystals over the entire display region of the subpixel can be generated, even when there is only one opening in the first common electrode 112.

The insulating layer 220 is provided between the pixel electrode 111 and the first common electrode 112. The pixel electrode 111 includes a portion that overlaps with the first common electrode 112 with the insulating layer 220 provided therebetween. Furthermore, the first common electrode 112 is not placed above the pixel electrode 111 in some areas of a region where the pixel electrode 111 and the coloring layer 131 overlap. The auxiliary wiring 139 is provided over the first common electrode 112. The resistivity of the auxiliary wiring 139 is preferably lower than that of the first common electrode 112. By providing an auxiliary wiring that is electrically connected to the common electrode, a drop in voltage due to the resistance of the common electrode can be inhibited. In addition, when a layered structure of a conductive layer including a metal oxide and a conductive layer including a metal is used, these conductive layers are formed preferably by a patterning technique using a half tone mask, thereby simplifying the fabrication process.

The auxiliary wiring 139 is a film with smaller resistance than the first common electrode 112. For example, the auxiliary wiring 139 can be formed to have a single-layer structure or a layered structure using any of metal materials such as molybdenum, titanium, chromium, tantalum, tungsten, aluminum, copper, silver, neodymium, and scandium, and an alloy material containing any of these elements.

The auxiliary wiring 139 is preferably provided in a position that overlaps with the light-blocking layer 132 and the like, so that the auxiliary wiring 139 is not seen by the user of the display device.

An alignment film is preferably provided in contact with the liquid crystal layer 113. The alignment film can control the alignment of the liquid crystal layer 113. In the display device 100A, the alignment film 133a is positioned between the first common electrode 112 (or the insulating layer 220) and the liquid crystal layer 113, and the alignment film 133b is positioned between the second common electrode 244 (or the overcoat 121) and the liquid crystal layer 113.

The liquid crystal material is classified into a positive liquid crystal material with a positive dielectric anisotropy (Δε) and a negative liquid crystal material with a negative dielectric anisotropy. Both of the materials can be used in one embodiment of the present invention, and an optimal liquid crystal material can be selected according to the employed mode and design.

In one embodiment of the present invention, a negative liquid crystal material is preferably used. The negative liquid crystal is less affected by a flexoelectric effect, which is attributed to the polarization of liquid crystal molecules, and thus the polarity of voltage applied to the liquid crystal layer makes little difference in transmittance. This prevents flickering from being recognized by the user of the display device. The flexoelectric effect is a phenomenon in which polarization is induced by the distortion of orientation, and mainly depends on the shape of a molecule. The negative liquid crystal material is less likely to experience the deformation such as spreading and bending.

Note that the liquid crystal element 40 is an element using an FFS mode here; however, one embodiment of the present invention is not limited thereto, and a liquid crystal element using any of a variety of modes can be used. For example, a liquid crystal element using a vertical alignment (VA) mode, a twisted nematic (TN) mode, an in-plane switching (IPS) mode, an axially symmetric aligned micro-cell (ASM) mode, an optically compensated birefringence (OCB) mode, a ferroelectric liquid crystal (FLC) mode, or an antiferroelectric liquid crystal (AFLC) mode can be used.

Furthermore, the display device 100A may be a normally black liquid crystal display device, for example, a transmissive liquid crystal display device using a vertical alignment (VA) mode. Examples of the vertical alignment mode include a multi-domain vertical alignment (MVA) mode, a patterned vertical alignment (PVA) mode, and an advanced super view (ASV) mode.

The liquid crystal element is an element that controls transmission and non-transmission of light by optical modulation action of the liquid crystal. The optical modulation action of a liquid crystal is controlled by an electric field applied to the liquid crystal (including a horizontal electric field, a vertical electric field, and an oblique electric field). As the liquid crystal used for the liquid crystal element, a thermotropic liquid crystal, a low-molecular liquid crystal, a high-molecular liquid crystal, a polymer dispersed liquid crystal (PDLC), a ferroelectric liquid crystal, an anti-ferroelectric liquid crystal, or the like can be used. Such a liquid crystal material exhibits a cholesteric phase, a smectic phase, a cubic phase, a chiral nematic phase, an isotropic phase, or the like depending on conditions.

Alternatively, in the case of employing a horizontal electric field mode, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which 5 wt. % or more of a chiral material is mixed is used for the liquid crystal layer 113 in order to improve the temperature range. The liquid crystal composition that includes a liquid crystal exhibiting a blue phase and a chiral material has a short response time and exhibits optical isotropy, which makes the alignment process unnecessary. In addition, the liquid crystal composition that includes a liquid crystal exhibiting a blue phase and a chiral material has little viewing angle dependence. In addition, since an alignment film does not need to be provided and rubbing treatment is unnecessary, electrostatic discharge damage caused by the rubbing treatment can be prevented and defects or damage of the liquid crystal display device in the manufacturing process can be reduced.

As the display device 100A is a transmissive liquid crystal display device, a conductive material that transmits visible light is used for both the pixel electrode 111 and the first common electrode 112. In the case where the second common electrode 244 is positioned in the display region 68, a conductive material that transmits visible light is also used for the second common electrode 244.

For example, a material containing one or more of indium (In), zinc (Zn), and tin (Sn) is preferably used for the conductive material that transmits visible light. Specifically, indium oxide, indium tin oxide (ITO), indium zinc oxide, indium oxide containing tungsten oxide, indium zinc oxide containing tungsten oxide, indium oxide containing titanium oxide, indium tin oxide containing titanium oxide, indium tin oxide containing silicon oxide (ITSO), zinc oxide, and zinc oxide containing gallium are given, for example. Note that a film including graphene can be used as well. The film including graphene can be formed, for example, by reducing a film containing graphene oxide.

Preferably, at least one of the pixel electrode 111 and the first common electrode 112 includes an oxide conductive layer. The oxide conductive layer preferably includes one or more metal elements that are included in the semiconductor layer of the transistor 206. For example, the pixel electrode 111 preferably contains indium and is further preferably an In-M-Zn oxide (M is Al, Ti, Ga, Ge, Y, Zr, La, Ce, Nd, Sn, or Hf) film. Similarly, the first common electrode 112 preferably contains indium and is further preferably an In-M-Zn oxide film.

At least one of the pixel electrode 111 and the first common electrode 112 may be formed with an oxide semiconductor. When two or more layers constituting the display device are formed using oxide semiconductors containing the same metal element, the same manufacturing equipment (e.g., film-formation equipment or processing equipment) can be used in two or more steps; manufacturing cost can thus be reduced.

An oxide semiconductor is a semiconductor material whose resistance can be controlled by oxygen vacancies in the film of the semiconductor material and/or the concentration of impurities such as hydrogen or water in the film of the semiconductor material. Thus, the resistivity of the oxide conductive layer can be controlled by selecting between treatment for increasing oxygen vacancies and/or impurity concentration on the oxide semiconductor layer, or treatment for reducing oxygen vacancies and/or impurity concentration on the oxide semiconductor layer.

Note that such an oxide conductive layer formed using an oxide semiconductor layer can be referred to as an oxide semiconductor layer having a high carrier density and a low resistance, an oxide semiconductor layer having conductivity, or an oxide semiconductor layer having high conductivity.

In addition, the manufacturing cost can be reduced by forming the oxide semiconductor layer and the oxide conductive layer using the same metal element. For example, the manufacturing cost can be reduced by using a metal oxide target with the same metal composition. By using the metal oxide target with the same metal composition, an etching gas or an etchant used in the processing of the oxide semiconductor layer can also be used for processing of the oxide conductive layer. Note that even when the oxide semiconductor layer and the oxide conductive layer have the same metal elements, their composition of the metal elements are different in some cases. For example, metal elements in the film can desorb during the fabrication process of the display device, which results in a different metal composition.

For example, when a silicon nitride film containing hydrogen is used for the insulating layer 220, and an oxide semiconductor is used for the pixel electrode 111, the conductivity of the oxide semiconductor can be increased by the hydrogen that is supplied from the insulating layer 220.

The transistor 206 is provided in the non-display region 66.

The transistor 206 includes the gate 221, the gate 223, an insulating layer 211, an insulating layer 213, and a semiconductor layer (the channel region 231a and a pair of low-resistance regions 231b). The resistivity of the low-resistance region 231b is lower than that of the channel region 231a. In this embodiment, the case in which an oxide semiconductor layer is used as the semiconductor layer is described as an example. The oxide semiconductor layer preferably includes indium and is further preferably an In-M-Zn oxide (M is Al, Ti, Ga, Ge, Y, Zr, La, Ce, Nd, Sn, or Hf) film. The details of the oxide semiconductor layer is described later.

The gate 221 and the channel region 231a overlap with the insulating layer 213 positioned therebetween. The gate 223 and the channel region 231a overlap with the insulating layer 211 positioned therebetween. The insulating layers 211 and 213 serve as gate insulating layers. Through openings provided in the insulating layers 212 and 214, the conductive layer 222a is connected to one of the low-resistance regions 231b and the conductive layer 222b is connected to the other of the low-resistance regions 231b.

The transistor 206 illustrated in FIG. 4A is a transistor including gates above and below the channel.

In a contact area Q1 illustrated in FIG. 3C, the gates 221 and 223 are electrically connected. A transistor that that has two gates that are electrically connected to each other can have a higher field-effect mobility and thus have higher on-state current than the other transistors. Consequently, a circuit capable of high-speed operation can be obtained. Furthermore, the area occupied by a circuit portion can be reduced. The use of the transistor having a high on-state current can reduce signal delay in wirings and can reduce display unevenness even in a display device in which the number of wirings is increased because of an increase in size or resolution. In addition, the use of such a configuration allows the fabrication of a highly reliable transistor.

In a contact area Q2 illustrated in FIG. 3C, the conductive layer 222b is connected to the pixel electrode 111.

In other words, in FIGS. 3B and 3C, one conductive layer serves as a scan line 228 and the gate 223. One of the gates 221 and 223 that has the lower resistance of the two is preferably the conductive layer that also serves as the scan line.

In other words, in FIGS. 3B and 3C, one conductive layer serves as a signal line 229 and the conductive layer 222a.

The gates 221 and 223 can each include a single layer of one of a metal material and an oxide conductor, or stacked layers of both a metal material and an oxide conductor. For example, one of the gates 221 and 223 may include an oxide conductor, and the other of the gates 221 and 223 may include a metal material.

The transistor 206 can be formed to include the oxide semiconductor layer as a semiconductor layer, and include the oxide conductive layer as at least one of the gates 221 and 223. In this case, the oxide semiconductor layer and the oxide conductive layer are preferably formed using an oxide semiconductor.

When a conductive layer blocking visible light is used for the gate 223, light from a backlight can be prevented from entering the channel region 231a; this makes the transistor more reliable.

The transistor 206 is covered by the insulating layers 212 and 214 and insulating layers 215 and 216. Note that the insulating layers 212, 214, and 216 can be considered as the component of the transistor 206. The transistor is preferably covered by an insulating layer that reduces the diffusion of an impurity to the semiconductor constituting the transistor. The insulating layer 215 serves as a planarization layer.

Each of the insulating layers 211 and 213 preferably includes an excess oxygen region. When the gate insulating layer includes the excess oxygen region, excess oxygen can be supplied into the channel region 231a. A highly reliable transistor can be provided since oxygen vacancies that are potentially formed in the channel region 231a can be filled with excess oxygen.

The insulating layer 212 preferably includes nitrogen or hydrogen. When the insulating layer 212 and the low-resistance region 231b are in contact with each other, nitrogen or hydrogen in the insulating layer 212 is added into the low-resistance region 231b. The carrier density of the low-resistance region 231b becomes high when nitrogen or hydrogen is added. Alternatively, when the insulating layer 214 includes nitrogen or hydrogen and the insulating layer 212 transmits the nitrogen or hydrogen, the nitrogen or hydrogen can be added into the low-resistance region 231b.

In the display device 100A, the coloring layer 131 and the light-blocking layer 132 are provided closer to the substrate 61 than the liquid crystal layer 113. The coloring layer 131 is positioned in a region that at least overlaps with the display region 68 of a subpixel. In the non-display region 66 of a pixel (subpixel), the light-blocking layer 132 is provided. The light-blocking layer 132 overlaps with at least a part of the transistor 206.

The overcoat 121 is preferably provided between the coloring layer 131 or the light-blocking layer 132, and the liquid crystal layer 113. The overcoat 121 can reduce the diffusion of an impurity contained in the coloring layer 131, the light-blocking layer 132, and the like into the liquid crystal layer 113. In FIG. 4A, the second common electrode 244 is provided between the overcoat 121 and the alignment film 133b.

The substrates 51 and 61 are bonded to each other by the adhesive layer 141. The liquid crystal layer 113 is encapsulated in a region that is surrounded by the substrates 51 and 61, and the adhesive layer 141.

When the display device 100A functions as a transmissive liquid crystal display device, two polarizers are positioned in a way that the display portion 62 is sandwiched by the two polarizers. FIG. 4A illustrates the polarizer 130 on the substrate 61 side. Light 45 from a backlight provided on the outside of the polarizer on the substrate 51 side enters the display device 100A through the polarizer. In this case, the optical modulation of the light can be controlled by controlling the alignment of the liquid crystal layer 113 with a voltage supplied between the pixel electrode 111 and the first common electrode 112. That is, the intensity of light that is ejected through the polarizer 130 can be controlled. Furthermore, the coloring layer 131 absorbs light of wavelengths other than a specific wavelength range from the incident light. As a result, the ejected light exhibits red, blue, or green colors, for example.

In addition to the polarizer, a circular polarizer can be used, for example. An example of a circular polarizer include a polarizer which is formed by stacking a linear polarizer and a quarter-wave retardation film. The circular polarizer can reduce the viewing angle dependence of the display quality of the display device.

The driver circuit portion 64 includes the transistor 201.

The transistor 201 includes the gate 221, the gate 223, the insulating layer 211, the insulating layer 213, the semiconductor layer (the channel region 231a and a pair of low-resistance regions 231b), the conductive layer 222a, and the conductive layer 222b. One of the conductive layers 222a and 222b serves as a source, and the other serves as a drain. The conductive layer 222a is electrically connected to one of the low-resistance regions 231b and the conductive layer 222b is connected to the other of the low-resistance regions 231b.

In the connection portion 204, the wiring 65 and a conductive layer 251 are connected to each other, and the conductive layer 251 and a connector 242 are connected to each other. That is, in the connection portion 204, the wiring 65 is electrically connected to the FPC 72 through the conductive layer 251 and the connector 242. By employing this configuration, signals and power can be supplied from the FPC 72 to the wiring 65.

The wiring 65 can be formed with the same material and the same fabrication step as those used in the conductive layers 222a and 222b that are included in the transistor 206. The conductive layer 251 can be formed with the same material and the same fabrication step as those used in the pixel electrode 111 that is included in the liquid crystal element 40. Fabricating the conductive layers constituting the connection portion 204 in such a manner, i.e., using the same materials and the same fabrication processes as those used in the conductive layers composing the display portion 62 and the driver circuit portion 64, is preferable because the number of process steps is not increased.

The transistors 201 and 206 may or may not have the same structure. That is, the transistors included in the driver circuit portion 64 and the transistors included in the display portion 62 may or may not have the same structure. In addition, the driver circuit portion 64 may have a plurality of transistors with different structures, and the display portion 62 may have a plurality of transistors with different structures. For example, a transistor including two gates that are electrically connected to each other is preferably used for one or more of a shift register circuit, a buffer circuit, and a protection circuit included in a scan line driver circuit.

Figure 5A:
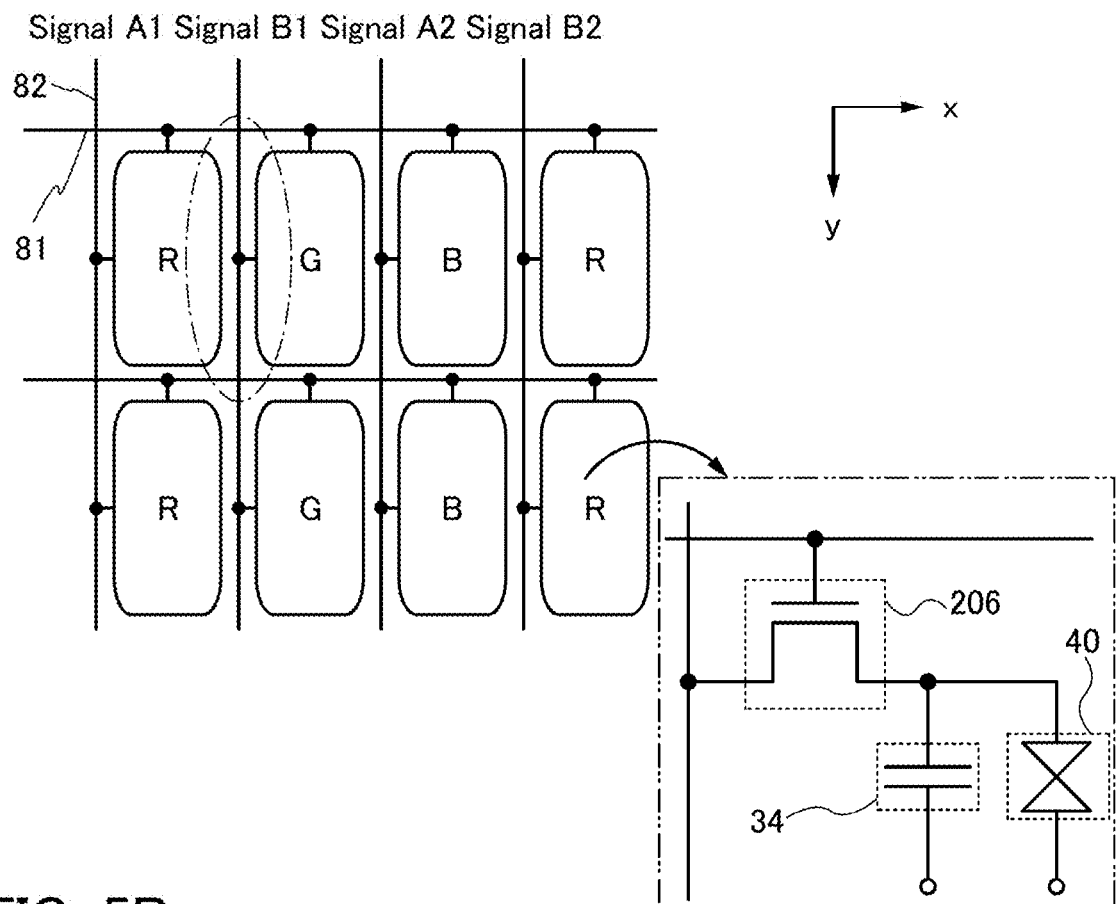
FIGS. 5A and 5B illustrate arrangement and structure examples of pixels.
Figure 5B:
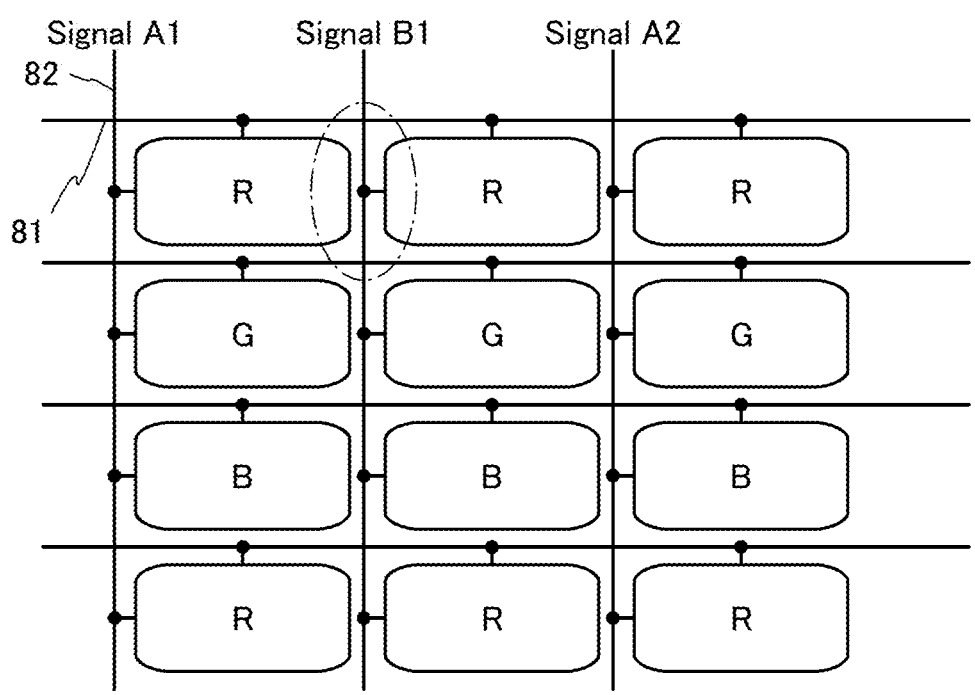

The pixel arrangement examples are shown in FIGS. 5A and 5B. FIGS. 5A and 5B show examples in which one pixel is composed of a red subpixel R, a green subpixel G, and a blue subpixel B. In FIGS. 5A and 5B, a plurality of scan lines 81 extend in the x direction, and a plurality of signal lines 82 extend in the y direction. The scan lines 81 and the signal lines 82 intersect with each other.

As shown by the dashed-two-dotted line in FIG. 5A, a subpixel includes the transistor 206, a capacitor 34, and the liquid crystal element 40. A gate of the transistor 206 is electrically connected to the scan line 81. One of a source and a drain of the transistor 206 is electrically connected to the signal line 82, and the other is electrically connected to one electrode of the capacitor 34 and one electrode of the liquid crystal element 40. The other electrode of the capacitor 34 and the other electrode of the liquid crystal element 40 are each supplied with a constant potential.

FIGS. 5A and 5B show examples where the source-line inversion driving is adopted. Signals A1 and A2 are signals with the same polarity. Signals B1 and B2 are signals with the same polarity. Signals A1 and B1 are signals with different polarities. Signals A2 and B2 are signals with different polarities.

As the definition of the display device becomes higher, the distance between the subpixels become shorter. Thus, as shown in the frame outlined in a dashed-dotted line in FIG. 5A, in the subpixel where the signal A1 is input, the liquid crystal is easily affected by potentials in both the signal A1 and the signal B1, in the vicinities of the signal line 82 where the signal B1 is input. This can make the liquid crystal more prone to alignment defects.

In FIG. 5A, the direction in which a plurality of subpixels exhibiting the same color are aligned is the y direction, and is substantially parallel to the direction where the signal lines 82 extend. As shown in the frame outlined in the dashed-dotted line in FIG. 5A, subpixels exhibiting different colors are adjacent to each other, with the longer sides of the subpixels facing each other.

In FIG. 5B, the direction in which a plurality of subpixels exhibiting the same color are aligned is the x direction, and intersects with the direction where the signal lines 82 extend. As shown in the frame outlined in a dashed-dotted line in FIG. 5B, subpixels exhibiting the same color are adjacent to each other, with the shorter sides of the subpixels facing each other.

When the side of the subpixel that is substantially parallel to the direction in which the signal lines 82 extend is the shorter side of the subpixel as illustrated in FIG. 5B, the region where the liquid crystal is more prone to alignment defects can be made narrower, compared with the case (illustrated in FIG. 5A) where the longer side of the subpixel is substantially parallel to the direction in which the signal lines 82 extend. When the region where the liquid crystal is more prone to alignment defects is positioned between subpixels exhibiting the same color as illustrated in FIG. 5B, display defects are less easily recognized by a user of the display device when compared with the case (see FIG. 5A) where the region is positioned between subpixels exhibiting different colors. In one embodiment of the present invention, the direction in which the plurality of subpixels exhibiting the same color are arranged preferably intersects with the direction in which the signal lines 82 extend.

In the display device of one embodiment of the present invention, the second common electrode 244 contributes to preventing the alignment defects of liquid crystals. Hence, one embodiment of the present invention can employ the structure illustrated in FIG. 5A, in which the direction in which a plurality of subpixels exhibiting different colors are aligned intersects with the direction where the signal lines 82 extend.

Figure 6:
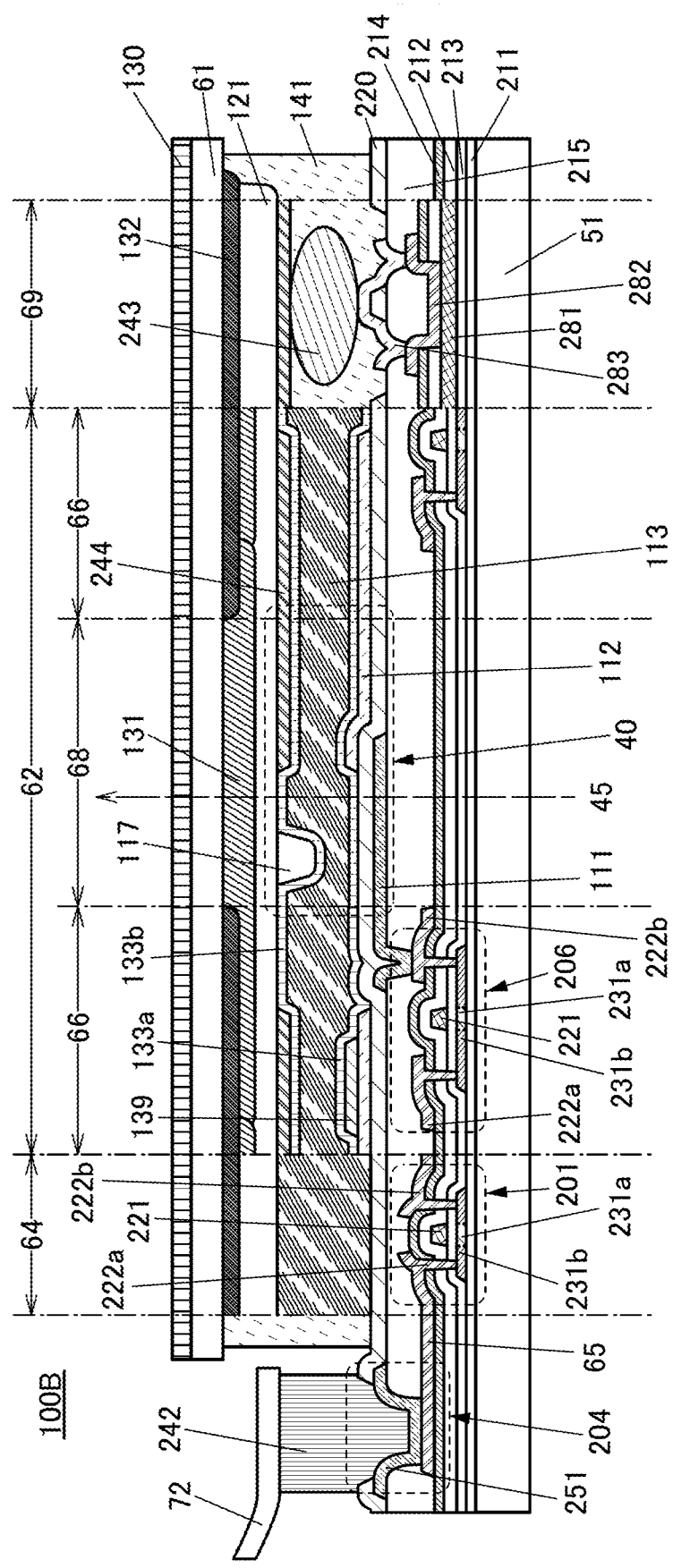
FIG. 6 is a cross-sectional view illustrating an example of a display device.

FIG. 6 shows a cross-sectional view of a display device 100B. Note that the perspective view of the display device 100B is similar to that of the display device 100A illustrated in FIG. 3A; thus, the description thereof is omitted.

The display device 100A shows an example where the transistor includes two gates; in the display device 100B, the transistors 201 and 206 each include only the gate 221. In addition, the display device 100B includes a spacer 117. Components of the display device 100B that are similar to those of the display device 100A are not described in detail.

The transistors 201 and 206 are provided over the insulating layer 211. The insulating layer 211 serves as a base film. The transistor 206 includes the gate 221, the insulating layer 213, and the semiconductor layer (the channel region 231*a* and a pair of low-resistance regions 231*b*). Through openings provided in the insulating layers 212 and 214, the conductive layer 222*a* is connected to one of the low-resistance regions 231*b* and the conductive layer 222*b* is connected to the other of the low-resistance regions 231*b*. The insulating layer 215 serves as a planarization layer.

In the connection portion 69, the conductive layer 281 is connected to the conductive layer 282, the conductive layer 282 is connected to the conductive layer 283, the conductive layer 283 is connected to the connector 243, and the connector 243 is connected to the second common electrode 244. The conductive layer 281 and the conductive layer 282 can be formed using the same material and the same fabrication step as those used in the gate 221, and the conductive layers 222*a* and 222*b*, respectively. Fabricating the conductive layers in the connection portion 69 in such a manner, i.e., using the same materials and the same processes as the conductive layers used in the display portion 62 and the driver circuit portion 64, is preferable because the number of process steps is not increased.

The spacer 117 has a function of keeping the distance between the substrate 51 and the substrate 61 greater than or equal to a certain distance.

In the example shown in FIG. 6, the bottom surface of the spacer 117 is in contact with the overcoat 121; however, one embodiment of the present invention is not limited thereto. The spacer 117 may be provided on the substrate 51 side, or the substrate 61 side.

In the example shown in FIG. 6, the alignment films 133*a* and 133*b* are not in contact with each other in a region where the alignment films 133*a* and 133*b* overlap with the spacer 117; however, the alignment films 133*a* and 133*b* may be in contact with each other. Furthermore, the spacer 117 provided over one substrate may be, but is not necessarily, in contact with a structure provided over the other substrate. For example, the liquid crystal layer 113 may be positioned between the spacer 117 and the structure.

A particulate spacer may be used as the spacer 117. As the particulate spacer, materials such as silica can be used. Spacer is preferably made of a material with elasticity, such as a resin or rubber. In this case, the particulate spacer may take a shape that is vertically crushed.

Next, the details of the materials that can be used for components of the display device of this embodiment and the like are described. Note that description on the components already described is omitted in some cases. The materials described below can be used as appropriate in the display device, the touch panel, and the components thereof described later.

<<Substrates 51 and 61>>

There are no large limitations on the material of the substrate used in the display device of one embodiment of the present invention; a variety of substrates can be used. For example, a glass substrate, a quartz substrate, a sapphire substrate, a semiconductor substrate, a ceramic substrate, a metal substrate, or a plastic substrate can be used.

The weight and thickness of the display device can be reduced by using a thin substrate. Furthermore, a flexible display device can be obtained by using a substrate that is thin enough to have flexibility.

The display device of one embodiment of the present invention is fabricated by forming a transistor and the like over the fabrication substrate, then transferring the transistor and the like on another substrate. The use of the fabrication substrate enables the following: a formation of a transistor with favorable characteristics; a formation of a transistor with low power consumption; a manufacturing of a durable display device; an addition of heat resistance to the display device; a manufacturing of a more lightweight display device; or a manufacturing of a thinner display device. Examples of a substrate to which a transistor is transferred include, in addition to the substrate over which the transistor can be formed, a paper substrate, a cellophane substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), and the like), a leather substrate, a rubber substrate, and the like.

<<Transistors 201 and 206>>

A transistor included in the display device of one embodiment of the present invention may have a top-gate structure or a bottom-gate structure. Gate electrodes may be provided above and below a channel. A semiconductor material used in the transistor is not particularly limited, and an oxide semiconductor, silicon, or germanium can be used, for example.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. The use of a semiconductor having crystallinity is preferable as the degradation of a transistor's characteristics can be reduced.

For example, a Group 14 element, a compound semiconductor, or an oxide semiconductor can be used for the semiconductor layer. Typically, a semiconductor including silicon, a semiconductor including gallium arsenide, or an oxide semiconductor including indium can be used for the semiconductor layer.

An oxide semiconductor is preferably used for the semiconductor in which the channel of a transistor is formed. In particular, using an oxide semiconductor with a larger bandgap than that of silicon is preferable. The use of a semiconductor material with a larger bandgap than that of silicon and a small carrier density is preferable because the current during the off state (off-state current) of the transistor can be reduced.

The oxide semiconductor preferably contains at least indium (In) or zinc (Zn). The oxide semiconductor further preferably contains an In-M-Zn oxide (M is a metal such as Al, Ti, Ga, Ge, Y, Zr, La, Ce, Nd, Sn, or Hf).

As the semiconductor layer, it is particularly preferable to use an oxide semiconductor layer including a plurality of crystal parts whose c-axes are aligned substantially perpendicular to a surface on which the semiconductor layer is formed or the top surface of the semiconductor layer and in which adjacent crystal parts have no grain boundary.

The use of such an oxide semiconductor for the semiconductor layer makes it possible to provide a highly reliable transistor in which a change in the electrical characteristics is reduced.

Charge accumulated in a capacitor through the transistor can be retained for a long time because of low off-state current of the transistor. The use of such a transistor in pixels allows a driver circuit to stop while the gray level of a displayed image is maintained. As a result, a display device with extremely low power consumption is obtained.

The transistors 201 and 206 preferably include an oxide semiconductor layer that is highly purified to reduce the formation of oxygen vacancies. This makes the off-state current of the transistor low. Accordingly, an electrical signal such as an image signal can be held for a long period, and a writing interval can be set long in an on state. Thus, the frequency of refresh operation can be reduced, which leads to an effect of reducing power consumption.

In the transistors 201 and 206, a relatively high field-effect mobility can be obtained, whereby high-speed operation is possible. The use of such transistors that are capable of high-speed operation in the display device enables the fabrication of the transistor in the display portion and the transistors in the driver circuit portion over the same substrate. This means that a semiconductor device separately formed with a silicon wafer or the like does not need to be used as the driver circuit, which enables a reduction in the number of components in the display device. In addition, using the transistor that can operate at high speed in the display portion also can enable the provision of a high-quality image.

<<Oxide Semiconductor Layer>>

The oxide semiconductor layer preferably includes a film represented by an In-M-Zn oxide that contains at least indium (In), zinc (Zn), and M (a metal such as Al, Ti, Ga, Ge, Y, Zr, La, Ce, Nd, Sn, or Hf). In order to reduce variations in electrical characteristics of the transistor including the oxide semiconductor, the oxide semiconductor preferably contains a stabilizer in addition to the In-M-Zn oxide.

Examples of the stabilizer, including metals that can be used as M, are gallium (Ga), tin (Sn), hafnium (Hf), aluminum (Al), and zirconium (Zr). As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be used.

As an oxide semiconductor included in an oxide semiconductor layer, any of the following can be used, for example: an In—Ga-based oxide, an In—Zn-based oxide, an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, for example, an "In—Ga—Zn-based oxide" means an oxide containing In, Ga, and Zn as its main components and there is no limitation on the ratio of In:Ga:Zn. Further, a metal element in addition to In, Ga, and Zn may be contained.

Note that in the case where the oxide semiconductor layer includes an In-M-Zn oxide, when the summation of In and M is assumed to be 100 atomic %, the atomic proportions of In and M are preferably higher than 25 atomic % and lower than 75 atomic %, respectively, more preferably higher than 34 atomic % and lower than 66 atomic %, respectively.

The energy gap of the oxide semiconductor layer is 2 eV or more, preferably 2.5 eV or more, more preferably 3 eV or more. The use of such an oxide semiconductor having a wide energy gap leads to a reduction in off-state current of a transistor.

The thickness of the oxide semiconductor layer is greater than or equal to 3 nm and less than or equal to 200 nm, preferably greater than or equal to 3 nm and less than or equal to 100 nm, and further preferably greater than or equal to 3 nm and less than or equal to 50 nm.

In the case where the oxide semiconductor layer includes an In-M-Zn oxide (M is Al, Ti, Ga, Ge, Y, Zr, La, Ce, Nd, Sn, or Hf), it is preferable that the atomic ratio of metal elements of a sputtering target used for forming a film of the In-M-Zn oxide satisfy In≥M and Zn≥M. As the atomic ratio of the metal elements of such a sputtering target, In:M:Zn=1:1:1, In:M:Zn=1:1:1.2, In:M:Zn=3:1:2, In:M:Zn=1:3:4, In:M:Zn=1:3:6, and the like are given. Note that the atomic ratio of metal elements in the formed oxide semiconductor layer varies from the above atomic ratio of metal elements of the sputtering target within a range of ±40% as an error.

An oxide semiconductor layer with a low carrier density is used as the oxide semiconductor layer. For example, an oxide semiconductor layer whose carrier density is lower than or equal to $1\times10^{17}/cm^3$, preferably lower than or equal to $1\times10^{15}/cm^3$, more preferably lower than or equal to $1\times10^{13}/cm^3$, and still more preferably lower than or equal to $1\times10^{11}/cm^3$ is used as the oxide semiconductor layer.

Note that, without limitation to those described above, a material with an appropriate composition can be used depending on required semiconductor characteristics and electrical characteristics (e.g., field-effect mobility and threshold voltage) of the transistor.

When silicon or carbon that is one of elements belonging to Group 14 is contained in the oxide semiconductor layer, oxygen vacancies are increased in the oxide semiconductor layer, and the oxide semiconductor layer becomes an n-type. Thus, the concentration of silicon or carbon (the concentration is measured by SIMS) in the oxide semiconductor layer is lower than or equal to $2\times10^{18}$ atoms/cm$^3$, preferably lower than or equal to $2\times10^{17}$ atoms/cm$^3$.

Further, the concentration of alkali metal or alkaline earth metal in the oxide semiconductor layer, which is measured by SIMS, is lower than or equal to $1\times10^{18}$ atoms/cm$^3$, preferably lower than or equal to $2\times10^{16}$ atoms/cm$^3$. Alkali metal and alkaline earth metal can potentially generate carriers when bonded to an oxide semiconductor, in which case the off-state current of the transistor can potentially be increased. Therefore, it is preferable to reduce the concentration of alkali metal or alkaline earth metal in the oxide semiconductor layer.

When nitrogen is contained in the oxide semiconductor layer, electrons serving as carriers are generated and the carrier density increases, so that the oxide semiconductor layer easily becomes n-type. Thus, a transistor including an oxide semiconductor that contains nitrogen is likely to be normally-on. For this reason, nitrogen in the oxide semiconductor layer is preferably reduced as much as possible; the concentration of nitrogen which is measured by SIMS is preferably set to, for example, lower than or equal to $5\times10^{18}$ atoms/cm$^3$.

The oxide semiconductor layer may have a non-single-crystal structure, for example. The non-single-crystal structure includes a c-axis aligned crystalline oxide semiconductor (CAAC-OS), a polycrystalline structure, a microcrystalline structure, or an amorphous structure, for example. Among the non-single-crystal structure, the amorphous structure has the highest density of defect states, whereas CAAC-OS has the lowest density of defect states.

The oxide semiconductor layer may have an amorphous structure, for example. An oxide semiconductor layer which has an amorphous structure has a disordered atomic arrangement and no crystalline component, for example. Alternatively, the oxide films having an amorphous structure have, for example, an absolutely amorphous structure and no crystal part.

Note that the oxide semiconductor layer may be a mixed film including two or more of the following: a region having an amorphous structure, a region having a microcrystalline structure, a region having a polycrystalline structure, a region of CAAC-OS, and a region having a single-crystal structure. The mixed film has a single-layer structure including, for example, two or more of a region having an amorphous structure, a region having a microcrystalline structure, a region having a polycrystalline structure, a CAAC-OS region, and a region having a single-crystal structure in some cases. Alternatively, the mixed film may have a layered structure of two or more of a region having an amorphous structure, a region having a microcrystalline structure, a region having a polycrystalline structure, a CAAC-OS region, and a region having a single-crystal structure.

<<Insulating Layer>>

An organic insulating material or an inorganic insulating material can be used as an insulating material that can be used for the insulating layer, the overcoat, the spacer, or the like included in the display device. Examples of an organic insulating material include an acrylic resin, an epoxy resin, a polyimide resin, a polyamide resin, a polyamide-imide resin, a siloxane resin, a benzocyclobutene-based resin, and a phenol resin. Examples of an inorganic insulating film include a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film.

<<Conductive Layer>>

For the conductive layer such as the gate, the source, and the drain of a transistor and the wiring, the electrode, and the like of the display device, a single-layer structure or a layered structure using any of metals such as aluminum, titanium, chromium, nickel, copper, yttrium, zirconium, molybdenum, silver, tantalum, and tungsten, or an alloy containing any of these metals as its main component can be used. For example, a two-layer structure in which a titanium film is stacked over an aluminum film; a two-layer structure in which a titanium film is stacked over a tungsten film; a two-layer structure in which a copper film is stacked over a molybdenum film; a two-layer structure in which a copper film is stacked over an alloy film containing molybdenum and tungsten; a two-layer structure in which a copper film is stacked over an alloy film containing copper, magnesium, and aluminum; a three-layer structure in which titanium film or a titanium nitride film, an aluminum film or a copper film, and a titanium film or a titanium nitride film are stacked in this order; a three-layer structure in which a molybdenum film or a molybdenum nitride film, an aluminum film or a copper film, and a molybdenum film or a molybdenum nitride film are stacked in this order; or the like can be employed. For example, in the case where the conductive layer has a three-layer structure, it is preferable that each of the first and third layers be a film formed of titanium, titanium nitride, molybdenum, tungsten, an alloy containing molybdenum and tungsten, an alloy containing molybdenum and zirconium, or molybdenum nitride, and that the second layer be a film formed of a low-resistance material such as copper, aluminum, gold, silver, or an alloy containing copper and manganese. Note that light-transmitting conductive materials such as ITO, indium oxide containing tungsten oxide, indium zinc oxide containing tungsten oxide, indium oxide containing titanium oxide, indium tin oxide containing titanium oxide, indium zinc oxide, or ITSO may be used.

An oxide conductive layer may be formed by controlling the resistivity of the oxide semiconductor.

<<Adhesive Layer 141>>

A curable resin such as a heat-curable resin, a photocurable resin, or a two-component type curable resin can be used for the adhesive layer 141. For example, an acrylic resin, a urethane resin, an epoxy resin, or a siloxane resin can be used.

<<Connector 242>>

As the connectors 242 and 243, for example, an anisotropic conductive film (ACF) or an anisotropic conductive paste (ACP) can be used.

<<Coloring Layer 131>>

The coloring layer 131 is a colored layer that transmits light in a specific wavelength range. Examples of materials that can be used for the coloring layer 131 include a metal material, a resin material, and a resin material containing a pigment or dye.

<<Light-blocking Layer 132>>

The light-blocking layer 132 is provided, for example, between adjacent coloring layers 131 for different colors. A black matrix formed with, for example, a metal material or a resin material containing a pigment or dye can be used as the light-blocking layer 132. Note that it is preferable to provide the light-blocking layer 132 also in a region other than the display portion 62, such as the driver circuit portion 64, in which case undesired leakage of guided light or the like can be inhibited.

The thin films constituting the display device (i.e., the insulating film, the semiconductor film, the conductive film, and the like) can be formed by any of a sputtering method, a chemical vapor deposition (CVD) method, a vacuum evaporation method, a pulsed laser deposition (PLD) method, an atomic layer deposition (ALD) method, and the like. As examples of the CVD method, a plasma-enhanced CVD (PECVD) method or a thermal CVD method can be given. As an example of the thermal CVD method, a metal organic CVD (MOCVD) method can be given.

Alternatively, the thin films constituting the display device (i.e., the insulating film, the semiconductor film, the conductive film, and the like) can be formed by a method such as spin coating, dipping, spray coating, inkjet printing, dispensing, screen printing, or offset printing, or with a doctor knife, a slit coater, a roll coater, a curtain coater, or a knife coater.

The thin films constituting the display device can be processed using a photolithography method or the like. Alternatively, island-shaped thin films may be formed by a film formation method using a blocking mask. Alternatively, the thin films may be processed by a nano-imprinting method, a sandblasting method, a lift-off method, or the like. Examples of the photolithography method include a method in which a resist mask is formed over a thin film to be processed, the thin film is processed by etching or the like, and the resist mask is removed, and a method in which a photosensitive thin film is formed, and the photosensitive thin film is exposed to light and developed to be processed in a desired shape.

As light used in exposure in a photolithography method, light with an i-line (with a wavelength of 365 nm), light with a g-line (with a wavelength of 436 nm), light with an h-line (with a wavelength of 405 nm), and light in which the i-line, the g-line, and the h-line are mixed can be given. Alternatively, ultraviolet light, KrF laser light, ArF laser light, or the like can be used. Exposure may be performed by liquid immersion exposure technique. As light used in exposure, extreme ultra-violet light (EUV), X-rays, or the like can be given. An electron beam can be used instead of a light used in exposure. It is preferable to use extreme ultra-violet light, X-rays, or an electron beam because extremely minute processing can be performed. Note that when exposure is performed by scanning of a beam such as an electron beam, a photomask is not needed.

For etching of the thin film, dry etching, wet etching, a sandblast method, or the like can be used.

<1-3. Structure Example 3 of Display Device>

Figure 7:
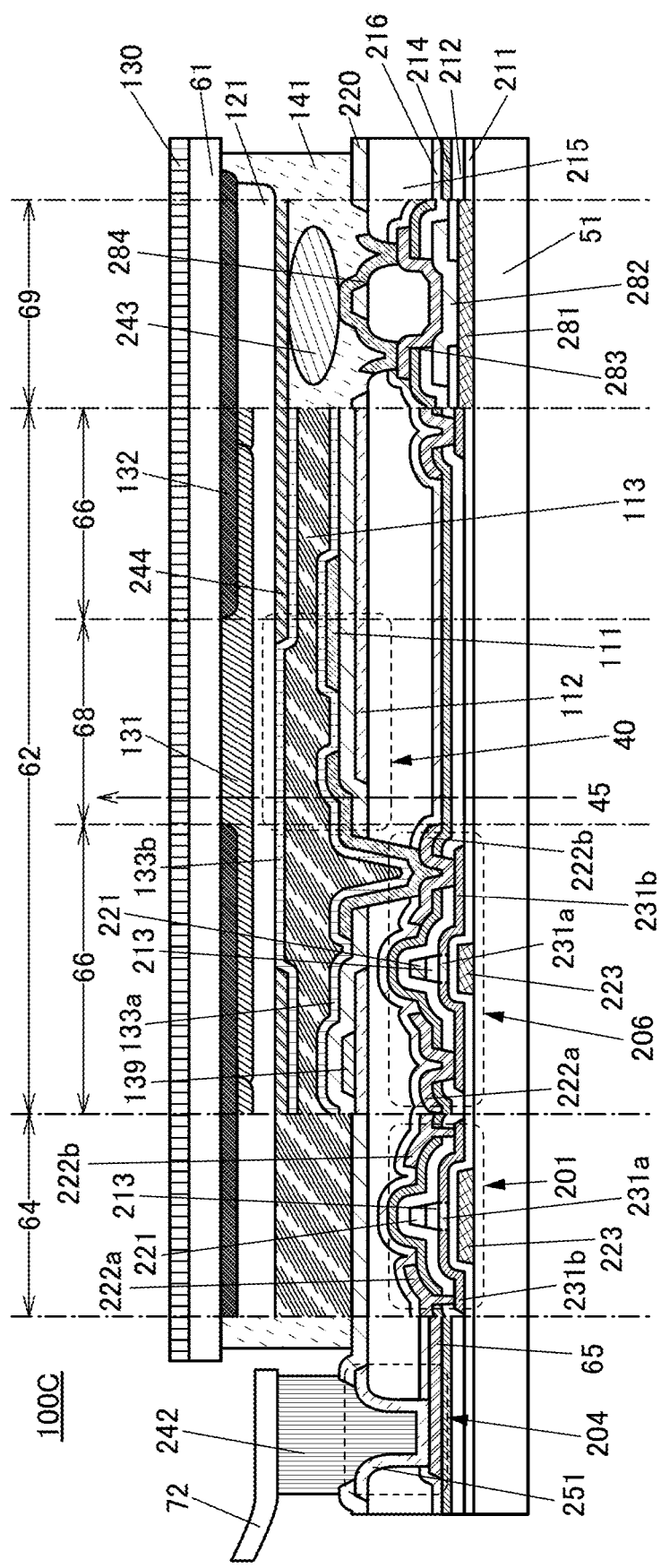
FIG. 7 is a cross-sectional view illustrating an example of a display device.
Figure 10:
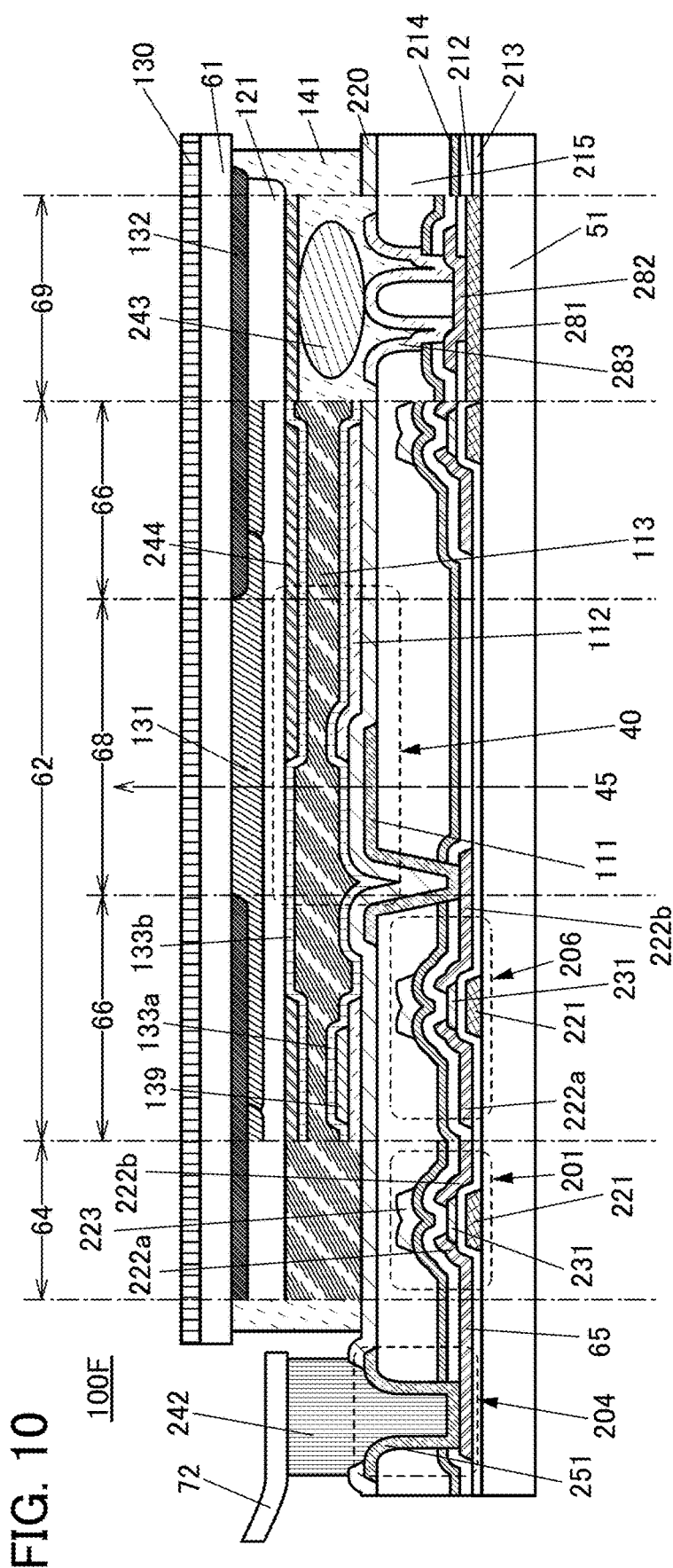
FIG. 10 is a cross-sectional view illustrating an example of a display device.

FIG. 7 to FIG. 10 illustrate examples of the display device. FIG. 7 is a cross-sectional view of a display device 100C, FIG. 8A is a cross-sectional view of a display device 100D, FIG. 9A is a cross-sectional view of a display device 100E, and FIG. 10 is a cross-sectional view of a display device 100F. Note that the perspective views of the display devices 100C, 100D, 100E, and 100F are not drawn here, as they are similar to the perspective view of the display device 100A, which is illustrated in FIG. 3A.

The display device 100C illustrated in FIG. 7 is different from the above-described display device 100A in the positions of the pixel electrode 111 and the first common electrode 112.

In the display device 100A illustrated in FIG. 4A, the alignment film 133a is in contact with the first common electrode 112. In contrast, in the display device 100C illustrated in FIG. 7, the alignment film 133a is in contact with the pixel electrode 111.

The display device 100D illustrated in FIGS. 8A to 8D is different from the display device 100A in the shapes of the pixel electrode 111 and the first common electrode 112.

Both of the pixel electrode 111 and the first common electrode 112 may have a top-surface shape (also referred to as a planar shape) that has a comb-like shape or a top-surface shape that is provided with a slit.

In the display device 100D illustrated in FIGS. 8A to 8D, the pixel electrode 111 and the first common electrode 112 are provided on the same plane.

Alternatively, the electrodes may have a shape in which an edge of a slit in one electrode is aligned with an edge of a slit in the other electrode. The cross-sectional view of this case is shown in FIG. 8B.

Alternatively, the pixel electrode 111 and the first common electrode 112 may have a portion overlapping with each other, when seen from above. The cross-sectional view of this case is shown in FIG. 8C.

Alternatively, the display portion 62 may have a portion where neither the pixel electrode 111 nor the first common electrode 112 is provided, when seen from above. The cross-sectional view of this case is shown in FIG. 8D.

The display device 100E illustrated in FIG. 9A and the display device 100F illustrated in FIG. 10 each are different from the display device 100A in the shapes of the transistors.

In FIG. 9A, each of the transistors 201 and 206 includes the gate 221, the insulating layer 213, the conductive layers 222$a$ and 222$b$, and a semiconductor layer 231.

The gate 221 and the semiconductor layer 231 overlap with the insulating layer 213 positioned therebetween. The insulating layer 213 serves as a gate insulating layer. Each of the conductive layers 222$a$ and 222$b$ has a portion connected to the semiconductor layer 231. One of the conductive layers 222$a$ and 222$b$ serves as a source electrode and the other serves as a drain electrode. The transistors 201 and 206 are covered by the insulating layers 212 and 214.

In FIG. 9A, the pixel electrode 111 is connected to the conductive layer 222$b$. Alternatively, the pixel electrode 111 may be connected to the semiconductor layer 231 as illustrated in FIG. 9B. In that case, a material transmitting visible light, such as an oxide semiconductor, is preferably used for the semiconductor layer 231. This allows the pixel electrode 111 and the connection portion of the transistor to be provided in the display region 68, increasing the aperture ratio of the subpixel and the definition of the display device. Note that the semiconductor layer 231 may be electrically connected to the conductive layer 222$b$. The conductive layer 222$b$ can serve as an auxiliary electrode of the semiconductor layer 231. The transistor does not necessarily include the conductive layer 222$b$.

In FIG. 10, each of the transistors 201 and 206 includes the gate 221, the gate 223, the insulating layers 212 to 214, the conductive layers 222$a$ and 222$b$, and the semiconductor layer 231.

The gate 221 and the semiconductor layer 231 overlap with the insulating layer 213 positioned therebetween. The gate 223 and the semiconductor layer 231 overlap with the insulating layers 212 and 214 positioned therebetween. Each of the insulating layers 212 to 214 serves as a gate insulating layer. Each of the conductive layers 222$a$ and 222$b$ has a portion connected to the semiconductor layer 231. One of the conductive layers 222$a$ and 222$b$ serves as a source electrode and the other serves as a drain electrode. The transistors 201 and 206 are covered by the insulating layer 215. The conductive layer 222$b$ is connected to the pixel electrode 111.

As described above, the display device of one embodiment of the present invention can include transistors and liquid crystal elements with various shapes.

<1-4. Structure Example 4 of Display Device>

One embodiment of the present invention can be applied to a display device in which a touch sensor is implemented; such a display device is also referred to as an input/output device or a touch panel. Any of the structures of the display device described above can be applied to the touch panel. In this embodiment, the description focuses on an example in which the touch sensor is implemented in the display device 100A.

There is no limitation on the sensing element (also referred to as a sensor element) included in the touch panel of one embodiment of the present invention. A variety of sensors capable of sensing an approach or a contact of an object such as a finger or a stylus can be used as the sensor element.

For example, a variety of types such as a capacitive type, a resistive type, a surface acoustic wave type, an infrared type, an optical type, and a pressure-sensitive type can be used for the sensor.

In this embodiment, a touch panel including a capacitive sensor element is described as an example.

Examples of the capacitive touch sensor element include a surface capacitive touch sensor element and a projected capacitive touch sensor element. Examples of the projected capacitive sensor element include a self-capacitive sensor element and a mutual capacitive sensor element. The use of a mutual capacitive sensor element is preferable because multiple points can be sensed simultaneously.

The touch panel of one embodiment of the present invention can have any of a variety of structures, including a structure in which a display device and a sensor element that are separately formed are attached to each other and a structure in which an electrode and the like included in a sensor element are provided on one or both of a substrate supporting a display element and a counter substrate.

Figure 11A:
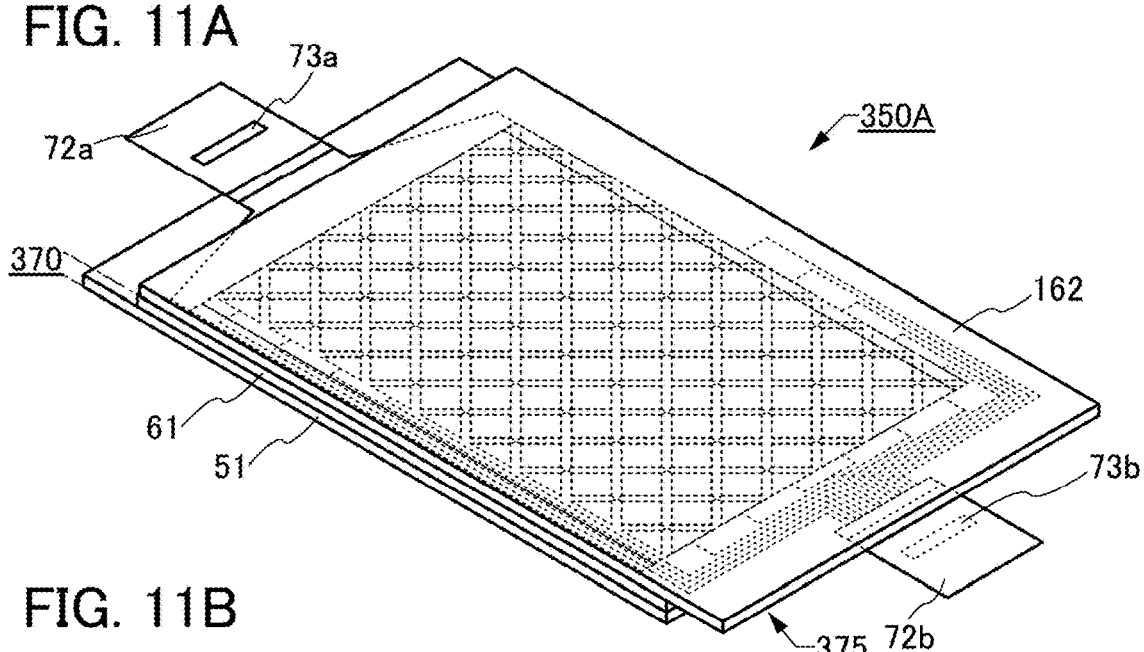
FIGS. 11A and 11B are perspective views illustrating an example of a touch panel.
Figure 11B:
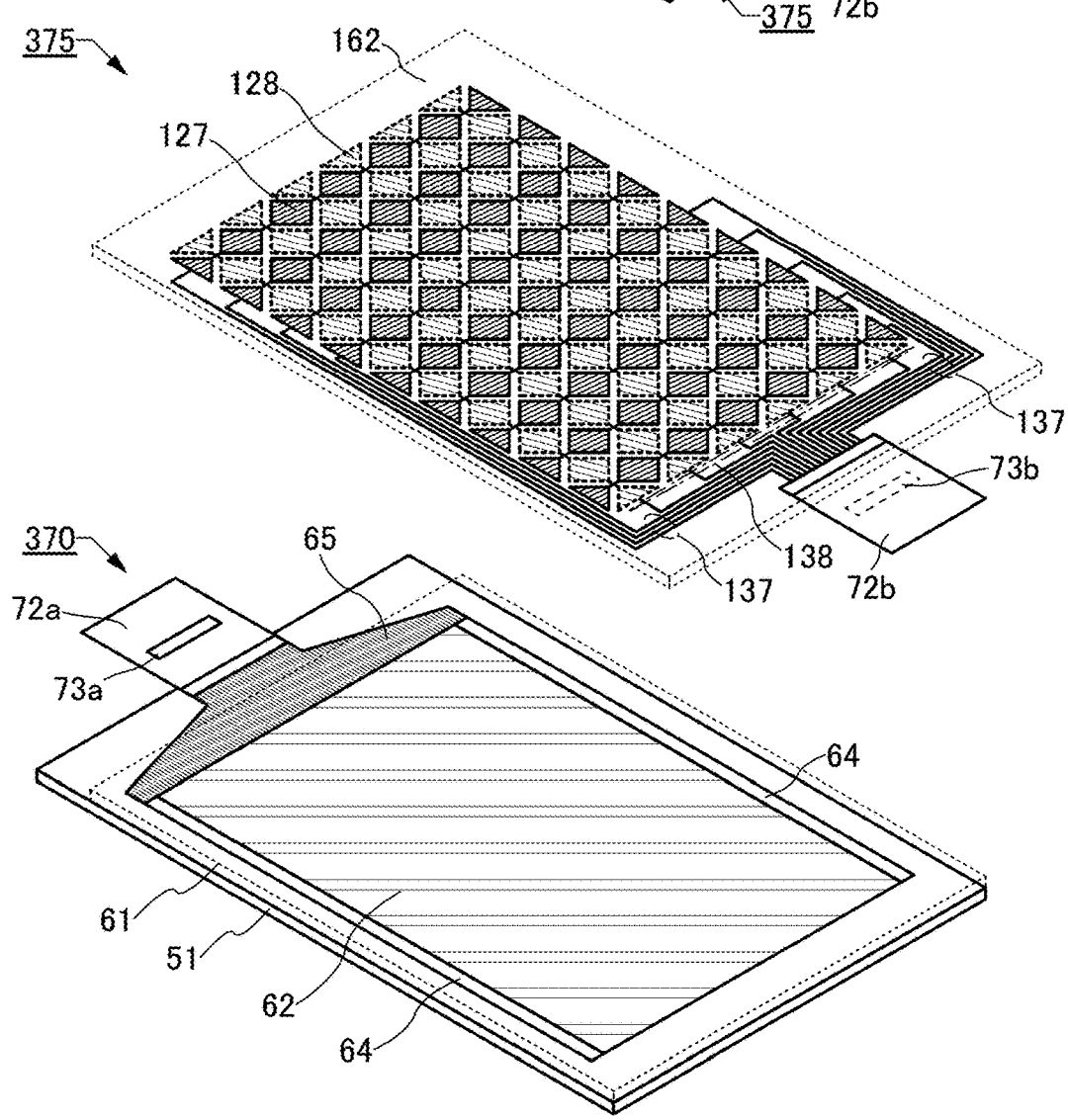
Figure 12:
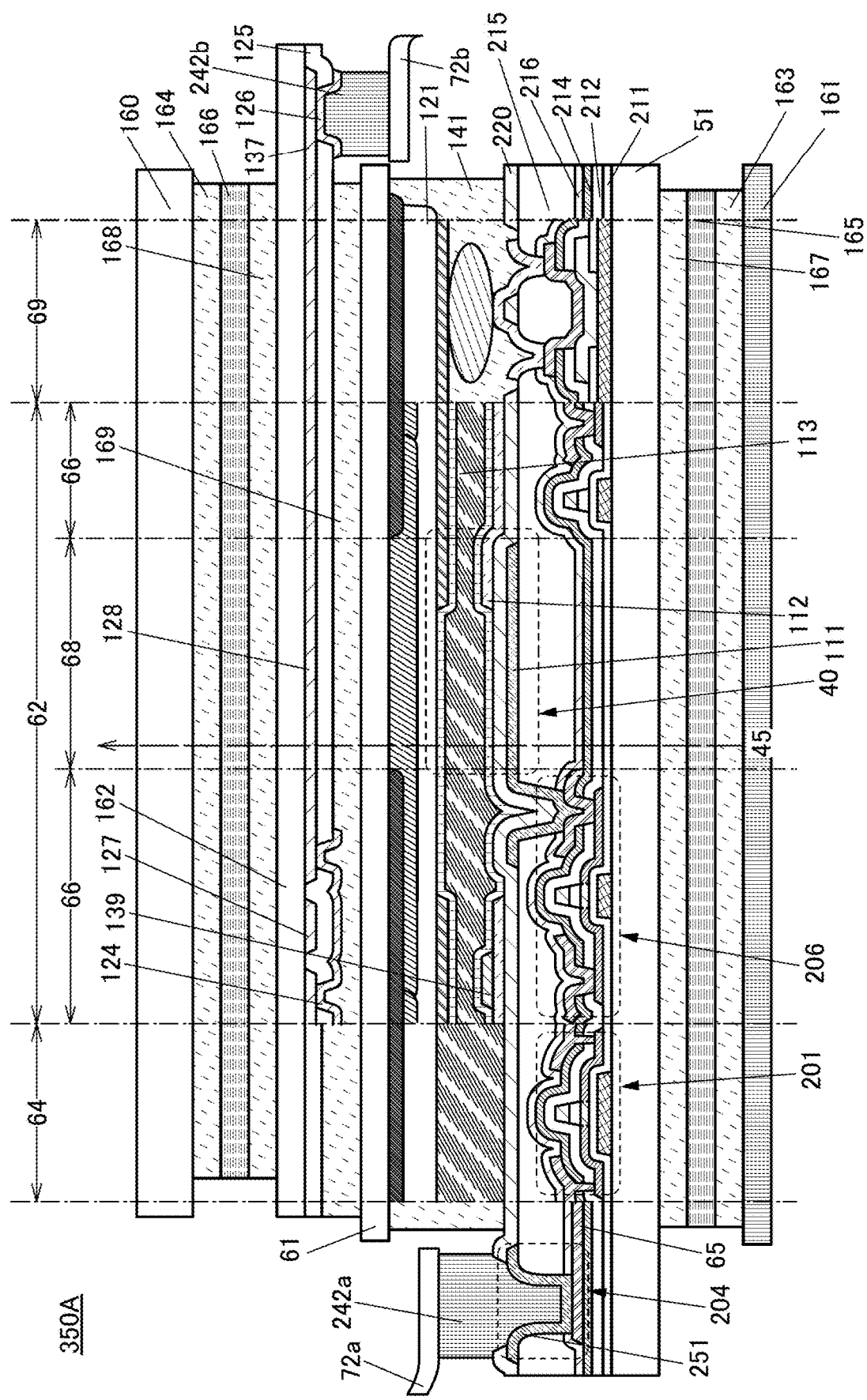
FIG. 12 is a cross-sectional view illustrating an example of a touch panel.

FIGS. 11A and 11B and FIG. 12 illustrate an example of the touch panel. FIG. 11A is a perspective view of a touch panel 350A. FIG. 11B is a developed view of the schematic perspective view of FIG. 11A. Note that for simplicity, FIGS. 11A and 11B illustrate only the major components. In FIG. 11B, the outlines of the substrate 61 and a substrate 162 are illustrated only in dashed lines. FIG. 12 is a cross-sectional view of the touch panel 350A.

The touch panel 350A has a structure in which a display device and a sensor element that are fabricated separately are bonded together.

The touch panel 350A includes an input device 375 and a display device 370 that are provided to overlap with each other.

The input device 375 includes the substrate 162, an electrode 127, an electrode 128, a plurality of wirings 137, and a plurality of wirings 138. An FPC 72$b$ is electrically connected to each of the plurality of wirings 137 and the plurality of wirings 138. An IC 73$b$ is provided on the FPC 72$b$.

The display device 370 includes the substrate 51 and the substrate 61 which are provided to face each other. The display device 370 includes the display portion 62 and the driver circuit portion 64. The wiring 65 and the like are provided over the substrate 51. An FPC 72$a$ is electrically connected to the wiring 65. An IC 73$a$ is provided on the FPC 72$a$.

The wiring 65 supplies signals and power to the display portion 62 and the driver circuit portion 64. The signals and power are input to the wiring 65 from the outside or the IC 73a, through the FPC 72a.

FIG. 12 is a cross-sectional view of the display portion 62, the driver circuit portion 64, a region that includes the FPC 72a, a region that includes the FPC 72b, and the like.

The substrates 51 and 61 are bonded to each other by the adhesive layer 141. The substrates 61 and 162 are bonded to each other by an adhesive layer 169. Here, the layers from the substrate 51 to the substrate 61 correspond to the display device 370. The layers from the substrate 162 to an electrode 124 correspond to the input device 375. That is, the adhesive layer 169 bonds the display device 370 and the input device 375 together.

The structure of the display device 370 illustrated in FIG. 12 is similar to that of the display device 100A illustrated in FIG. 4A; detailed description is omitted here.

A polarizer 165 is bonded to the substrate 51 with an adhesive layer 167. A backlight 161 is bonded to the polarizer 165 with an adhesive layer 163.

A polarizer 166 is bonded to the substrate 162 with an adhesive layer 168. A protection substrate 160 is bonded to the polarizer 166 with an adhesive layer 164. The protection substrate 160 may be used as the substrate that objects such as a finger or a stylus directly contact, when the touch panel 350A is incorporated into an electronic device. A substrate that can be used as the substrates 51 and 61 or the like can be used as the protection substrate 160. A structure where a protective layer is formed on the surface of the substrate that can be used as the substrates 51 and 61 or the like is preferably used for the protection substrate 160. Alternatively, a reinforced glass or the like is preferably used as the protection substrate 160. The protective layer can be formed with a ceramic coating. The protective layer can be formed using an inorganic insulating material such as silicon oxide, aluminum oxide, yttrium oxide, or yttria-stabilized zirconia (YSZ).

The polarizer 166 may be provided between the input device 375 and the display device 370. In that case, the protection substrate 160, the adhesive layer 164, and the adhesive layer 168 that are illustrated in FIG. 12 are not necessarily provided. In other words, the substrate 162 can be positioned on the outermost surface of the touch panel 350A. The above-described material that can be used for the protection substrate 160 is preferably used for the substrate 162.

The electrodes 127 and 128 are provided on a surface of the substrate 162 that faces the substrate 61. The electrodes 127 and 128 are formed on the same plane. An insulating layer 125 is provided to cover the electrodes 127 and 128. The electrode 124 is electrically connected to two of the electrodes 128 that are provided on both sides of the electrode 127, through an opening provided in the insulating layer 125.

In the conductive layers included in the input device 375, the conductive layers (e.g., the electrodes 127 and 128) that overlap with the display region 68 are formed using a material that transmits visible light.

The wiring 137 that is obtained by processing the same conductive layer as the electrodes 127 and 128 is connected to a conductive layer 126 that is obtained by processing the same conductive layer as the electrode 124. The conductive layer 126 is electrically connected to the FPC 72b through a connector 242b.

Next, an example of a driving method of an input device (touch sensor) that can be applied to the display device of one embodiment of the present invention is described with reference to FIGS. 13A and 13B.

Figure 13A:
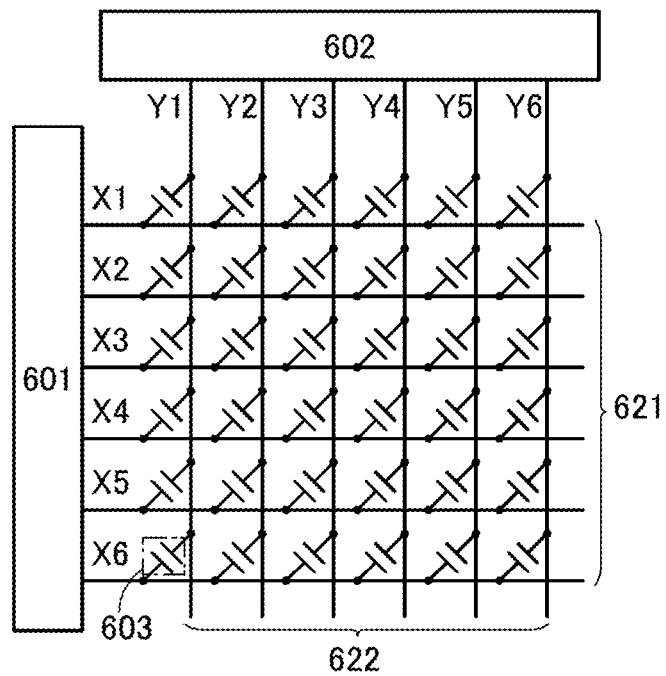
FIGS. 13A and 13B illustrate an example of an input device and an example of a method for driving the input device.

FIG. 13A is a block diagram illustrating the structure of a mutual capacitive touch sensor. FIG. 13A illustrates a pulse voltage output circuit 601 and a current sensing circuit 602. In FIG. 13A, six wirings X1 to X6 represent electrodes 621 to which a pulse is applied, and six wirings Y1 to Y6 represent electrodes 622 that sense changes in current. The number of such electrodes is not limited to those illustrated in this example. FIG. 13A also illustrates a capacitor 603 that is formed by the overlap of the electrodes 621 and 622, or by the close arrangement of the electrodes 621 and 622. Note that the functions of the electrodes 621 and 622 may change places with each other.

For example, the electrode 127 corresponds to one of the electrode 621 or the electrode 622, and the electrode 128 corresponds to the other of the electrode 621 or the electrode 622.

The pulse voltage output circuit 601 is, for example, a circuit for sequentially inputting a pulse voltage to the wirings X1 to X6. The current sensing circuit 602 is, for example, a circuit for sensing current flowing through each of the wirings Y1 to Y6.

An application of a pulse voltage to one of the wirings X1 to X6 generates an electric field between the electrodes 621 and 622 of the capacitor 603, and current flows through the electrode 622. Part of the electric field generated between the electrodes is blocked when an object such a finger or a stylus approaches or contacts the device, so that the electric field intensity between the electrodes is changed. Consequently, the amount of current flowing through the electrode 622 is changed.

For example, in the case where there is no approach or no contact of an object, the amount of current flowing in each of the wirings Y1 to Y6 depends on the capacitance of the capacitor 603. In the case where part of an electric field is blocked by the approach or contact of an object, a decrease in the amount of current flowing in the wirings Y1 to Y6 is sensed. The approach or contact of an object can be detected by utilizing this change.

The current sensing circuit 602 may sense an integral value (time integral value) of current flowing in a wiring. In that case, for example, an integrator circuit can be used. Alternatively, the peak value of current may be sensed. In that case, for example, current may be converted into voltage, and the peak voltage value may be sensed.

Figure 13B:
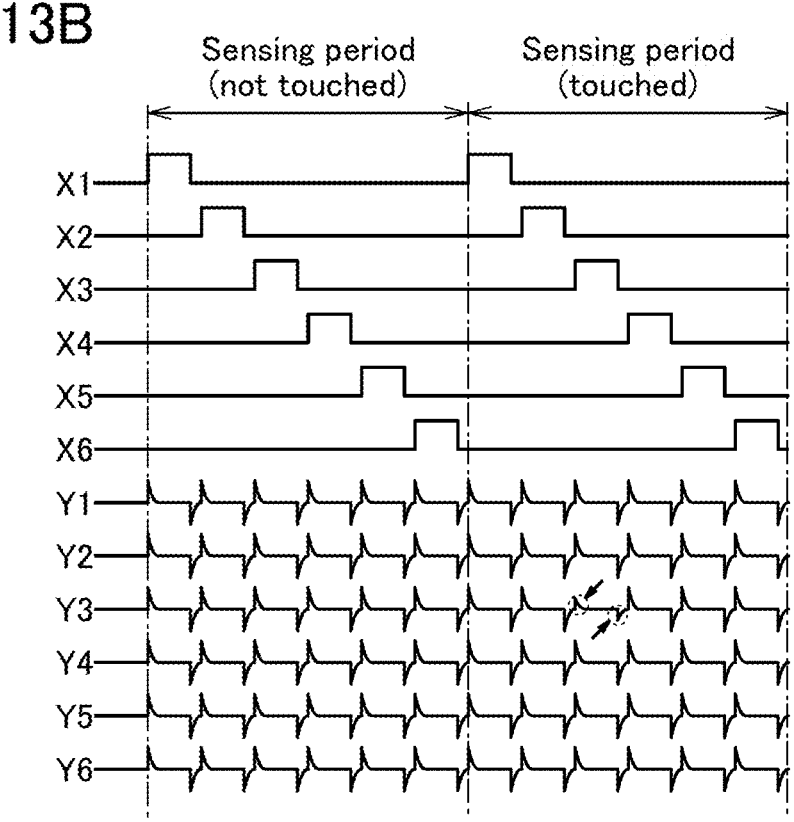

FIG. 13B is an example of a timing chart illustrating input and output waveforms in the mutual capacitive touch sensor in FIG. 13A. In FIG. 13B, sensing in each row and each column is performed in one sensing period. FIG. 13B shows a period when the approach or contact of an object is not detected (when the touch sensor is not touched) and a period when the approach or contact of an object is detected (when the touch sensor is touched). Here, the wirings Y1 to Y6 each show a waveform of a voltage corresponding to the amount of current to be sensed.

As shown in FIG. 13B, the wirings X1 to X6 are sequentially supplied with a pulse voltage. Accordingly, current flows in the wirings Y1 to Y6. When the touch sensor is not touched, substantially the same current flows in the wirings Y1 to Y6 in accordance with a change in voltages of the wirings X1 to X6; thus, the wirings Y1 to Y6 have similar output waveforms. Meanwhile, when the touch sensor is touched, current flowing in a wiring in a position which an object contacts or approaches among the wirings Y1 to Y6 is reduced; thus, the output waveforms are changed as illustrated in FIG. 13B.

FIG. 13B shows an example in which an object contacts or approaches the intersection of the wiring X3 and the wiring Y3 or the vicinity thereof.

A mutual capacitive touch sensor senses a change in current which occurs due to an electric field generated between a pair of electrodes being blocked; the mutual capacitive touch sensor can obtain positional information of an object in this manner. When the sensing sensitivity is high, the coordinates of the object can be determined even when the object is far from a detection surface (e.g., a surface of the touch panel).

By driving a touch panel by a method in which a display period of a display portion and a sensing period of a touch sensor do not overlap with each other, the detection sensitivity of the touch sensor can be increased. For example, a display period and a sensing period may be separately provided in one display frame period. In that case, two or more sensing periods are preferably provided in one frame period. When the sensing frequency is increased, the detection sensitivity can be further increased.

It is preferable that, as an example, the pulse voltage output circuit 601 and the current sensing circuit 602 be formed in an IC chip. For example, the IC is preferably mounted on a touch panel or a substrate in a housing of an electronic device. In the case where the touch panel has flexibility, parasitic capacitance can potentially be increased in a bent portion of the touch panel, and the influence of noise can potentially be increased. In view of this, an IC with a driving method less influenced by noise is preferably used. For example, it is preferable to use an IC to which a driving method capable of increasing a signal-noise ratio (S/N ratio) is applied.

<1-5. Structure Example 5 of Display Device>

Figure 14A:
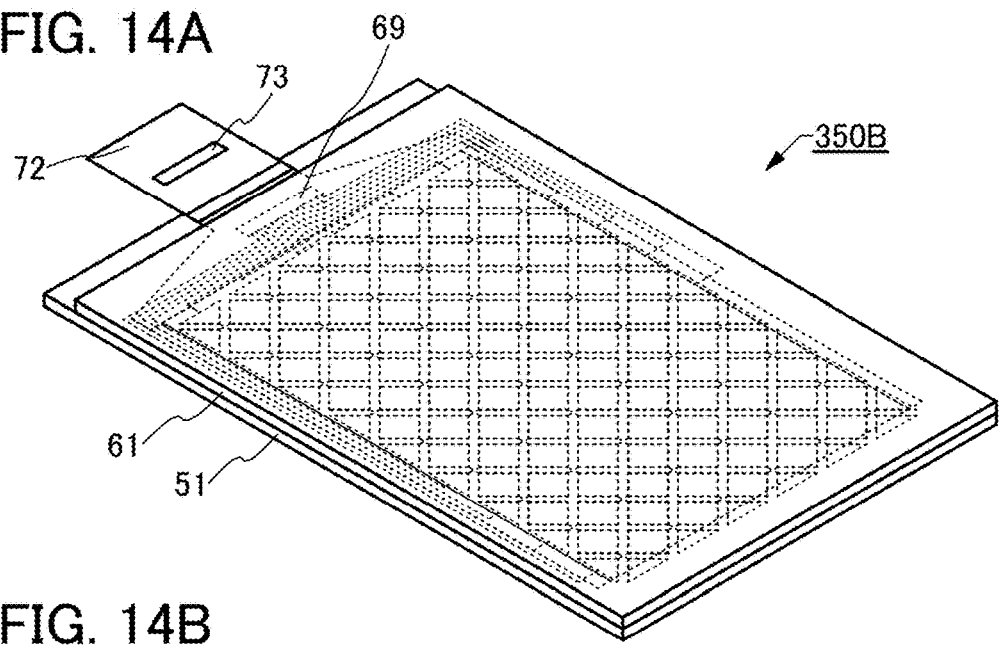
FIGS. 14A and 14B are perspective views illustrating an example of a touch panel.
Figure 14B:
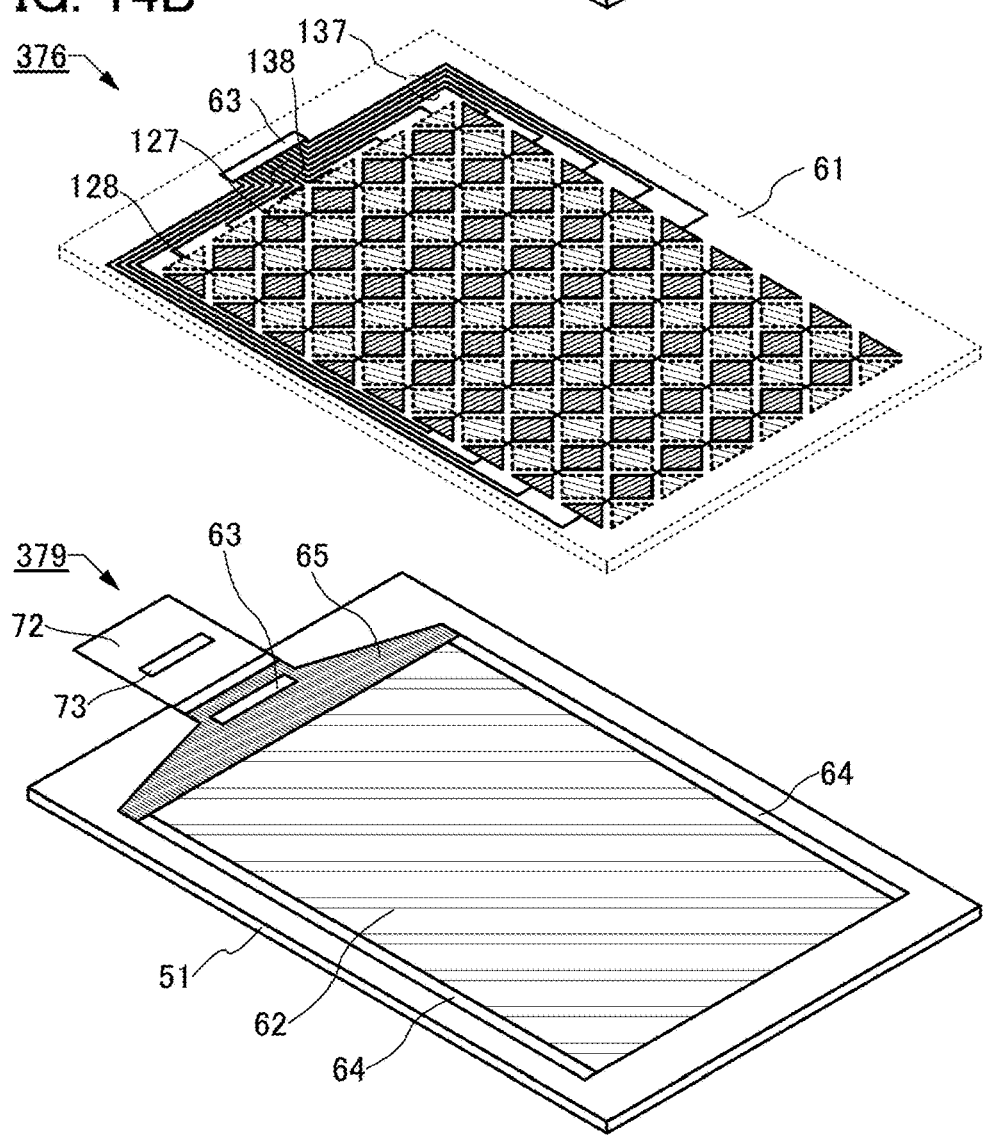
Figure 15:
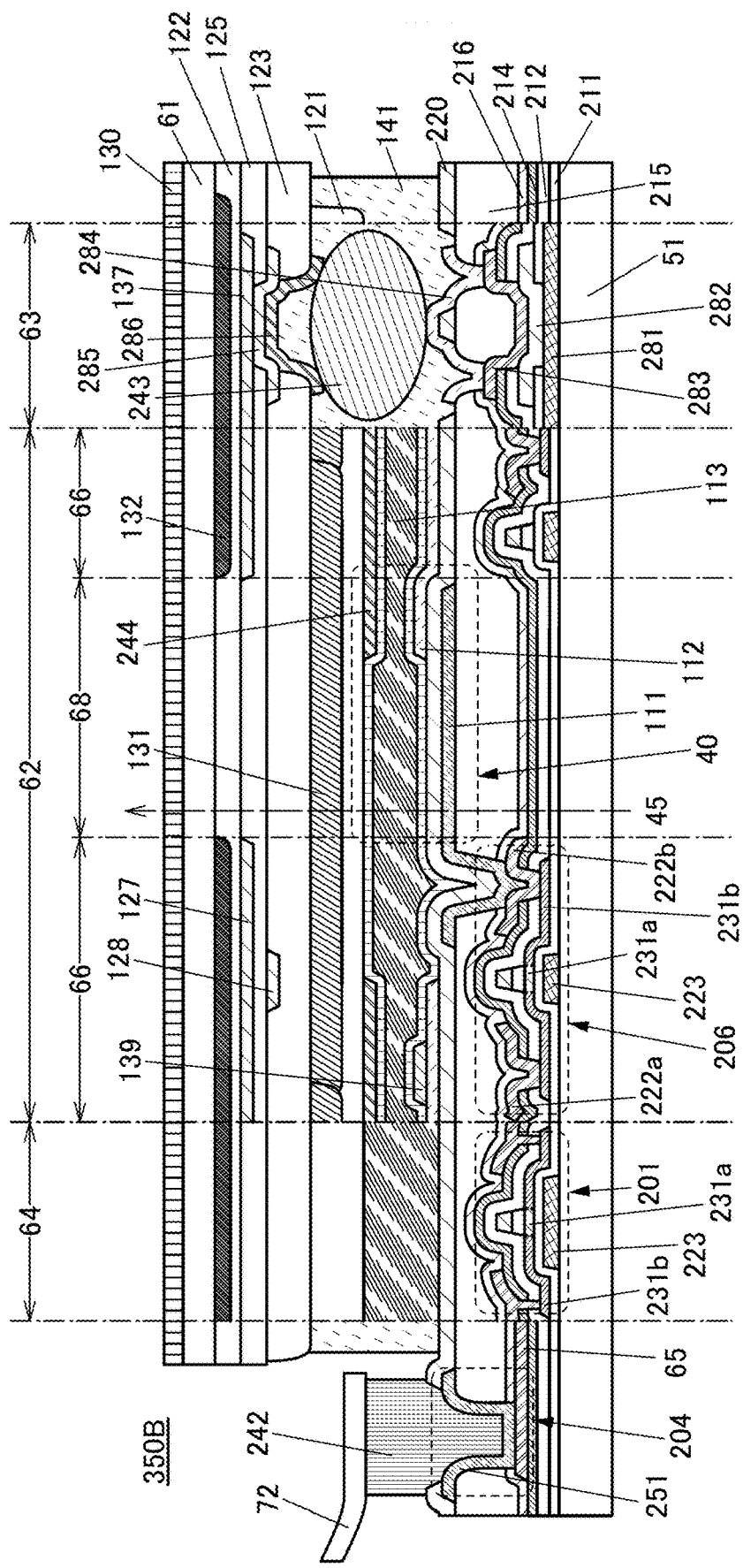
FIG. 15 is a cross-sectional view illustrating an example of a touch panel.

Examples of the touch panel are illustrated in FIGS. 14A to 14C and FIG. 15. FIG. 14A is a perspective view of a touch panel 350B. FIG. 14B is a developed view of the schematic perspective view of FIG. 14A. Note that for simplicity, FIGS. 14A and 14B illustrate only the major components. In FIG. 14B, the outlines of the substrate 61 are illustrated only in dashed lines. FIG. 15 is a cross-sectional view of the touch panel 350B.

The touch panel 350B is an in-cell touch panel that has a function of displaying an image and serves as a touch sensor.

The touch panel 350B has a structure in which electrodes constituting a sensor element and the like are provided only on the counter substrate. Such a structure can make the touch panel thinner and more lightweight or reduce the number of components within the touch panel, compared with a structure in which the display device and the sensor element are fabricated separately and then are bonded together.

In FIGS. 14A and 14B, an input device 376 is provided on the substrate 61. The wirings 137 and 138 and the like of the input device 376 are electrically connected to the FPC 72 included in a display device 379.

With the above structure, the FPCs connected to the touch panel 350B can be provided only on one substrate side (on the substrate 51 side in this embodiment). Although two or more FPCs may be attached to the touch panel 350B, it is preferable that the touch panel 350B be provided with one FPC 72 which has a function of supplying signals to both the display device 379 and the input device 376 as illustrated in FIGS. 14A and 14B, for the simplicity of the structure.

The IC 73 may include a function of driving the input device 376. Another IC that drives the input device 376 may be provided over the FPC 72. Alternatively, an IC that drives the input device 376 may be mounted on the substrate 51.

FIG. 15 is a cross-sectional view including a region that includes the FPC 72, a connection portion 63, the driver circuit portion 64, and the display portion 62, each of which is illustrated in FIG. 14A.

In the connection portion 63, one of the wiring 137 (or the wiring 138) and one of the conductive layers provided on the substrate 51 side are electrically connected through the connector 243.

Figure 16:
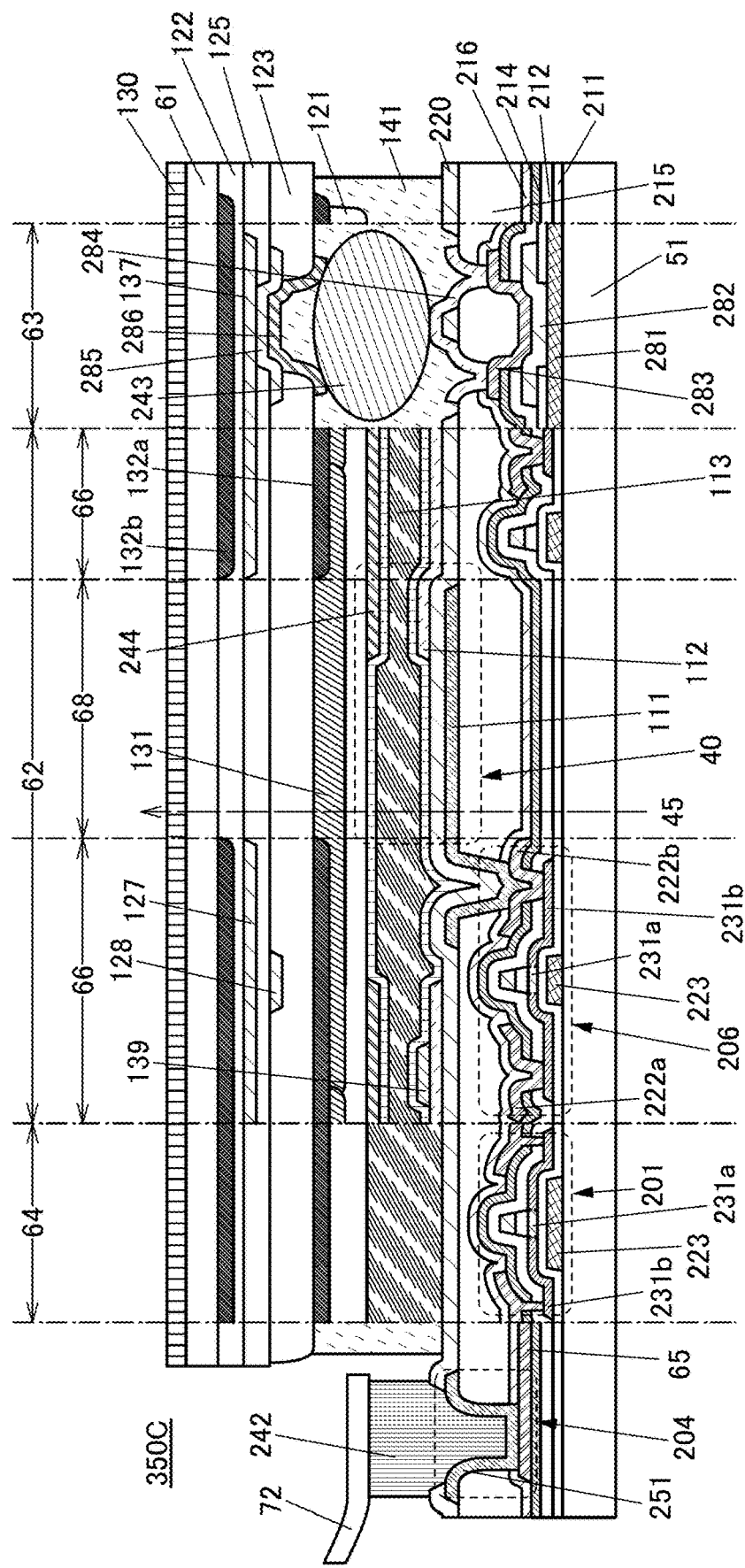
FIG. 16 is a cross-sectional view illustrating an example of a touch panel.

The light-blocking layer 132 is provided in contact with the substrate 61, thereby preventing the conductive layers used in the touch sensor from being seen by a user. The light-blocking layer 132 is covered by an insulating layer 122. The electrode 127 is provided between the insulating layer 122 and the insulating layer 125. The electrode 128 is provided between the insulating layer 125 and the insulating layer 123. The electrodes 127 and 128 can be formed using a metal or an alloy. The coloring layer 131 is provided in contact with the insulating layer 123. Note that as illustrated in FIG. 16, a light-blocking layer 132a may be provided in contact with the insulating layer 123 in addition to a light-blocking layer 132b that is in contact with the substrate 61.

The wiring 137 that is obtained by processing the same conductive layer as the electrode 127 is connected to a conductive layer 285 that is obtained by processing the same conductive layer as the electrode 128. The conductive layer 285 is connected to the conductive layer 286 that is obtained by processing the same conductive layer as the second common electrode 244. The conductive layer 286 is electrically connected to the conductive layer 284 through the connector 243.

The touch panel 350B is supplied with a signal for driving a pixel and a signal for driving a sensor element from one FPC. Thus, the touch panel 350B can easily be incorporated into an electronic device and allows a reduction in the number of components.

<1-6. Structure Example of Touch Sensor>

A structure example of the input device (touch sensor) will be described below.

Figure 17A:
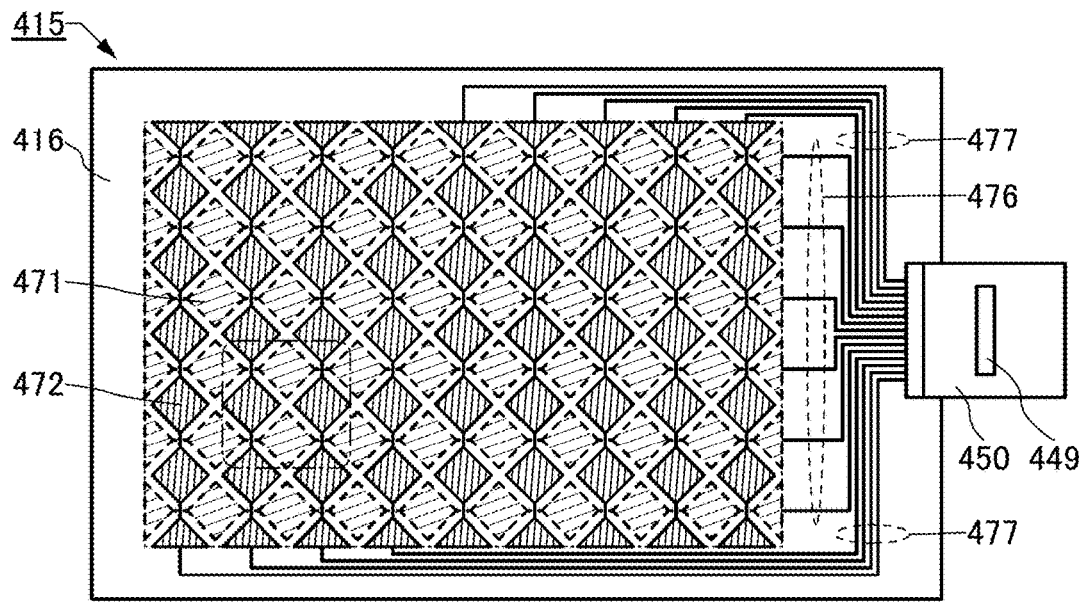
FIGS. 17A to 17D are top views illustrating examples of an input device.

FIG. 17A is a top view of an input device 415. The input device 415 includes a plurality of electrodes 471, a plurality of electrodes 472, a plurality of wirings 476, and a plurality of wirings 477 over a substrate 416. The substrate 416 is provided with an FPC 450 that is electrically connected to each of a plurality of wirings 476 and a plurality of wirings 477. FIG. 17A illustrates an example in which an IC 449 is provided on the FPC 450.

Figure 17B:
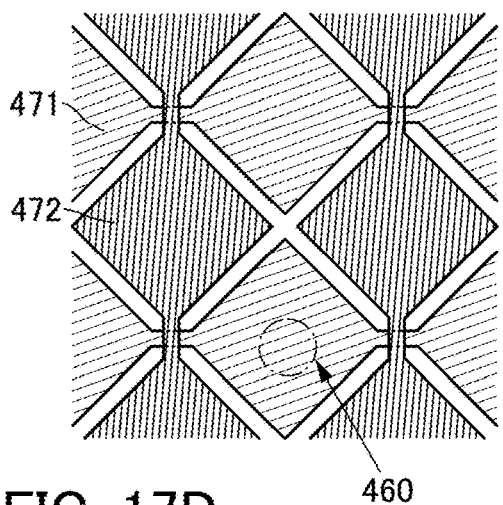

FIG. 17B is an enlarged view of a region surrounded by a dashed-dotted line in FIG. 17A. The electrodes 471 are in the form of a row of rhombic electrode patterns arranged in a lateral direction. The row of rhombic electrode patterns are electrically connected to each other. The electrodes 472 are also in the form of a row of rhombic electrode patterns arranged in a longitudinal direction, and the row of rhombic electrode patterns are electrically connected. Part of the electrodes 471 and part of the electrodes 472 overlap and intersect with each other. At this intersection portion, an insulator is sandwiched between the electrodes 471 and the electrodes 472 in order to avoid an electrical short-circuit therebetween.

Figure 17C:
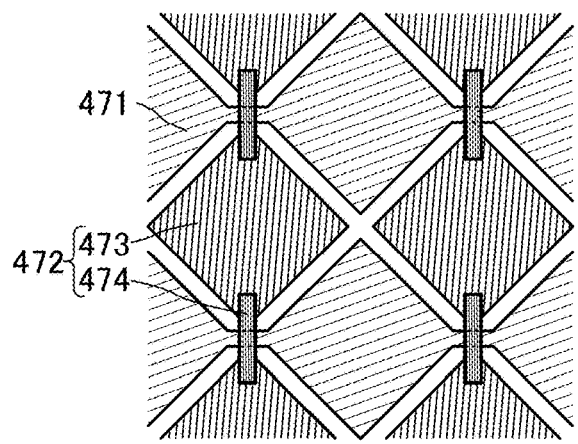

As illustrated in FIG. 17C, the electrodes 472 may include a plurality of island-shaped rhombic electrodes 473 and bridge electrodes 474. The island-shaped rhombic electrodes 473 are arranged in the longitudinal direction, and two adjacent electrodes 473 are electrically connected to each other by the bridge electrode 474. With such a structure, the electrodes 473 and the electrodes 471 can be formed at the same time by processing the same conductive film. This can prevent variations in the thickness of these electrodes, and can prevent the resistance value and the light transmittance of each electrode from varying from place to place. Note that although the electrodes 472 include the bridge electrodes 474 here, the electrodes 471 may have such a structure.

Figure 17D:
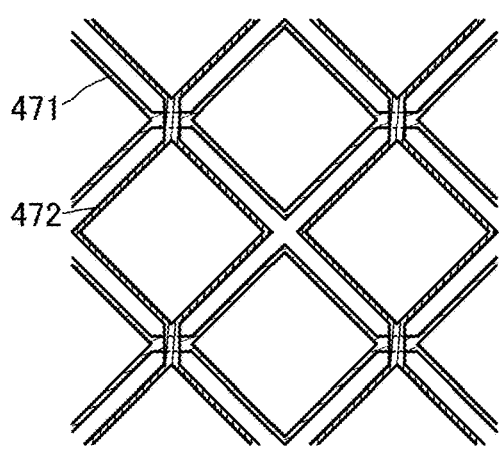

As illustrated in FIG. 17D, a design in which rhombic electrode patterns of the electrodes 471 and 472 illustrated in FIG. 17B are hollowed out and only edge portions are left may be used. In that case, when the electrodes 471 and 472 are narrow enough to be invisible to the users, the electrodes 471 and 472 can be formed using a light-blocking material such as a metal or an alloy, as will be described later. In addition, either the electrodes 471 or the electrodes 472 illustrated in FIG. 17D may include the above bridge electrodes 474.

One of the electrodes 471 is electrically connected to one of the wirings 476. One of the electrodes 472 is electrically connected to one of the wirings 477. Here, either one of the electrodes 471 and 472 corresponds to a row wiring, and the other corresponds to a column wiring.

The IC 449 has a function of driving the touch sensor. A signal output from the IC 449 is supplied to either of the electrodes 471 and 472 through the wirings 476 or 477. A current (or a potential) flowing to either of the electrodes 471 and 472 is input to the IC 449 through the wirings 476 or 477. The IC 449 is mounted on the FPC 450 in this example; alternatively, the IC 449 may be mounted on the substrate 416.

When the input device 415 overlaps with a display screen of the display panel, a light-transmitting conductive material is preferably used for the electrodes 471 and 472. In the case where a light-transmitting conductive material is used for the electrodes 471 and 472 and light from the display panel is extracted through the electrodes 471 or 472, it is preferable that a conductive film containing the same conductive material be arranged between the electrodes 471 and 472 as a dummy pattern. Part of a space between the electrodes 471 and 472 is filled with the dummy pattern, which can reduce variations in light transmittance. As a result, unevenness in luminance of light transmitted through the input device 415 can be reduced.

As the light-transmitting conductive material, a conductive oxide such as indium oxide, indium tin oxide, indium zinc oxide, zinc oxide, or zinc oxide containing gallium can be used. Note that a film containing graphene may be used as well. The film containing graphene can be formed, for example, by reducing a film containing graphene oxide. As a reducing method, a method with application of heat or the like can be employed.

Alternatively, a metal film or an alloy film that is thin enough to have a light-transmitting property can be used. For example, a metal such as gold, silver, platinum, magnesium, nickel, tungsten, chromium, molybdenum, iron, cobalt, copper, palladium, or titanium, or an alloy containing any of these metals can be used. Alternatively, a nitride of the metal or the alloy (e.g., titanium nitride) or the like may be used. Alternatively, a layered film in which two or more of conductive films containing the above materials are stacked may be used.

For the electrodes 471 and 472, a conductive film that is processed to be thin enough to be invisible to the users may be used. Such a conductive film is processed into a lattice shape (a mesh shape), for example, which makes it possible to achieve both high conductivity and high visibility of the display device. It is preferable that the conductive film have a portion with a width greater than or equal to 30 nm and less than or equal to 100 µm, preferably greater than or equal to 50 nm and less than or equal to 50 µm, and further preferably greater than or equal to 50 nm and less than or equal to 20 µm. In particular, the conductive film preferably has a pattern width of 10 µm or less, which is hardly visible to the users.

As examples, enlarged schematic views of a region 460 in FIG. 17B are illustrated in FIGS. 18A to 18D.

Figure 18A:
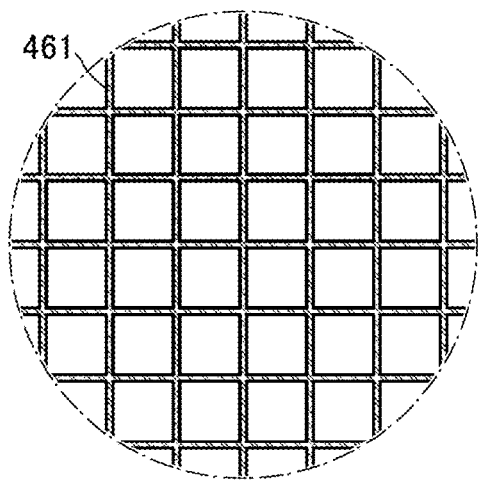
FIGS. 18A to 18E are top views illustrating examples of an input device.

FIG. 18A illustrates an example where a lattice-shape conductive film 461 is used. The conductive film 461 is preferably placed so as not to overlap with the display element included in the display device because light from the display element is not blocked. In that case, it is preferable that the direction of the lattice be the same as the direction of the display element arrangement and that the pitch of the lattice be an integer multiple of the pitch of the display element arrangement.

Figure 18B:
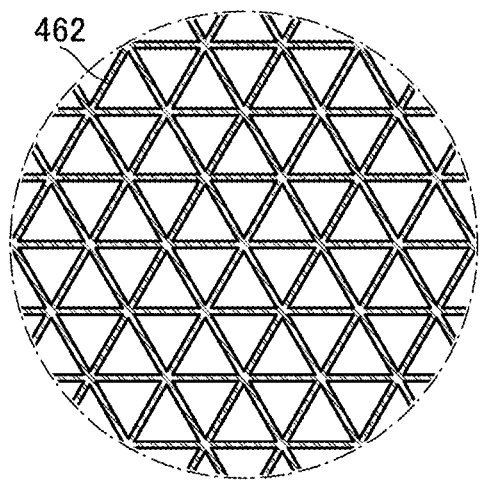

FIG. 18B illustrates an example of a lattice-shape conductive film 462, which is processed so as to be provided with triangle openings. Such a structure makes it possible to further reduce the resistance compared with the structure illustrated in FIG. 18A.

Figure 18C:
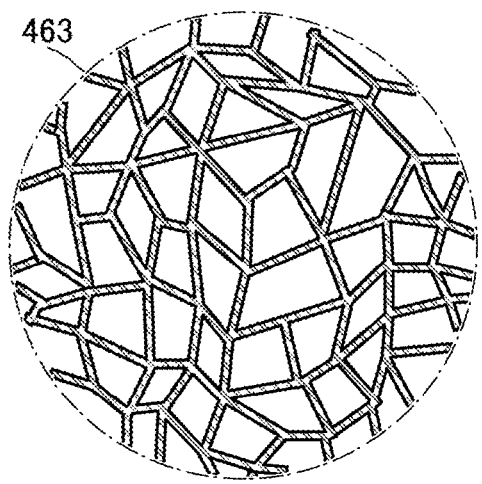

Alternatively, a conductive film 463, which has an irregular pattern shape, may be used as illustrated in FIG. 18C. Such a structure can prevent generation of moire when overlapping with the display portion of the display device.

Figure 18D:
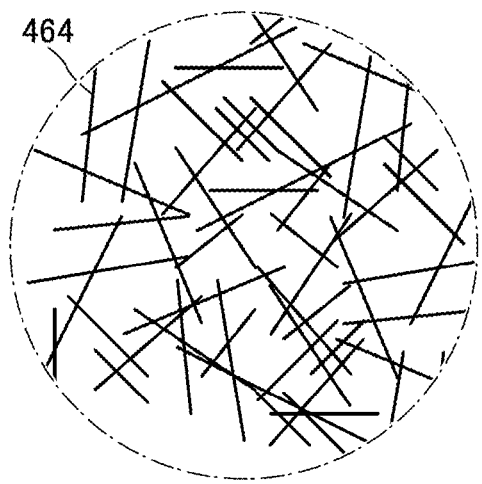

Conductive nanowires may be used for the electrodes 471 and 472. FIG. 18D illustrates an example of using nanowires 464. The nanowires 464 are dispersed at appropriate density so as to be in contact with the adjacent nanowires, which can form a two-dimensional network; the nanowires 464 can function as a conductive film with extremely high light-transmitting property. For example, nanowires that have a mean diameter of greater than or equal to 1 nm and less than or equal to 100 nm, preferably greater than or equal to 5 nm and less than or equal to 50 nm, and further preferably greater than or equal to 5 nm and less than or equal to 25 nm, can be used. As the nanowire 464, a metal nanowire such as an Ag nanowire, a Cu nanowire, or an Al nanowire, a carbon nanotube, or the like can be used. In the case of using an Ag nanowire, a light transmittance of 89% or more and a sheet resistance of 40 ohms per square or more and 100 ohms per square or less can be achieved.

Figure 18E:
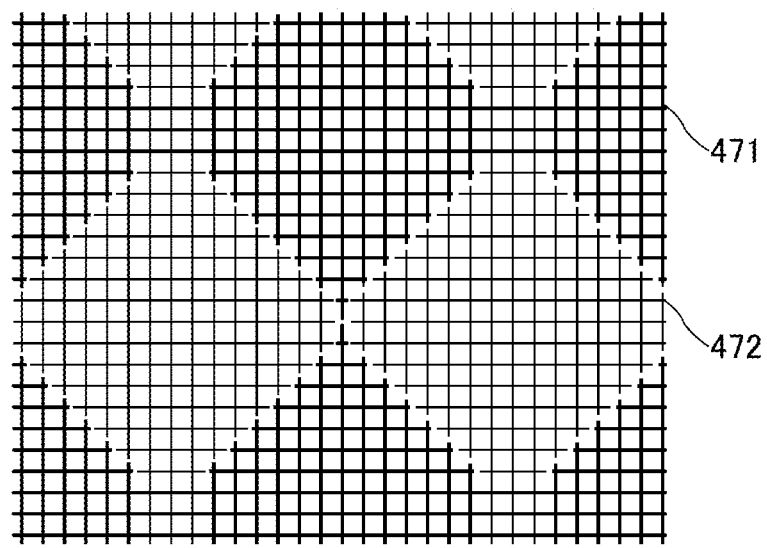

FIG. 18E illustrates a more specific structure example of the electrodes 471 and 472 in FIG. 17B. FIG. 18E shows an example in which a lattice-shape conductive film is used for each of the electrodes 471 and 472.

Although examples in which a plurality of rhombuses are aligned in one direction are shown in FIG. 17A and the like as top surface shapes of the electrodes 471 and 472, the shapes of the electrodes 471 and 472 are not limited thereto and can have various top surface shapes such as a belt shape (a rectangular shape), a belt shape having a curve, and a zigzag shape. In addition, although the above shows the electrodes 471 and 472 are arranged to be perpendicular to each other, they are not necessarily arranged to be perpendicular and the angle formed by two of the electrodes may be less than 90°.

<1-7. Structure Example 6 of Display Device>

An example of the touch panel is illustrated in FIG. 19. FIG. 19 is a cross-sectional view of a touch panel 350D.

The touch panel 350D is an in-cell touch panel that has a function of displaying an image and serves as a touch sensor.

The touch panel 350D has a structure in which electrodes constituting a sensor element and the like are provided only on a substrate that supports a display element. Such a structure can make the touch panel thinner and more lightweight or reduce the number of components within the touch panel, compared with a structure in which the display device and the sensor element are fabricated separately and then are bonded together or a structure in which the sensor element is fabricated on the counter substrate side.

The touch panel 350D illustrated in FIG. 19 is different from the display device 100A described above in the layout of the common electrode and the auxiliary wiring 139.

A plurality of auxiliary wirings 139 are electrically connected to the first common electrode 112a or the first common electrode 112b.

The touch panel 350D illustrated in FIG. 19 is capable of sensing an approach or a contact or the like of an object utilizing the capacitance formed between the first common electrode 112a and the first common electrode 112b. That is, in the touch panel 350D, the first common electrodes 112a and 112b serve as both the common electrode of the liquid crystal element and the electrode of the sensor element.

As described above, an electrode of the liquid crystal element also serves as an electrode of the sensor element in the touch panel of one embodiment of the present invention; thus, the manufacturing process can be simplified and the manufacturing cost can be reduced. Furthermore, the touch panel can be made thin and lightweight.

The common electrode is electrically connected to the auxiliary wiring 139. By providing the auxiliary wiring 139, the resistance of the electrodes of the sensor element can be reduced. As the resistance of the electrodes of the sensor element is reduced, the time constant of the electrode of the sensor element can be made small. When the time constant of the electrode of the sensor element is smaller, the detection sensitivity can be increased, which enables an increase in detection accuracy.

For example, the time constant of the electrode of the sensor element is greater than 0 seconds and less than or equal to $1\times10^{-4}$ seconds, preferably greater than 0 seconds and less than or equal to $5\times10^{-5}$ seconds, further preferably greater than 0 seconds and less than or equal to $5\times10^{-6}$ seconds, further preferably greater than 0 seconds and less than or equal to $5\times10^{-7}$ seconds, and further preferably greater than 0 seconds and less than or equal to $2\times10^{-7}$ seconds. In particular, when the time constant is smaller than or equal to $1\times10^{-6}$ seconds, high detection sensitivity can be achieved while the influence of noise is reduced.

The signal for driving a pixel and the signal for driving a sensor element are supplied to the touch panel 350D by one FPC. Thus, the touch panel 350D can easily be incorporated into an electronic device and allows a reduction in the number of components.

An example of the operation method of the touch panel 350D and the like will be described below.

Figure 20A:
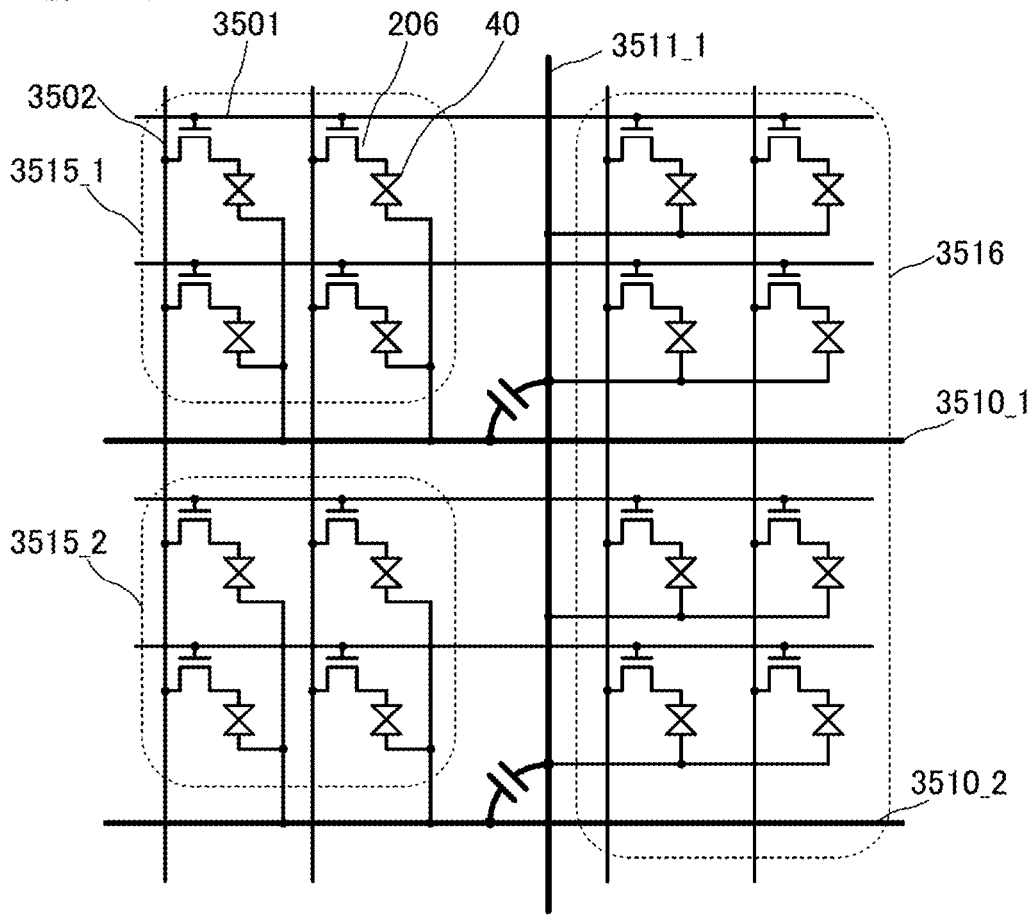
FIGS. 20A and 20B illustrate examples of a sensor element and a pixel.

FIG. 20A is an equivalent circuit diagram of part of a pixel circuit provided in the display portion 62 of the touch panel 350D.

Each pixel (subpixel) includes at least the transistor 206 and the liquid crystal element 40. The gate of the transistor 206 is electrically connected to a wiring 3501. One of the source and the drain of the transistor 206 is electrically connected to a wiring 3502.

The pixel circuit includes a plurality of wirings extending in the X direction (e.g., a wiring 3510_1 and a wiring 3510_2) and a plurality of wirings extending in the Y direction (e.g., a wiring 3511_1). They are provided to intersect with each other, and capacitance is formed therebetween.

Among the pixels provided in the pixel circuit, electrodes of the liquid crystal elements of some pixels adjacent to each other are electrically connected to each other to form one block. The block is classified into two types: an island-shaped block (e.g., a block 3515_1 or a block 3515_2), and a linear block extending in the X direction or the Y direction (e.g., a block 3516 extending in the Y direction). Note that only part of the pixel circuit is illustrated in FIG. 20A, and in reality, these two types of blocks are repeatedly arranged in the X direction and the Y direction. An electrode on one side of the liquid crystal element is, for example, a common electrode. An electrode on the other side of the liquid crystal element is, for example, a pixel electrode.

The wiring 3510_1 (or the wiring 3510_2) extending in the X direction is electrically connected to the island-shaped block 3515_1 (or the block 3515_2). Although not illustrated, the wiring 3510_1 extending in the X direction is electrically connected to a plurality of island-shaped blocks 3515_1 which are provided discontinuously along the X direction with the linear blocks therebetween. Furthermore, the wiring 3511_1 extending in the Y direction is electrically connected to the linear block 3516.

Figure 20B:
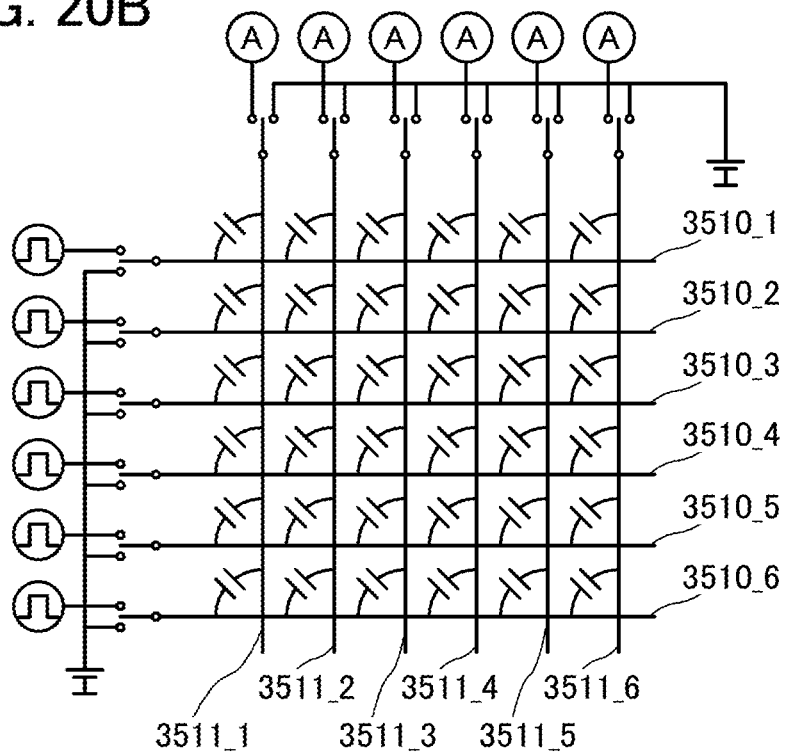

FIG. 20B is an equivalent circuit diagram illustrating the connection relation between a plurality of wirings extending in the X direction (the wirings 3510_1 to 3510_6, which are collectively called a wiring 3510 in some cases) and a plurality of wirings extending in the Y direction (wirings 3511_1 to 3511_6, which are collectively called a wiring 3511 in some cases). A common potential can be input to each of the wirings 3510 extending in the X direction and each of the wirings 3511 extending in the Y direction. A pulse voltage can be input to each of the wirings 3510 extending in the X direction from a pulse voltage output circuit. Furthermore, each of the wirings 3511 extending in the Y direction can be electrically connected to the sensing circuit. Note that the wiring 3510 and the wiring 3511 can be interchanged with each other.

An example of an operation method of the touch panel 350D is described with reference to FIGS. 21A and 21B.

Here, one frame period is divided into a writing period and a sensing period. The writing period is a period in which image data is written to a pixel, and the wirings 3501 (also referred to as gate lines or scan lines) are sequentially selected. The sensing period is a period in which sensing is performed by the sensor element.

Figure 21A:
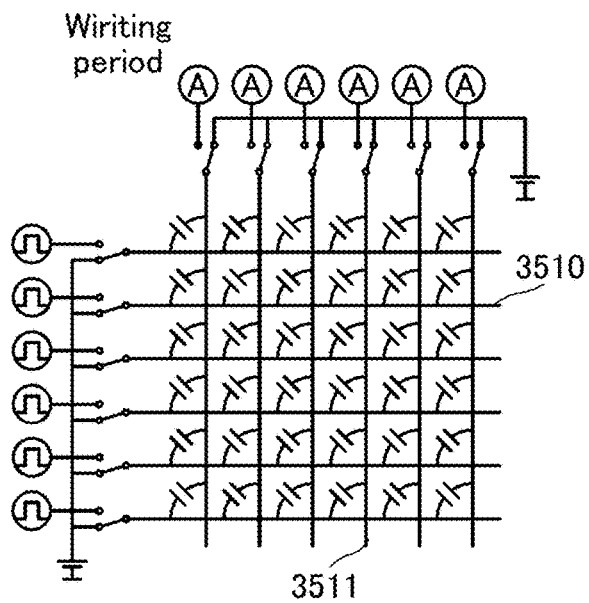
FIGS. 21A to 21E illustrate operation examples of a sensor element and a pixel.

FIG. 21A is an equivalent circuit diagram in the writing period. In the writing period, a common potential is input to both the wiring 3510 extending in the X direction and the wiring 3511 extending in the Y direction.

Figure 21B:
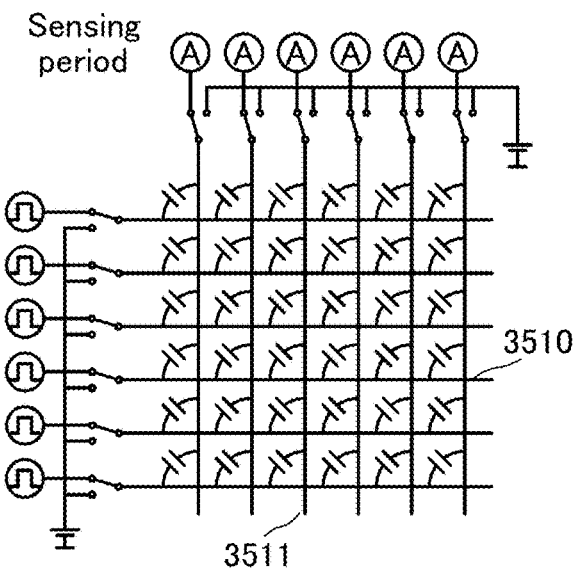

FIG. 21B is an equivalent circuit diagram in the sensing period. In the sensing period, each of the wirings 3511 extending in the Y direction is electrically connected to the detection circuit. Furthermore, a pulse voltage is input to the wirings 3510 extending in the X direction from a pulse voltage output circuit.

Figure 21C:
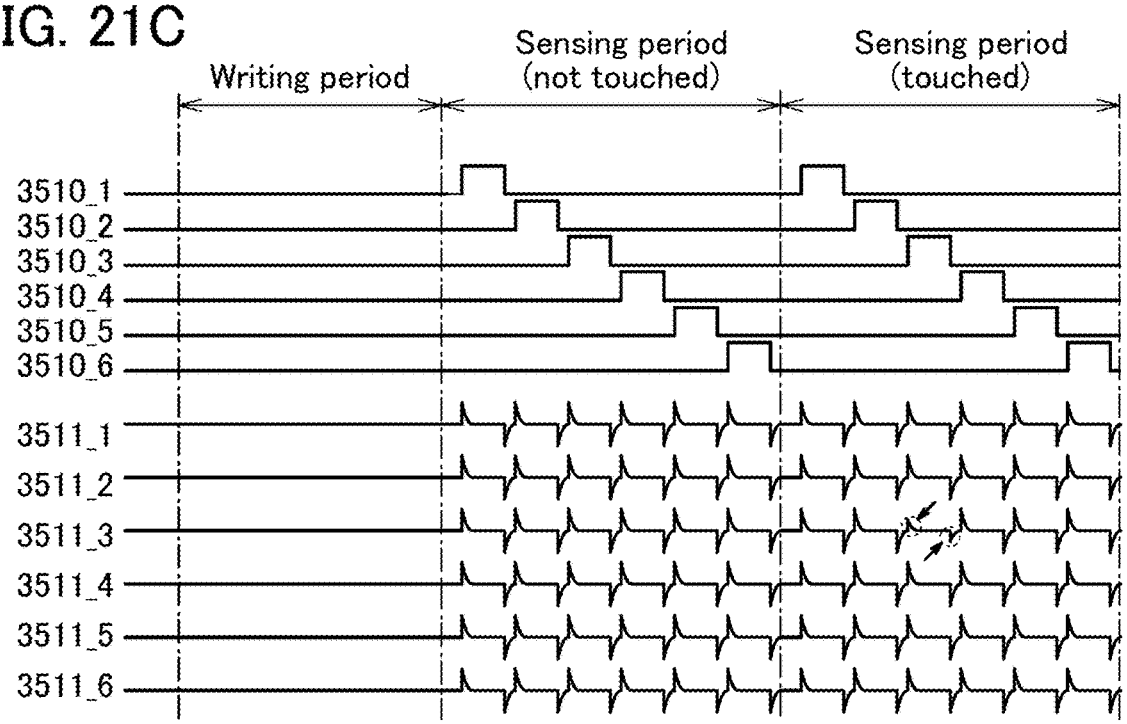

FIG. 21C illustrates an example of a timing chart of the input and output waveforms of a mutual capacitive sensor element.

In FIG. 21C, sensing of an object is performed in all rows and columns in one frame period. FIG. 21C shows two cases in the sensing period: a case in which an object is not sensed (not touched) and a case in which an object is sensed (touched).

A pulse voltage is supplied to the wirings 3510_1 to 3510_6 from the pulse voltage output circuit. When the pulse voltage is applied to the wirings 3510_1 to 3510_6, an electric field is generated between a pair of electrodes forming a capacitor, and current flows in the capacitor. The electric field generated between the electrodes is changed by being blocked by the touch of a finger or a stylus, for example. That is, the capacitance value of the capacitor is changed by touch or the like. By utilizing this, an approach or contact of an object can be sensed.

The wirings 3511_1 to 3511_6 are connected to the detection circuit for detecting the change in current in the wirings 3511_1 to 3511_6 caused by the change in capacitance value of the capacitor. The current value detected in the wirings 3511_1 to 3511_6 is not changed when there is no approach or contact of an object, and is decreased when the capacitance value is decreased because of the approach or contact of an object. In order to detect a change in current, the total amount of current may be detected. In that case, an integrator circuit or the like may be used to detect the total amount of current. Alternatively, the peak current value may be detected. In that case, current may be converted into voltage, and the peak voltage value may be detected.

Note that in FIG. 21C, the waveforms of the wirings 3511_1 to 3511_6 show voltage values corresponding to the detected current values. As illustrated in FIG. 21C, the timing of the display operation is preferably in synchronization with the timing of the sensing operation.

The waveforms of the wirings 3511_1 to 3511_6 change in accordance with pulse voltages applied to the wirings 3510_1 to 3510_6. When there is no approach or contact of an object, the waveforms of the wirings 3511_1 to 3511_6 uniformly change in accordance with changes in the voltages of the wirings 3510_1 to 3510_6. On the other hand, the current value decreases at the point of approach or contact of an object and accordingly the waveform of the voltage value changes.

By detecting a change in capacitance in this manner, the approach or contact of an object can be detected. Even when an object such as a finger or a stylus does not touch but only approaches a touch panel, a signal may be detected in some cases.

Note that FIG. 21C illustrates an example in which a common potential supplied in the writing period is equal to a low potential supplied in the sensing period in the wiring 3510; however, one embodiment of the present invention is not limited thereto. The common potential may be different from the low potential.

It is preferable that, as an example, the pulse voltage output circuit and the detection circuit be formed in one IC. For example, the IC is preferably mounted on a touch panel or a substrate in a housing of an electronic device. In the case where the touch panel has flexibility, parasitic capacitance can potentially be increased in a bent portion of the touch panel, and the influence of noise can potentially be increased. In view of this, an IC with a driving method less influenced by noise is preferably used. For example, it is preferable to use an IC to which a driving method capable of increasing a signal-noise ratio (S/N ratio) is applied.

It is preferable that a period in which an image is written and a period in which sensing is performed by a sensor element be separately provided as described above. Thus, a decrease in sensitivity of the sensor element caused by noise generated when data is written to a pixel can be prevented.

Figure 21D:
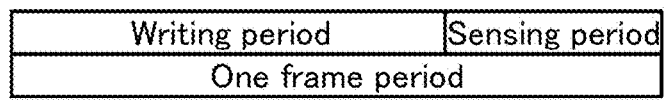
Figure 21E:
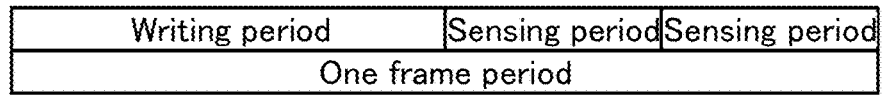

In one embodiment of the present invention, as illustrated in FIG. 21D, one frame period includes one writing period and one sensing period. Alternatively, as shown in FIG. 21E, two sensing periods may be included in one frame period. When a plurality of detection periods are included in one frame period, the detection sensitivity can be further increased. For example, two to four sensing periods may be included in one frame period.

Next, a structure example of the top surface of the sensor element included in the touch panel 350D will be described with reference to FIGS. 22A to 22C.

FIG. 22A shows a top view of the sensor element. The sensor element includes a conductive layer 56a and a conductive layer 56b. The conductive layer 56a serves as one electrode of the sensor element, and the conductive layer 56b serves as the other electrode of the sensor element. The sensor element can sense an approach or contact or the like of an object utilizing the capacitance that is formed between the conductive layers 56a and 56b. Although not illustrated, the conductive layers 56a and 56b may have a top-surface shape that has a comb-like shape or that is provided with a slit.

In one embodiment of the present invention, the conductive layers 56a and 56b also serve as the common electrode of the liquid crystal element.

A plurality of conductive layers 56a are provided in the Y direction and extend in the X direction. A plurality of conductive layers 56b provided in the Y direction are electrically connected to each other via a conductive layer 58 extending in the Y direction. FIG. 22A illustrates an example in which m conductive layers 56a and n conductive layers 58 are provided.

Note that the plurality of conductive layers 56a may be provided in the X direction and in that case, may extend in the Y direction. The plurality of conductive layers 56b provided in the X direction may be electrically connected to each other via the conductive layer 58 extending in the X direction.

As illustrated in FIG. 22B, a conductive layer 56 serving as an electrode of the sensor element is provided over a plurality of pixels 60. The conductive layer 56 corresponds to each of the conductive layers 56a and 56b in FIG. 22A. The pixel 60 is formed of a plurality of subpixels exhibiting different colors. FIG. 22B shows an example in which the pixel 60 is formed of three subpixels, subpixels 60a, 60b, and 60c.

A pair of electrodes of the sensor element is preferably electrically connected to respective auxiliary wirings. The conductive layer 56 may be electrically connected to an auxiliary wiring 57, as illustrated in FIG. 22C. Note that FIG. 22C illustrates an example in which the auxiliary wirings are stacked over the conductive layers; however, the conductive layers may be stacked over the auxiliary wirings. The plurality of conductive layers 56 provided in the X direction may be electrically connected to the conductive layer 58 through the auxiliary wiring 57.

The resistivity of the conductive layer that transmits visible light is relatively high in some cases. Thus, the resistance of the pair of electrodes of the sensor element is preferably lowered by electrically connecting the pair of electrodes of the sensor element to the auxiliary wiring.

When the resistance of the pair of electrodes of the sensor element is lowered, the time constant of the pair of electrodes can be small. Accordingly, the detection sensitivity of the sensor element can be increased; furthermore, the detection accuracy of the sensor element can be increased.

<1-8. Touch Panel Module>

Next, a touch panel module including the input/output device of one embodiment of the present invention and an IC will be described with reference to FIG. 23 and FIGS. 24A to 24C.

Figure 23:
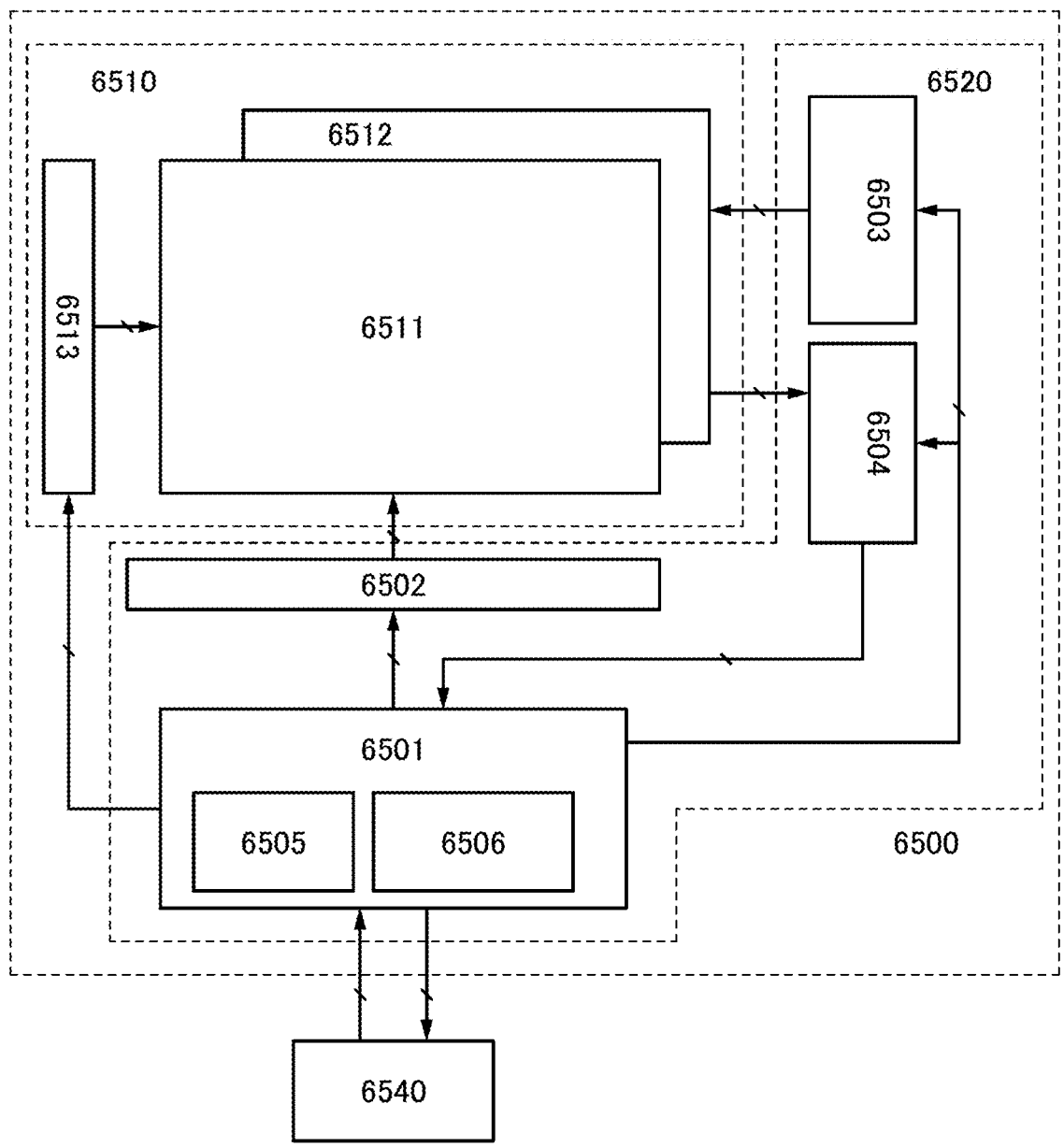
FIG. 23 is a block diagram illustrating an example of a touch panel module.

FIG. 23 shows a block diagram of a touch panel module 6500. The touch panel module 6500 includes a touch panel

6510 and an IC 6520. The input/output device of one embodiment of the present invention can be applied to the touch panel 6510.

The touch panel 6510 includes a display portion 6511, an input portion 6512, and a scan line driver circuit 6513. The display portion 6511 includes a plurality of pixels, a plurality of signal lines, and a plurality of scan lines, and has a function of displaying an image. The input portion 6512 serves as a touch sensor by including a plurality of sensor elements that can sense touch or proximity of a sensing target to the touch panel 6510. A scan line driver circuit 6513 has a function of outputting a scan signal to the scan lines included in the display portion 6511.

Here, the display portion 6511 and the input portion 6512 are separately illustrated as the components of the touch panel 6510 for simplicity; however, what is called an in-cell touch panel that has a function of displaying an image and serves as a touch sensor is preferable.

The resolution of the display portion 6511 is preferably as high as HD (number of pixels: 1280×720), FHD (number of pixels: 1920×1080), WQHD (number of pixels: 2560×1440), WQXGA (number of pixels: 2560×1600), 4K (number of pixels: 3840×2160), or 8K (number of pixels: 7680×4320). In particular, resolution of 4K, 8K, or higher is preferable. The pixel density (definition) of the pixels in the display portion 6511 is higher than or equal to 300 ppi, preferably higher than or equal to 500 ppi, more preferably higher than or equal to 800 ppi, more preferably higher than or equal to 1000 ppi, and more preferably higher than or equal to 1200 ppi. The display portion 6511 with such high resolution and high definition enables an increase in a realistic sensation, sense of depth, and the like in personal use such as portable use and home use.

The IC 6520 includes a circuit unit 6501, a signal line driver circuit 6502, a sensor driver circuit 6503, and a detection circuit 6504. The circuit unit 6501 includes a timing controller 6505, an image processing circuit 6506, and the like.

The signal line driver circuit 6502 has a function of outputting an image signal (a video signal) that is an analog signal to a signal line included in the display portion 6511. For example, the signal line driver circuit 6502 can include a shift register circuit and a buffer circuit in combination. The touch panel 6510 may include a demultiplexer circuit connected to a signal line.

The sensor driver circuit 6503 has a function of outputting a signal for driving a sensor element included in the input portion 6512. As the sensor driver circuit 6503, a shift register circuit and a buffer circuit can be used in combination, for example.

The detection circuit 6504 has a function of outputting, to the circuit unit 6501, an output signal from the sensor element included in the input portion 6512. The detection circuit 6504 can include an amplifier circuit and an analog-digital converter (ADC), for example. In that case, the detection circuit 6504 converts an analog signal output from the input portion 6512 into a digital signal to be output to the circuit unit 6501.

The image processing circuit 6506 included in the circuit unit 6501 has a function of generating and outputting a signal for driving the display portion 6511 of the touch panel 6510, a function of generating and outputting a signal for driving the input portion 6512, and a function of analyzing a signal output from the input portion 6512 and outputting the signal to a CPU 6540.

As specific examples, the image processing circuit 6506 has the following functions: a function of generating a video signal in accordance with an instruction from the CPU 6540; a function of performing signal processing on a video signal in accordance with the specification of the display portion 6511, converting the signal into an analog video signal, and supplying the converted signal to the signal line driver circuit 6502; a function of generating a driving signal output to the sensor driver circuit 6503 in accordance with an instruction from the CPU 6540; and a function of analyzing a signal input from the detection circuit 6504 and outputting the analyzed signal to the CPU 6540 as positional information.

The timing controller 6505 has a function of generating a signal (e.g., a clock signal or a start pulse signal) on the basis of a synchronization signal included in a video signal or the like on which the image processing circuit 6506 performs processing, and outputting the signal to the scan line driver circuit 6513 and the sensor driver circuit 6503. Furthermore, the timing controller 6505 may have a function of generating and outputting a signal for determining timing when the detection circuit 6504 outputs a signal. Here, the timing controller 6505 preferably outputs a signal synchronized with the signal output to the scan line driver circuit 6513 and a signal synchronized with the signal output to the sensor driver circuit 6503. In particular, it is preferable that a period in which data in a pixel in the display portion 6511 is rewritten and a period in which sensing is performed with the input portion 6512 be separately provided. For example, the touch panel 6510 can be driven by dividing one frame period into a period in which data in a pixel is rewritten and a period in which sensing is performed. Furthermore, detection sensitivity and detection accuracy can be increased, for example, by providing two or more sensing periods in one frame period.

The image processing circuit 6506 can include a processor, for example. A microprocessor such as a digital signal processor (DSP) or a graphics processing unit (GPU) can be used, for example. Furthermore, such a microprocessor may be obtained with a programmable logic device (PLD) such as a field programmable gate array (FPGA) or a field programmable analog array (FPAA). The image processing circuit 6506 interprets and executes instructions from various programs with the processor to process various kinds of data and control programs. The programs executed by the processor may be stored in a memory region included in the processor or a memory device that is additionally provided.

A transistor that includes an oxide semiconductor in a channel formation region and has an extremely low off-state current can be used in the display portion 6511 or the scan line driver circuit 6513 included in the touch panel 6510, the circuit unit 6501, the signal line driver circuit 6502, the sensor driver circuit 6503, or the detection circuit 6504 included in the IC 6520, the CPU 6540 provided outside, or the like. With the use of the transistor having an extremely low off-state current as a switch for holding electric charge (data) that flows into a capacitor serving as a memory element, a long data retention period can be ensured. For example, by utilizing the characteristic for at least one of a register and a cache memory of the image processing circuit 6506, normally-off computing is achieved where the image processing circuit 6506 operates only when needed and data on the previous processing is stored in the memory element in the rest of time; thus, the power consumption of the touch panel module 6500 and an electronic device on which the touch panel module 6500 is mounted can be reduced.

In this example, the circuit unit 6501 includes the timing controller 6505 and the image processing circuit 6506; alternatively, the image processing circuit 6506 itself or a circuit having a function of part of the image processing circuit 6506 may be provided outside. Alternatively, the CPU 6540 may have a function of the image processing circuit 6506 or part thereof. For example, the circuit unit 6501 can include the signal line driver circuit 6502, the sensor driver circuit 6503, the detection circuit 6504, and the timing controller 6505.

In this example, the IC 6520 includes the circuit unit 6501; the circuit unit 6501 is not necessarily included in the IC 6520. In that case, the IC 6520 can include the signal line driver circuit 6502, the sensor driver circuit 6503, and the detection circuit 6504. For example, in the case where the touch panel module 6500 includes a plurality of ICs, the circuit unit 6501 may be provided outside the touch panel module 6500 and a plurality of ICs 6520 without the circuit unit 6501 may be provided, and alternatively, the IC 6520 and an IC including only the signal line driver circuit 6502 can be provided in combination.

When an IC has a function of driving the display portion 6511 of the touch panel 6510 and a function of driving the input portion 6512 as described above, the number of ICs mounted on the touch panel module 6500 can be reduced; accordingly, cost can be reduced.

Figure 24A:
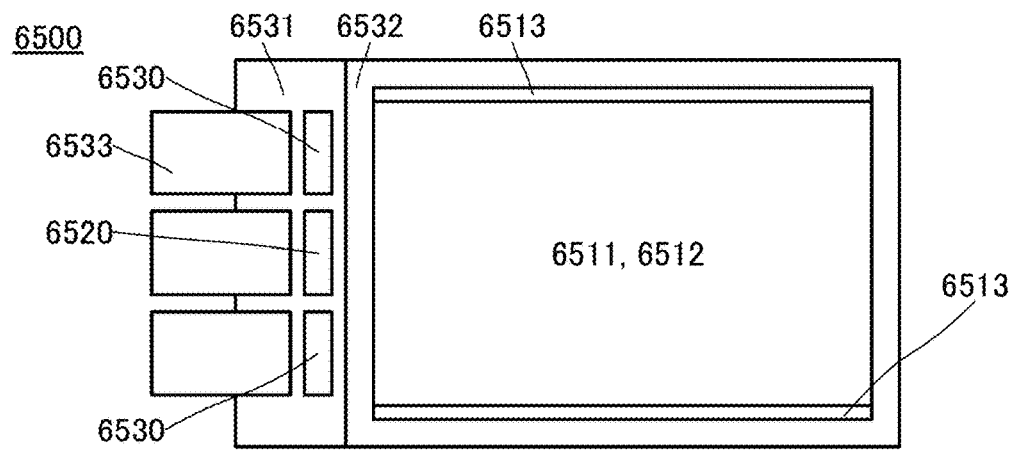
FIGS. 24A to 24C illustrate examples of a touch panel module.
Figure 24B:
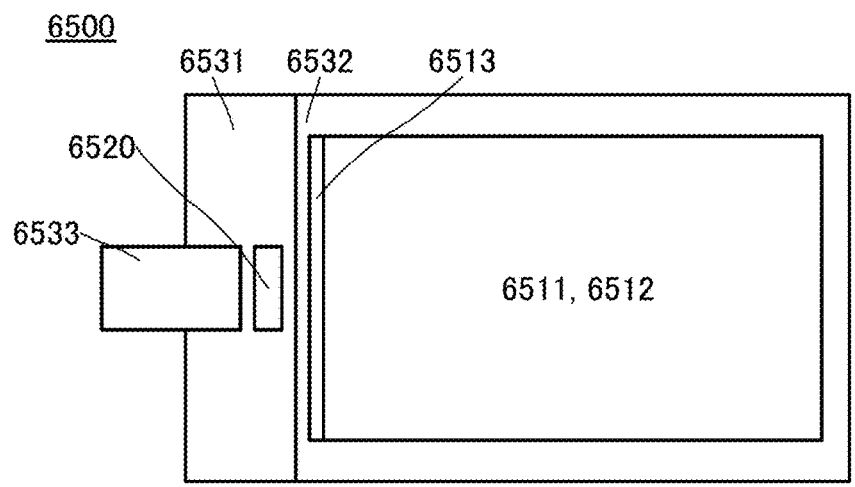
Figure 24C:
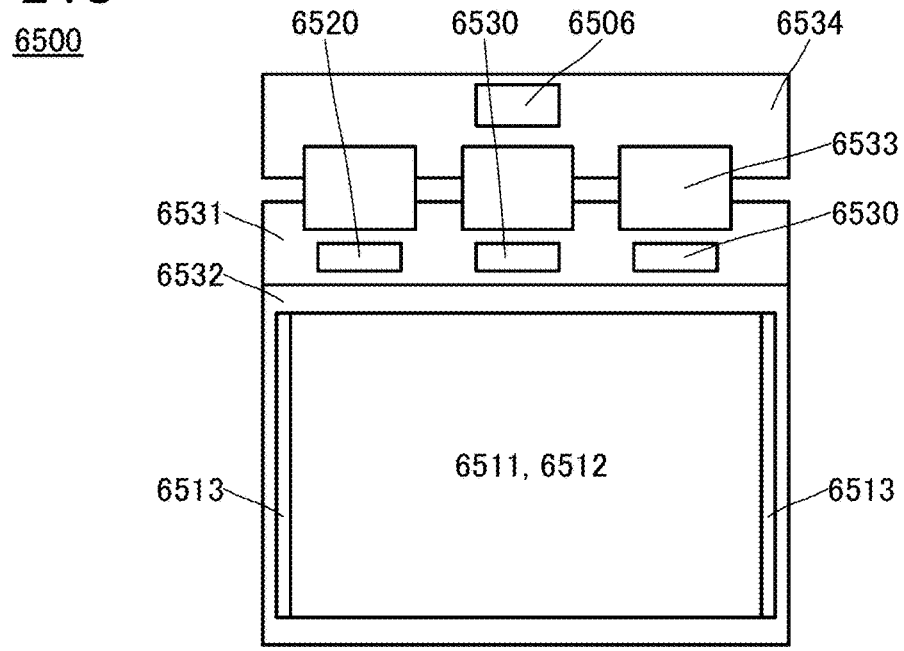

FIGS. 24A to 24C each are a schematic diagram of the touch panel module 6500 on which the IC 6520 is mounted.

In FIG. 24A, the touch panel module 6500 includes a substrate 6531, a counter substrate 6532, a plurality of FPCs 6533, the IC 6520, ICs 6530, and the like. The touch panel module 6500 also includes the display portion 6511, the input portion 6512, and the scan line driver circuit 6513. The IC 6520 and the ICs 6530 are mounted on the substrate 6531 by a COG method or the like.

The IC 6530 is an IC in which only the signal line driver circuit 6502 is provided in the above-described IC 6520 or an IC in which the signal line driver circuit 6502 and the circuit unit 6501 are provided in the above-described IC 6520. The ICs 6520 and 6530 are supplied with a signal from the outside through the FPCs 6533. Furthermore, a signal can be output to the outside from at least one of the ICs 6520 and 6530 through the FPC 6533.

FIG. 24A illustrates an example where the display portion 6511 is positioned between two scan line driver circuits 6513. The ICs 6530 are provided in addition to the IC 6520. Such a structure is preferable in the case where the display portion 6511 has extremely high resolution.

FIG. 24B illustrates an example where one IC 6520 and one FPC 6533 are provided. It is preferable to bring functions into one IC 6520 in this manner because the number of components can be reduced. In the example in FIG. 24B, the scan line driver circuit 6513 is provided along a side close to the FPC 6533 among two short sides of the display portion 6511.

FIG. 24C illustrates an example of including a printed circuit board (PCB) 6534 on which the image processing circuit 6506 and the like are mounted. The ICs 6520 and 6530 over the substrate 6531 are electrically connected to the PCB 6534 through the FPCs 6533. Here, the above-described structure without the image processing circuit 6506 can be applied to the IC 6520.

In each of FIGS. 24A to 24C, the ICs 6520 and 6530 may be mounted on the FPC 6533, not on the substrate 6531. For example, the ICs 6520 and 6530 can be mounted on the FPC 6533 by a COF method, a tape automated bonding (TAB) method, or the like.

A structure where the FPC 6533, the IC 6520 (and the IC 6530), and the like are provided on a short side of the display portion 6511 as illustrated in FIGS. 24A and 24B enables the frame of the display device to be narrowed; thus, the structure is preferably used for electronic devices such as smartphones, mobile phones, and tablet terminals, for example. The structure with the PCB 6534 illustrated in FIG. 24C can be preferably used for television devices, monitors, tablet terminals, or notebook personal computers, for example.

As described above, the display device of one embodiment of the present invention includes the second common electrode on a substrate that faces a substrate on which the pixel electrode and the first common electrode are provided. The same potential is supplied to the first and second common electrodes, whereby light leakage can be prevented and the display quality of the display device can be improved. Furthermore, the display device can have a high aperture ratio and high definition. In addition, when the second common electrode is provided in part of a display region of a pixel, an increase in the driving voltage of the liquid crystal element can be prevented even when the second common electrode is provided.

This embodiment can be combined with any of the other embodiments as appropriate.

(Embodiment 2)

In this embodiment, transistors that can be used for the display device of one embodiment of the present invention will be described with reference to FIGS. 25A to 35D.

The display device of one embodiment of the present invention can be fabricated by using a transistor with any of various modes, such as a bottom-gate transistor or a top-gate transistor. Therefore, a material for a semiconductor layer or the structure of a transistor can be easily changed in accordance with the existing production line.

[Bottom-gate Transistor]

FIG. 25A1 is a cross-sectional view of a transistor 410 that is a channel-protective transistor, which is a type of bottom-gate transistor. The transistor 410 includes an electrode 546 over a substrate 571 with an insulating layer 572 positioned therebetween. The transistor 410 includes a semiconductor layer 542 over the electrode 546 with an insulating layer 526 positioned therebetween. The electrode 546 can serve as a gate electrode. The insulating layer 526 can serve as a gate insulating layer.

The transistor 410 includes an insulating layer 522 over a channel formation region in the semiconductor layer 542. The transistor 410 includes an electrode 544a and an electrode 544b which are partly in contact with the semiconductor layer 542 and over the insulating layer 526. Part of the electrode 544a and part of the electrode 544b are formed over the insulating layer 522.

The insulating layer 522 can serve a channel protective layer. With the insulating layer 522 provided over the channel formation region, the semiconductor layer 542 can be prevented from being exposed at the time of forming the electrodes 544a and 544b. Thus, the channel formation region in the semiconductor layer 542 can be prevented from being etched at the time of forming the electrodes 544a and 544b. According to one embodiment of the present invention, a transistor with favorable electrical characteristics can be provided.

The transistor 410 includes an insulating layer 528 over the electrode 544a, the electrode 544b, and the insulating layer 522 and further includes an insulating layer 529 over the insulating layer 528.

In the case where an oxide semiconductor is used for the semiconductor layer 542, a material capable of removing oxygen from part of the semiconductor layer 542 to generate oxygen vacancies is preferably used for regions of the electrodes 544a and 544b that are in contact with at least the semiconductor layer 542. The carrier concentration increases in the regions of the semiconductor layer 542 where oxygen vacancies are generated, so that the regions become n-type regions (n$^+$ layers). Accordingly, the regions can serve as a source region and a drain region. Examples of the material capable of removing oxygen from the oxide semiconductor to generate oxygen vacancies include tungsten and titanium.

Formation of the source region and the drain region in the semiconductor layer 542 makes it possible to reduce the contact resistance between the semiconductor layer 542 and each of the electrodes 544a and 544b. Accordingly, the electric characteristics of the transistor, such as the field-effect mobility and the threshold voltage, can be favorable.

In the case where a semiconductor such as silicon is used for the semiconductor layer 542, a layer that serves as an n-type semiconductor or a p-type semiconductor is preferably provided between the semiconductor layer 542 and the electrode 544a and between the semiconductor layer 542 and the electrode 544b. The layer that serves as an n-type semiconductor or a p-type semiconductor can serve as the source region or the drain region in the transistor.

The insulating layers 528 and 529 are preferably formed using a material that can prevent or reduce diffusion of impurities into the transistor from the outside. The insulating layer 529 is not necessarily formed.

When an oxide semiconductor is used for the semiconductor layer 542, heat treatment may be performed once or plural times before the insulating layer 528 is formed, after the insulating layer 528 is formed, or after the insulating layer 529 is formed. The heat treatment can fill oxygen vacancies in the semiconductor layer 542 by diffusing oxygen contained in the insulating layers 528 and 529 or other insulating layers into the semiconductor layer 542. Alternatively, one or both of the insulating layers 528 and 529 may be formed while the heat treatment is performed, so that oxygen vacancies in the semiconductor layer 542 can be filled.

A transistor 411 illustrated in FIG. 25A2 is different from the transistor 410 in that an electrode 523 that can serve as a back gate is provided over the insulating layer 529. The electrode 523 can be formed using a material and a method similar to those of the electrode 546.

<Back Gate>

In general, a back gate is formed using a conductive layer. The gate and the back gate are positioned so that a channel formation region of a semiconductor layer is provided between the gate and the back gate. The back gate can function in a manner similar to that of the gate. The potential of the back gate may be the same as that of the gate electrode or may be a GND potential or a given potential. By changing the potential of the back gate independently of the potential of the gate, the threshold voltage of the transistor can be changed.

The electrode 546 and the electrode 523 can each function as a gate. Thus, the insulating layers 526, 528, and 529 can each function as a gate insulating layer. The electrode 523 may also be provided between the insulating layers 528 and 529.

In the case where one of the electrodes 546 and 523 is simply referred to as a "gate" or a "gate electrode", the other can be referred to as a "back gate" or a "back gate electrode". For example, in the transistor 411, in the case where the electrode 523 is referred to as a "gate electrode", the electrode 546 is referred to as a "back gate electrode". In the case where the electrode 523 is used as a "gate electrode", the transistor 411 can be regarded as a kind of top-gate transistor. Alternatively, one of the electrodes 546 and 523 may be referred to as a "first gate" or a "first gate electrode", and the other may be referred to as a "second gate" or a "second gate electrode".

By providing the electrodes 546 and 523 with the semiconductor layer 542 positioned therebetween and setting the potentials of the electrodes 546 and 523 to be the same, a region of the semiconductor layer 542 through which carriers flow is enlarged in the film thickness direction; thus, the number of transferred carriers is increased. As a result, the on-state current and the field-effect mobility of the transistor 411 are increased.

Therefore, the transistor 411 has large on-state current for the area occupied thereby. That is, the area occupied by the transistor 411 can be small for required on-state current. According to one embodiment of the present invention, the area occupied by a transistor can be reduced. Therefore, a display device can have a high aperture ratio or high definition.

Furthermore, the gate and the back gate are formed using conductive layers and thus each have a function of preventing an electric field generated outside the transistor from influencing the semiconductor layer in which the channel is formed (in particular, an electric field blocking function against static electricity and the like). When the back gate is formed larger than the semiconductor layer such that the semiconductor layer is covered with the back gate, the electric field blocking function can be enhanced.

Since the electrode 546 (gate) and the electrode 523 (back gate) each have a function of blocking an electric field from the outside, electric charge of charged particles and the like generated on the insulating layer 572 side or above the electrode 523 do not influence the channel formation region in the semiconductor layer 542. Thus, degradation by a stress test (e.g., a negative gate bias temperature (−GBT) stress test in which negative charges are applied to a gate) can be reduced. Furthermore, a change in gate voltage (rising voltage) at which on-state current starts flowing at different drain voltages can be reduced. Note that this effect is obtained when the electrodes 546 and 523 have the same potential or different potentials.

Note that the GBT stress test is an acceleration test and can evaluate, in a short time, a change by long-term use (i.e., a change over time) in characteristics of a transistor. In particular, the amount of change in the threshold voltage of the transistor between before and after the GBT stress test is an important indicator when examining the reliability of the transistor. As the change in threshold voltage is smaller, the transistor has higher reliability.

By providing the electrodes 546 and 523 and setting the potentials of the electrodes 546 and 523 to be the same, the amount of change in threshold voltage is reduced. Accordingly, a variation in electrical characteristics among a plurality of transistors is also reduced.

Also by a +GBT stress test in which positive electric charges are applied to a gate, the transistor including the back gate has a smaller change in threshold voltage than a transistor including no back gate.

When the back gate is formed using a light-blocking conductive film, light can be prevented from entering the semiconductor layer from the back gate side. Therefore, photodegradation of the semiconductor layer can be prevented and deterioration in electrical characteristics of the transistor, such as a shift of the threshold voltage, can be prevented.

According to one embodiment of the present invention, highly reliable transistor can be achieved. In addition, a highly reliable display device can be achieved.

FIG. 25B1 is a cross-sectional view of a channel-protective transistor 420 that is a type of bottom-gate transistor. The transistor 420 has substantially the same structure as the transistor 410 but is different from the transistor 410 in that the insulating layer 522 having openings 531a and 531b covers the semiconductor layer 542. The openings 531a and 531b are formed by selectively removing part of the insulating layer 522 which overlaps with the semiconductor layer 542.

The semiconductor layer 542 is electrically connected to the electrode 544a in the opening 531a. The semiconductor layer 542 is electrically connected to the electrode 544b in the opening 531b. With the insulating layer 522, the semiconductor layer 542 can be prevented from being exposed at the time of forming the electrodes 544a and 544b. Thus, the semiconductor layer 542 can be prevented from being reduced in thickness at the time of forming the electrodes 544a and 544b. A region of the insulating layer 522 that overlaps with the channel formation region can function as a channel protective layer.

A transistor 421 illustrated in FIG. 25B2 is different from the transistor 420 in that the electrode 523 that can function as a back gate is provided over the insulating layer 529.

The distance between the electrodes 544a and 546 and the distance between the electrodes 544b and 546 in the transistors 420 and 421 are longer than those in the transistors 410 and 411. Thus, the parasitic capacitance generated between the electrodes 544a and 546 can be reduced. Furthermore, the parasitic capacitance generated between the electrodes 544b and 546 can be reduced. According to one embodiment of the present invention, a transistor with favorable electrical characteristics can be achieved.

A transistor 425 illustrated in FIG. 25C1 is a channel-etched transistor that is a type of bottom-gate transistor. In the transistor 425, the insulating layer 522 is not provided and the electrodes 544a and 544b are formed in contact with the semiconductor layer 542. Thus, part of the semiconductor layer 542 that is exposed when the electrodes 544a and 544b are formed is etched in some cases. However, since the insulating layer 522 is not provided, the productivity of the transistor can be increased.

A transistor 426 illustrated in FIG. 25C2 is different from the transistor 425 in that the electrode 523 which can function as a back gate is provided over the insulating layer 529.

[Top-gate Transistor]

FIG. 26A1 is a cross-sectional view of a transistor 430 that is a type of top-gate transistor. The transistor 430 includes the semiconductor layer 542 over the substrate 571 with the insulating layer 572 positioned therebetween, the electrodes 544a and 544b that are over the semiconductor layer 542 and the insulating layer 572 and in contact with part of the semiconductor layer 542, the insulating layer 526 over the semiconductor layer 542 and the electrodes 544a and 544b, and the electrode 546 over the insulating layer 526.

Since the electrode 546 overlaps with neither the electrode 544a nor the electrode 544b in the transistor 430, the parasitic capacitance generated between the electrodes 546 and 544a and the parasitic capacitance generated between the electrodes 546 and 544b can be reduced. After the formation of the electrode 546, an impurity 555 is introduced into the semiconductor layer 542 using the electrode 546 as a mask, so that an impurity region can be formed in the semiconductor layer 542 in a self-aligned manner (see FIG. 26A3). According to one embodiment of the present invention, a transistor with favorable electrical characteristics can be achieved.

The introduction of the impurity 555 can be performed with an ion implantation apparatus, an ion doping apparatus, or a plasma treatment apparatus.

As the impurity 555, for example, at least one element of a Group 13 element, a Group 15 element, and the like can be used. In the case where an oxide semiconductor is used for the semiconductor layer 542, it is possible to use at least one kind of element of a rare gas and hydrogen as the impurity 555.

A transistor 431 illustrated in FIG. 26A2 is different from the transistor 430 in that the electrode 523 and an insulating layer 527 are included. The transistor 431 includes the electrode 523 formed over the insulating layer 572 and the insulating layer 527 formed over the electrode 523. The electrode 523 can function as a back gate. Thus, the insulating layer 527 can function as a gate insulating layer. The insulating layer 527 can be formed using a material and a method similar to those of the insulating layer 526.

The transistor 431 as well as the transistor 411 has a high on-state current for the area occupied thereby. That is, the area occupied by the transistor 431 can be small for required on-state current. According to one embodiment of the present invention, the area occupied by a transistor can be reduced. Therefore, according to one embodiment of the present invention, a display device can have a high aperture ratio or high definition.

A transistor 440 shown in FIG. 26B1 as an example is a type of top-gate transistor. The transistor 440 is different from the transistor 430 in that the semiconductor layer 542 is formed after the formation of the electrodes 544a and 544b. A transistor 441 illustrated in FIG. 26B2 is different from the transistor 440 in that the electrode 523 and the insulating layer 527 are included. Thus, in the transistors 440 and 441, part of the semiconductor layer 542 is formed over the electrode 544a and another part of the semiconductor layer 542 is formed over the electrode 544b.

The transistor 441 as well as the transistor 411 has a high on-state current for the area occupied thereby. That is, the area occupied by the transistor 441 can be small for required on-state current. According to one embodiment of the present invention, the area occupied by a transistor can be reduced. Therefore, a display device can have a high aperture ratio or high definition.

A transistor 442 illustrated in FIG. 27A1 as an example is a type of top-gate transistor. The transistor 442 has the electrodes 544a and 544b over the insulating layer 529. The electrodes 544a and 544b are electrically connected to the semiconductor layer 542 through openings formed in the insulating layers 528 and 529.

Part of the insulating layer 526 that does not overlap with the electrode 546 is removed. The insulating layer 526 included in the transistor 442 partly extends across the ends of the electrode 546.

The impurity 555 is added to the semiconductor layer 542 using the electrode 546 and the insulating layer 526 as masks, so that an impurity region can be formed in the semiconductor layer 542 in a self-aligned manner (see FIG. 27A3).

At this time, the impurity 555 is not added to the semiconductor layer 542 in a region overlapping with the electrode 546, and the impurity 555 is added to the semiconductor layer 542 in a region that does not overlap with the electrode 546. The semiconductor layer 542 in a region into which the impurity 555 is introduced through the insulating layer 526 has a lower impurity concentration than the semiconductor layer 542 in a region into which the impurity 555 is introduced without through the insulating layer 526. Thus, a lightly doped drain (LDD) region is formed in the semiconductor layer 542 in a region adjacent to the electrode 546.

A transistor 443 illustrated in FIG. 27A2 is different from the transistor 442 in that the electrode 523 is provided under the semiconductor layer 542. The electrode 523 and the semiconductor layer 542 overlap with the insulating layer 572 positioned therebetween. The electrode 523 can function as a back gate electrode.

As in a transistor 444 illustrated in FIG. 27B1 and a transistor 445 illustrated in FIG. 27B2, the insulating layer 526 in a region that does not overlap with the electrode 546 may be wholly removed. Alternatively, as in a transistor 446 illustrated in FIG. 27C1 and a transistor 447 illustrated in FIG. 27C2, the insulating layer 526 except for the openings may be left without being removed.

In the transistors 444 to 447, after the formation of the electrode 546, the impurity 555 is added to the semiconductor layer 542 using the electrode 546 as a mask, so that an impurity region can be formed in the semiconductor layer 542 in a self-aligned manner.

[S-channel Transistor]

FIGS. 28A to 28C illustrate an example of a transistor including an oxide semiconductor for the semiconductor layer 542. FIG. 28A is a top view of a transistor 451. FIG. 28B is a cross-sectional view (in the channel length direction) of a portion along the dashed-dotted line L1-L2 in FIG. 28A. FIG. 28C is a cross-sectional view (in the channel width direction) of a portion along the dash-dotted line W1-W2 in FIG. 28A.

The transistor 451 includes the semiconductor layer 542, the insulating layer 526, the insulating layer 572, an insulating layer 582, an insulating layer 574, an electrode 524, an electrode 543, the electrode 544a, and the electrode 544b. The electrode 543 can function as a gate, and the electrode 524 can function as a back gate. The insulating layer 526, the insulating layer 572, the insulating layer 582, and the insulating layer 574 each can function as a gate insulating layer. The electrode 544a can function as one of a source electrode and a drain electrode. The electrode 544b can function as the other of the source electrode and the drain electrode.

An insulating layer 575 is provided over the substrate 571, and the electrode 524 and an insulating layer 573 are provided over the insulating layer 575. Over the electrode 524 and the insulating layer 573, the insulating layer 574 is provided. Over the insulating layer 574, the insulating layer 582 is provided, and over the insulating layer 582, the insulating layer 572 is provided.

A semiconductor layer 542a is provided over a projection formed in the insulating layer 572, and a semiconductor layer 542b is provided over the semiconductor layer 542a. The electrode 544a and the electrode 544b are provided over the semiconductor layer 542b. A region of the semiconductor layer 542b that overlaps with the electrode 544a can function as one of a source and a drain of the transistor 451. A region of the semiconductor layer 542b that overlaps with the electrode 544b can function as the other of the source and the drain of the transistor 451.

In addition, a semiconductor layer 542c is provided in contact with part of the semiconductor layer 542b. The insulating layer 526 is provided over the semiconductor layer 542c, and the electrode 543 is provided over the insulating layer 526.

The transistor 451 has a structure in which a top surface and a side surface of the semiconductor layer 542b and a side surface of the semiconductor layer 542a are covered with the semiconductor layer 542c in FIG. 28C. With the semiconductor layer 542b provided over the projection of the insulating layer 572, the side surface of the semiconductor layer 542b can be covered with the electrode 543. That is, the transistor 451 has a structure in which the semiconductor layer 542b can be electrically surrounded by electric field of the electrode 543. Such a structure of a transistor in which the semiconductor layer in which the channel is formed is electrically surrounded by the electric field of the conductive film is called a surrounded channel (s-channel) structure. A transistor having an s-channel structure is referred to as an s-channel transistor.

In the s-channel structure, a channel can be formed in the whole (bulk) of the semiconductor layer 542b. In the s-channel structure, the drain current of the transistor is increased, so that a larger amount of on-state current can be obtained. Furthermore, the entire channel formation region of the semiconductor layer 542b can be depleted by the electric field of the electrode 543. Accordingly, the off-state current of the transistor with an s-channel structure can be further reduced.

When the projection of the insulating layer 572 is increased in height, and the channel width is shortened, the effects of the s-channel structure for increasing the on-state current and reducing the off-state current can be enhanced. Part of the semiconductor layer 542a that is exposed in the formation of the semiconductor layer 542b may be removed. In this case, the side surfaces of the semiconductor layer 542a and the semiconductor layer 542b may be aligned to each other.

The insulating layer 528 is provided over the transistor 451 and the insulating layer 529 is provided over the insulating layer 528. An electrode 525a, an electrode 525b, and an electrode 525c are provided over the insulating layer 529. The electrode 525a is electrically connected to the electrode 544a via a contact plug in an opening in the insulating layer 529 and the insulating layer 528. The electrode 525b is electrically connected to the electrode 544b via a contact plug in an opening in the insulating layer 529 and the insulating layer 528. The electrode 525c is electrically connected to an electrode 543 via a contact plug through an opening in the insulating layer 529 and the insulating layer 528.

As the contact plug, for example, a conductive material with high embeddability, such as tungsten or polysilicon, can be used. A side surface and a bottom surface of the material may be covered with a barrier layer (a diffusion prevention layer) of a titanium layer, a titanium nitride layer, or a stacked layer of these layers. In this case, the barrier layer is regarded as part of the contact plug in some cases.

Note that when the insulating layer 582 is formed using hafnium oxide, aluminum oxide, tantalum oxide, aluminum silicate, or the like, the insulating layer 582 can function as a charge trap layer. The threshold voltage of the transistor can be changed by injecting electrons into the insulating layer 582. For example, the injection of electrons into the insulating layer 582 can be performed with use of the tunnel effect. By applying a positive voltage to the electrode 524, tunnel electrons can be injected into the insulating layer 582.

Figure 29C:
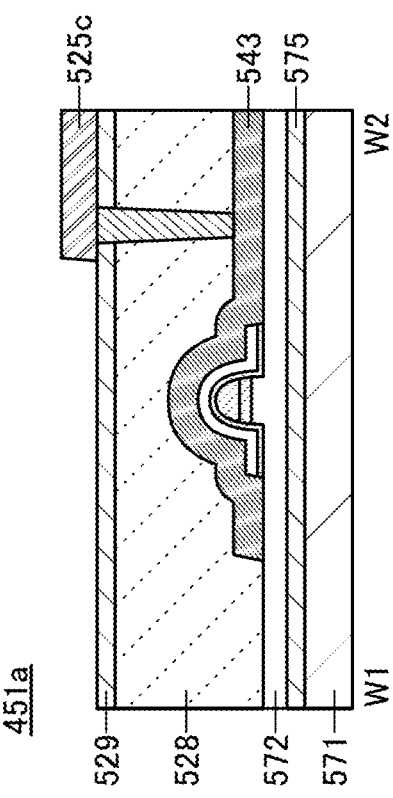
FIGS. 29A to 29C are a top view and cross-sectional views illustrating an example of a transistor.
Figure 29A:
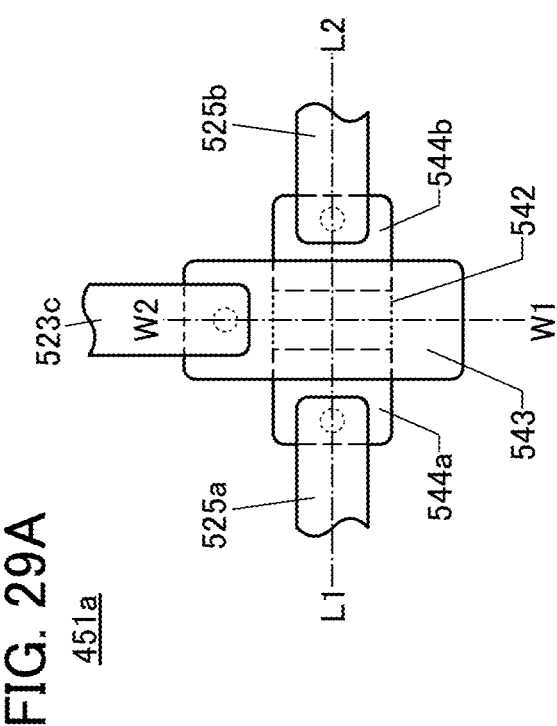
Figure 29B:
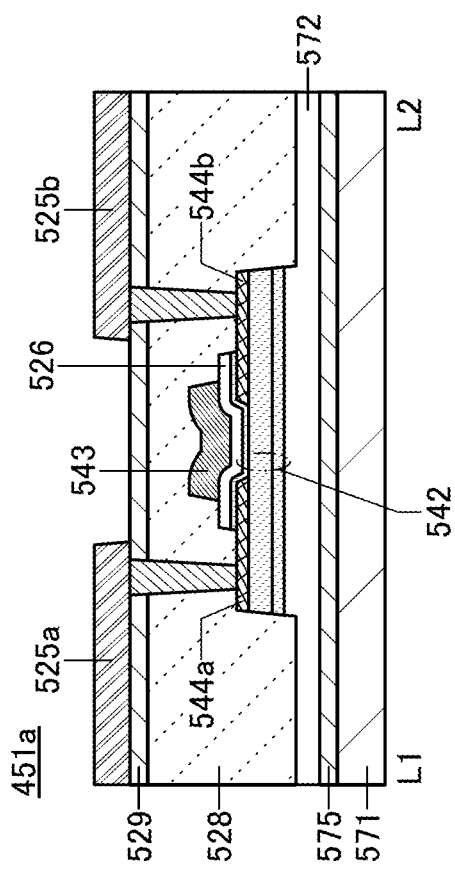

The electrode 524 that can function as a back gate is not necessarily provided, depending on the purpose. FIG. 29A is a top view of a transistor 451a. FIG. 29B is a cross-sectional view along dashed-dotted line L1-L2 in FIG. 29A, and FIG. 29C is a cross-sectional view along dashed-dotted line W1-W2 in FIG. 29A. The transistor 451a has a structure in which the electrode 524, and the insulating layers 573, 574, and 582 are removed from the transistor 451. The productivity of the transistor can be improved by omission of the electrode and the insulating layers. Accordingly, the productivity of the display device can be improved.

FIGS. 30A to 30C illustrate another example of an s-channel transistor. FIG. 30A is a top view of a transistor 452. FIG. 30B is a cross-sectional view along dashed-dotted line L1-L2 in FIG. 30A. FIG. 30C is a cross-sectional view along dashed-dotted line W1-W2 in FIG. 30A.

The transistor 452 has the same structure as the transistor 451, except in that the electrode 544a and the electrode 544b are in contact with the side surfaces of the semiconductor layer 542a and the semiconductor layer 542b. As the insulating layer 528 covering the transistor 452, an insulating layer with a flat surface such as that in the transistor 451 may be used. In addition, the electrode 525a, the electrode 525b, and the electrode 525c may be provided over the insulating layer 529.

Figures 31A, 31B:
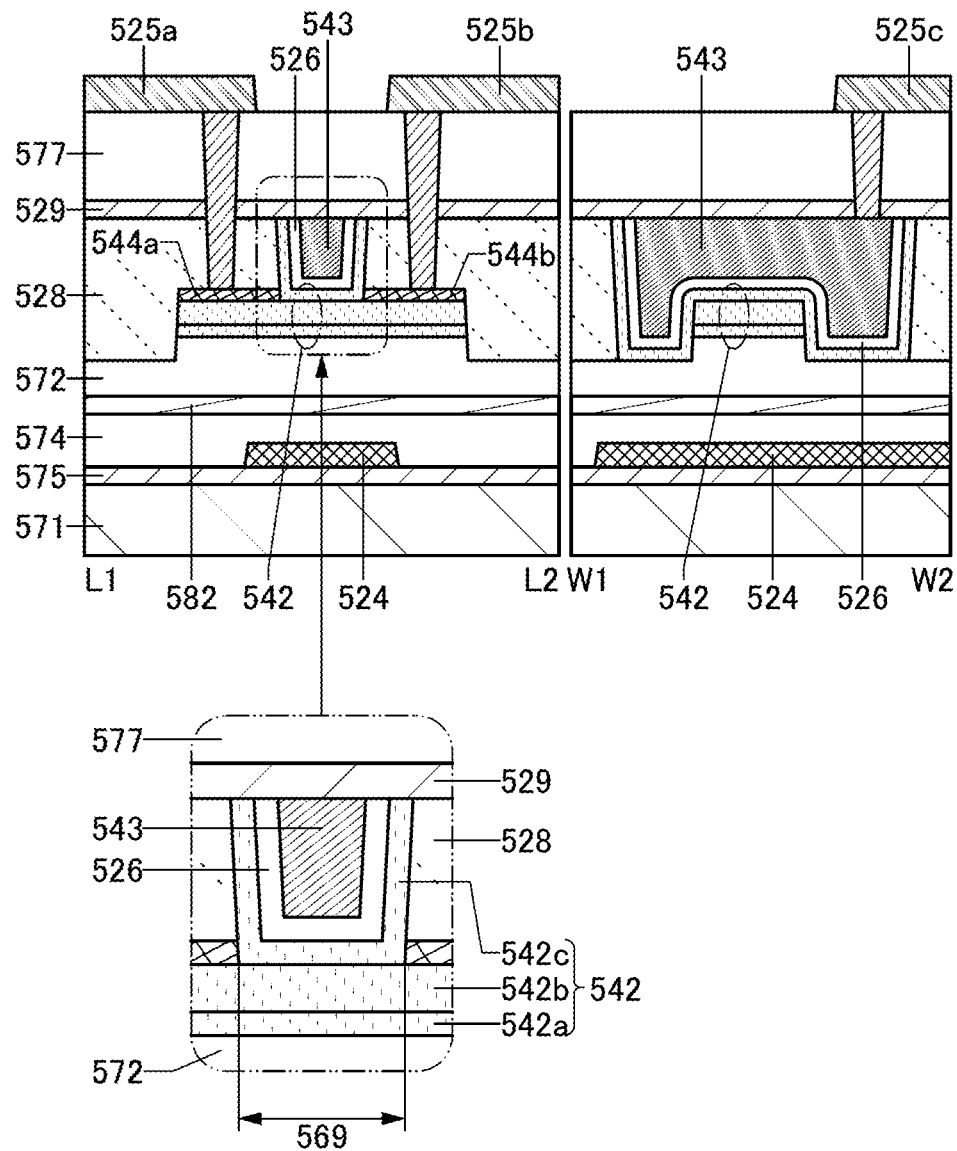
FIGS. 31A and 31B are a top view and a cross-sectional view illustrating an example of a transistor.

FIGS. 31A and 31B illustrate another example of an s-channel transistor. FIG. 31A is a top view of a transistor 453. FIG. 31B is a cross-sectional view along dashed-dotted line L1-L2 and dashed-dotted line W1-W2 in FIG. 31A. As in the transistor 451, the transistor 453 includes the semiconductor layer 542a and the semiconductor layer 542b over the projection of the insulating layer 572. The electrode 544a and the electrode 544b are provided over the semiconductor layer 542b. A region of the semiconductor layer 542b that overlaps with the electrode 544a can function as one of a source and a drain of the transistor 453. A region of the semiconductor layer 542b that overlaps with the electrode 544b can function as the other of the source and the drain of the transistor 453. Thus, a region 569 of the semiconductor layer 542b that is located between the electrode 544a and the electrode 544b can function as a channel formation region.

In the transistor 453, an opening is provided in a region overlapping with the region 569 by removing part of the insulating layer 528, and the semiconductor layer 542c is provided along a side and bottom surfaces of the opening. In the opening, the insulating layer 526 is provided along the side and bottom surfaces of the opening with the semiconductor layer 542c located therebetween. In addition, in the opening, the electrode 543 is provided along the side and bottom surfaces of the opening with the semiconductor layer 542c and the insulating layer 526 located therebetween.

Note that the opening is wider than the semiconductor layer 542a and the semiconductor layer 542b in the cross section in the channel width direction. Thus, in the region 569, side surfaces of the semiconductor layer 542a and the semiconductor layer 542b are covered with the semiconductor layer 542c.

The insulating layer 529 is provided over the insulating layer 528 and an insulating layer 577 is provided over the insulating layer 529. The electrode 525a, the electrode 525b, and the electrode 525c are provided over the insulating layer 577. The electrode 525a is electrically connected to the electrode 544a via a contact plug in an opening formed by removing part of the insulating layers 577, 529, and 528. The electrode 525b is electrically connected to the electrode 544b via a contact plug in an opening formed by removing part of the insulating layers 577, 529, and 528. The electrode 525c is electrically connected to the electrode 543 via a contact plug in an opening formed by removing part of the insulating layers 577 and 529.

Figure 32A:
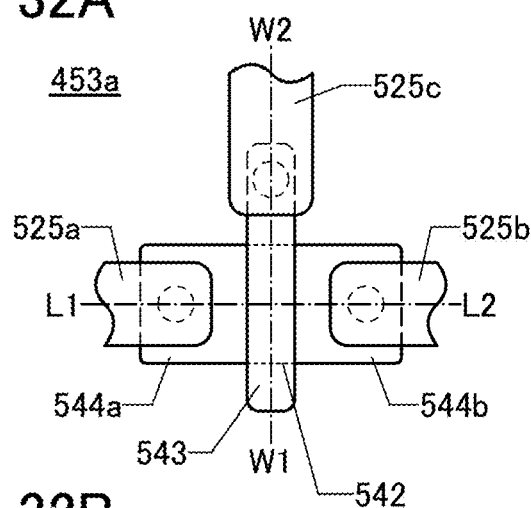
FIGS. 32A and 32B are a top view and a cross-sectional view illustrating an example of a transistor.
Figure 32B:
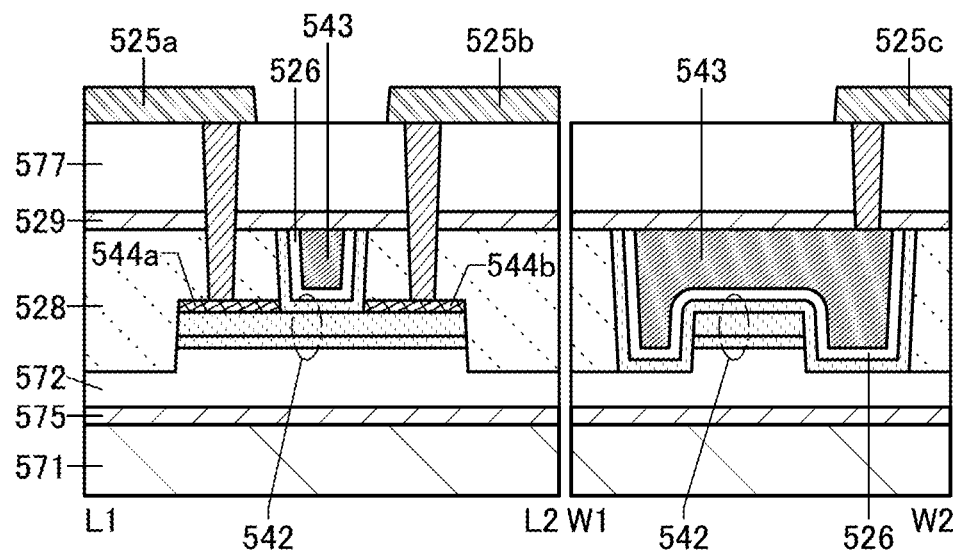

The electrode 524 that can function as a back gate is not necessarily provided, depending on the purpose. FIG. 32A is a top view of a transistor 453a. FIG. 32B is a cross-sectional view along dashed-dotted line L1-L2 and dashed-dotted line W1-W2 in FIG. 32A. The transistor 453a has a structure in which the electrode 524, and the insulating layers 574 and 582 are removed from the transistor 453. The productivity of the transistor can be improved by omission of the electrode and the insulating layers. Accordingly, the productivity of the display device can be improved.

Figure 33A:
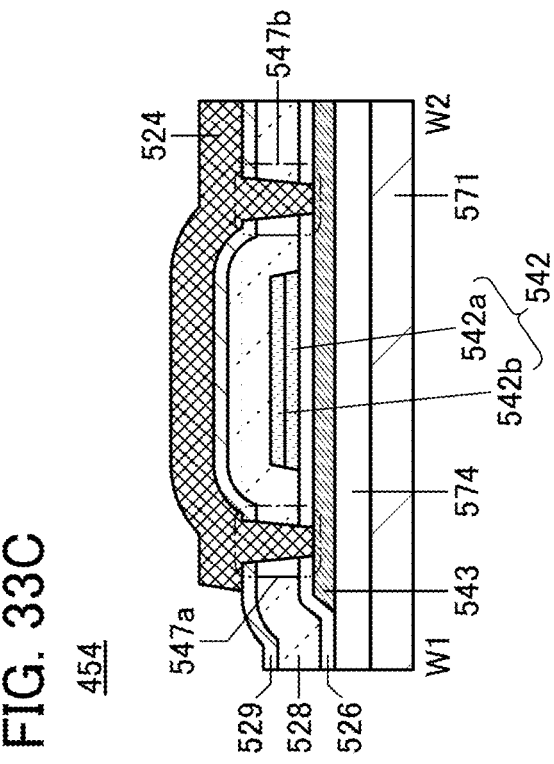
FIGS. 33A to 33C are a top view and cross-sectional views illustrating an example of a transistor.
Figure 33B:
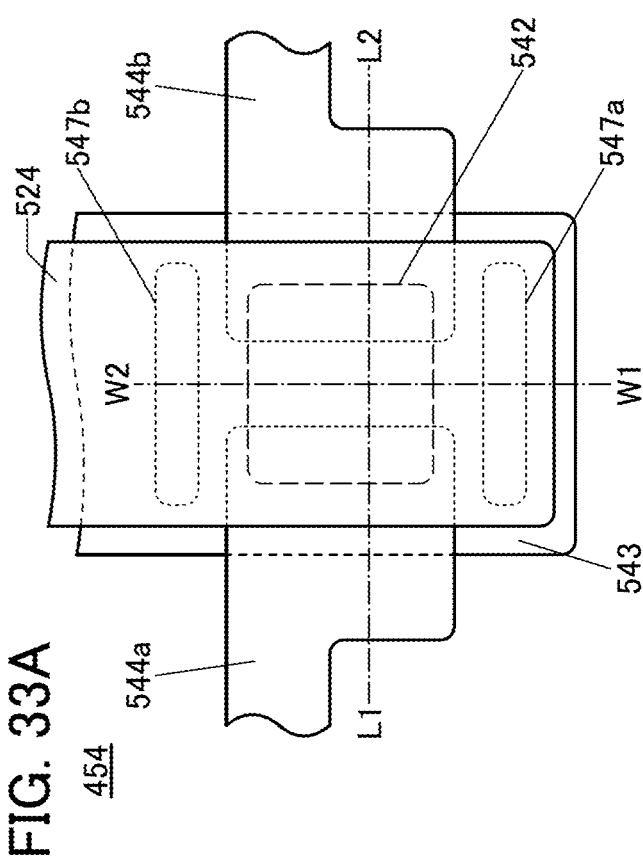
Figure 33C:
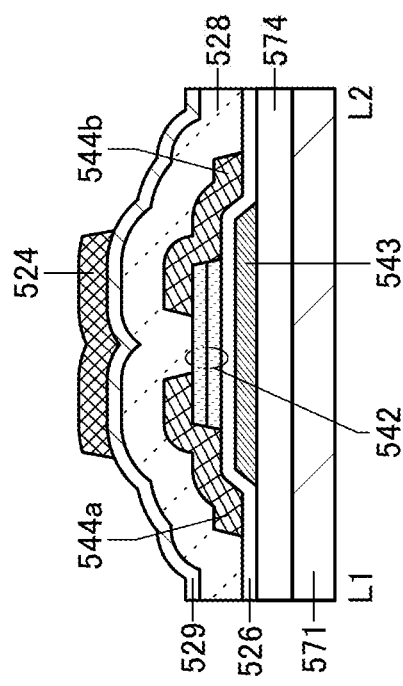

FIGS. 33A to 33C illustrate another example of an s-channel transistor. FIG. 33A is a top view of a transistor 454. FIG. 33B is a cross-sectional view along dashed-dotted line L1-L2 in FIG. 33A. FIG. 33C is a cross-sectional view along dashed-dotted line W1-W2 in FIG. 33A.

The transistor 454 is a kind of bottom-gate transistor having a back-gate electrode. In the transistor 454, the electrode 543 is formed over the insulating layer 574, and the insulating layer 526 is provided to cover the electrode 543. The semiconductor layer 542 is formed in a region that is over the insulating layer 526 and overlaps with the electrode 543. The semiconductor layer 542 in the transistor 454 has a stacked structure of the semiconductor layer 542a and the semiconductor layer 542b.

The electrode 544a and the electrode 544b are formed over the insulating layer 526 so as to be in contact with part of the semiconductor layer 542. The insulating layer 528 is formed over the electrode 544a and the electrode 544b so as to be in contact with part of the semiconductor layer 542. The insulating layer 529 is formed over the insulating layer 528. The electrode 524 is formed in a region over the insulating layer 529 that overlaps with the semiconductor layer 542.

The electrode 524 provided over the insulating layer 529 is electrically connected to the electrode 543 in an opening 547a and an opening 547b provided in the insulating layer 529, the insulating layer 528, and the insulating layer 526. Accordingly, the same potential is supplied to the electrodes 524 and 543. Furthermore, either or both of the openings 547a and 547b may be omitted. In the case where neither the opening 547a nor the opening 547b is provided, different potentials can be supplied to the electrode 524 and the electrode 543.

Figure 34A:
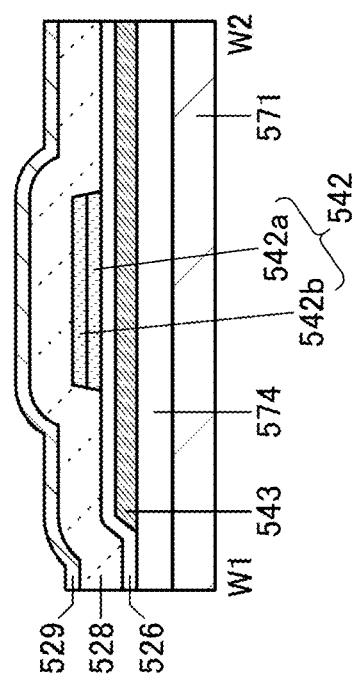
FIGS. 34A to 34C are a top view and cross-sectional views illustrating an example of a transistor.
Figure 34B:
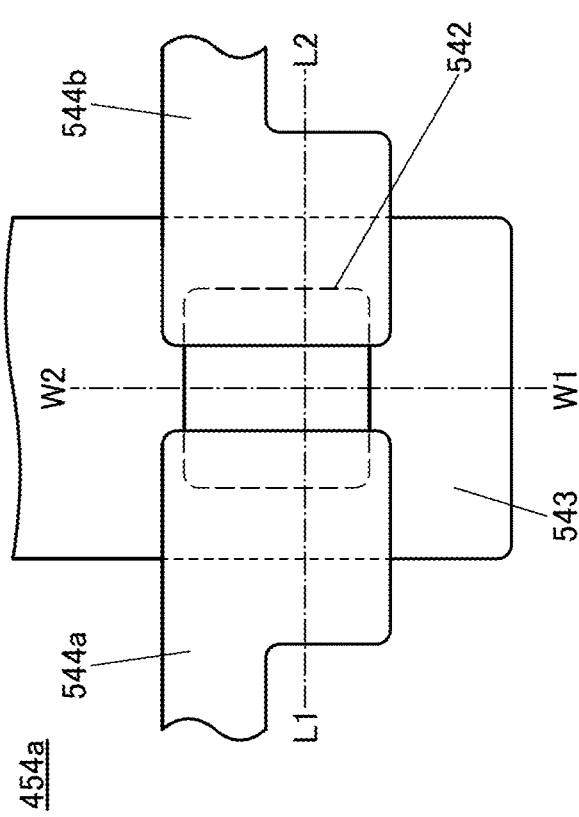
Figure 34C:
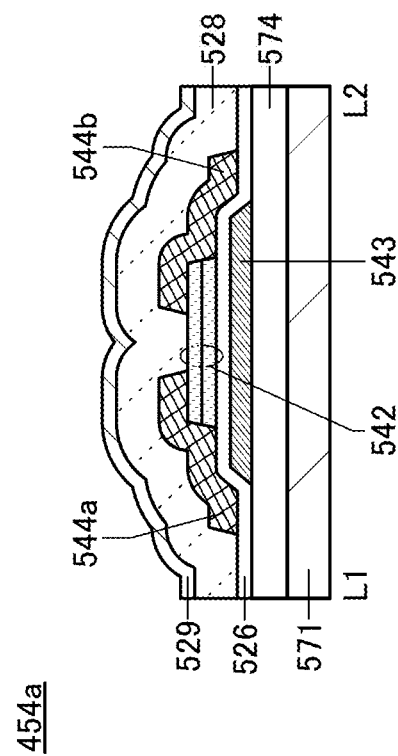

The electrode 524 that can function as a back gate is not necessarily provided, depending on the purpose. FIG. 34A is a top view of a transistor 454a. FIG. 34B is a cross-sectional view along dashed-dotted line L1-L2 in FIG. 34A. FIG. 34C is a cross-sectional view along dashed-dotted line W1-W2 in FIG. 34A. The transistor 454a has a structure in which the electrode 524, and the openings 547a and 547b are removed from the transistor 454. The productivity of the transistor can be improved by omission of the electrode and the openings. Accordingly, the productivity of the display device can be improved.

Figure 35A:
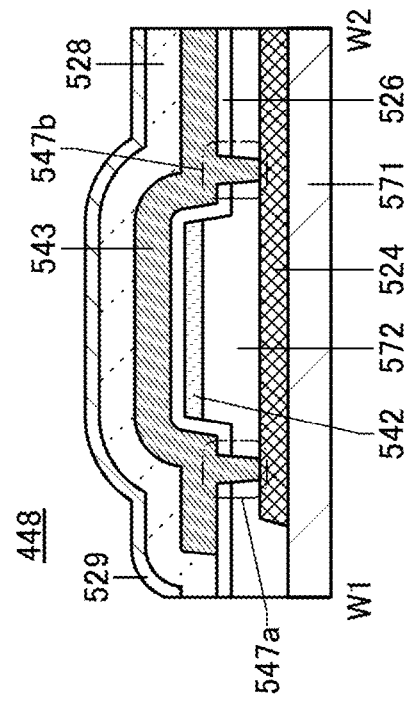
FIGS. 35A to 35C are a top view and cross-sectional views illustrating an example of a transistor.
Figure 35B:
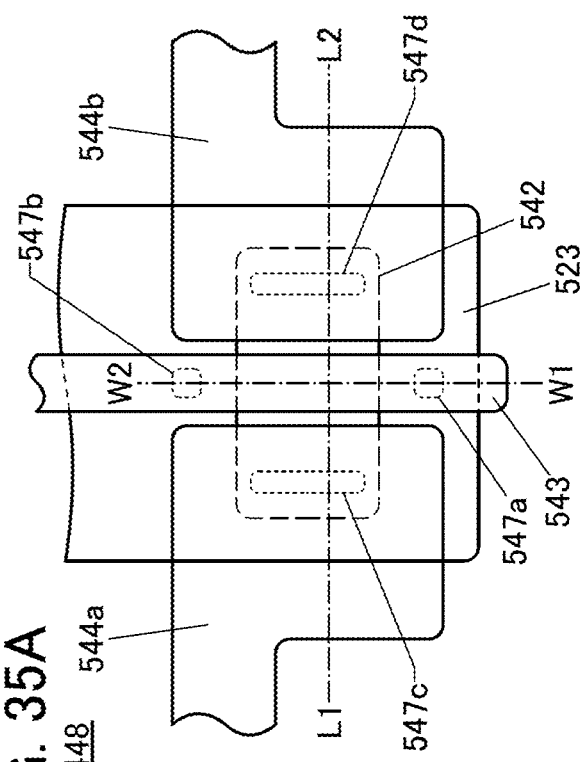
Figure 35C:
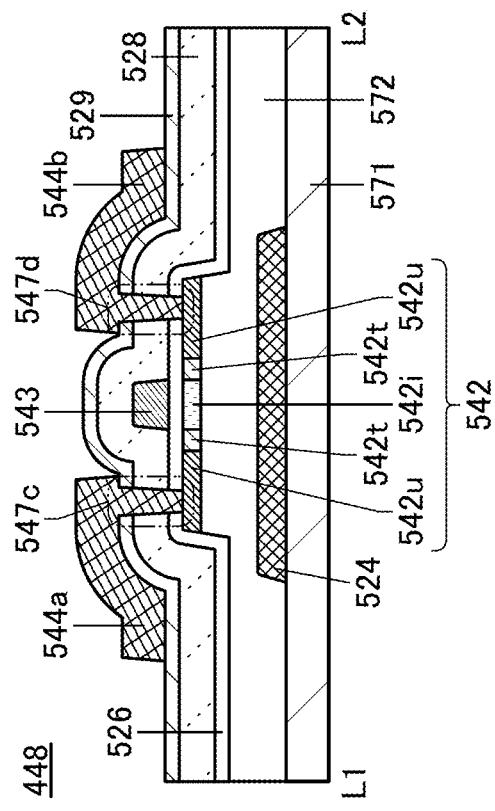

FIGS. 35A to 35C illustrate another example of an s-channel transistor. A transistor 448 in FIGS. 35A to 35C has almost the same structure as the transistor 447. The transistor 448 is a kind of top-gate transistor having a back gate. FIG. 35A is a top view of the transistor 448. FIG. 35B is a cross-sectional view along dashed-dotted line L1-L2 in FIG. 35A. FIG. 35C is a cross-sectional view along dashed-dotted line W1-W2 in FIG. 35A.

FIGS. 35A to 35C illustrate an example in which an inorganic semiconductor layer such as a silicon layer is used as the semiconductor layer 542 in the transistor 448. In FIGS. 35A to 35C, the electrode 524 is provided over the substrate 571, and the insulating layer 572 is provided over the electrode 524. In addition, the semiconductor layer 542 is formed over a projection of the insulating layer 572.

The semiconductor layer 542 includes a semiconductor layer 542i, two semiconductor layers 542t, and two semiconductor layers 542u. The semiconductor layer 542i is sandwiched between the two semiconductor layers 542t. The semiconductor layer 542i and the two semiconductor layers 542t are sandwiched between the two semiconductor layers 542u. The electrode 543 is provided in a region overlapping with the semiconductor layer 542i.

A channel is formed in the semiconductor layer 542i when the transistor 448 is on. Therefore, the semiconductor layer 542i serves as a channel formation region. The semiconductor layers 542t serve as low concentration impurity regions (i.e., LDD regions). The semiconductor layers 542u serve as high concentration impurity regions. Note that one or both of the two semiconductor layers 542t are not necessarily provided. One of the two semiconductor layers 542u serves as a source region, and the other semiconductor layer 542u serves as a drain region.

The electrode 544a provided over the insulating layer 529 is electrically connected to one of the semiconductor layers 542u in an opening 547c formed in the insulating layers 526, 528, and 529. The electrode 544b provided over the insulating layer 529 is electrically connected to the other of the semiconductor layers 542u in an opening 547d formed in the insulating layers 526, 528, and 529.

The electrode 543 provided over the insulating layer 526 is electrically connected to the electrode 524 in the opening 547a and the opening 547b formed in the insulating layers 526 and 572. Accordingly, the same potential is supplied to the electrodes 543 and 524. Furthermore, either or both of the openings 547a and 547b may be omitted. In the case where neither the opening 547a nor the opening 547b is provided, different potentials can be applied to the electrodes 524 and 543.

This embodiment can be combined with any of the other embodiments as appropriate.

(Embodiment 3)

In this embodiment, a touch panel module and electronic devices that include the display device of one embodiment of the present invention will be described with reference to FIG. 36, FIGS. 37A to 37H, and FIGS. 38A and 38B.

Figure 36:
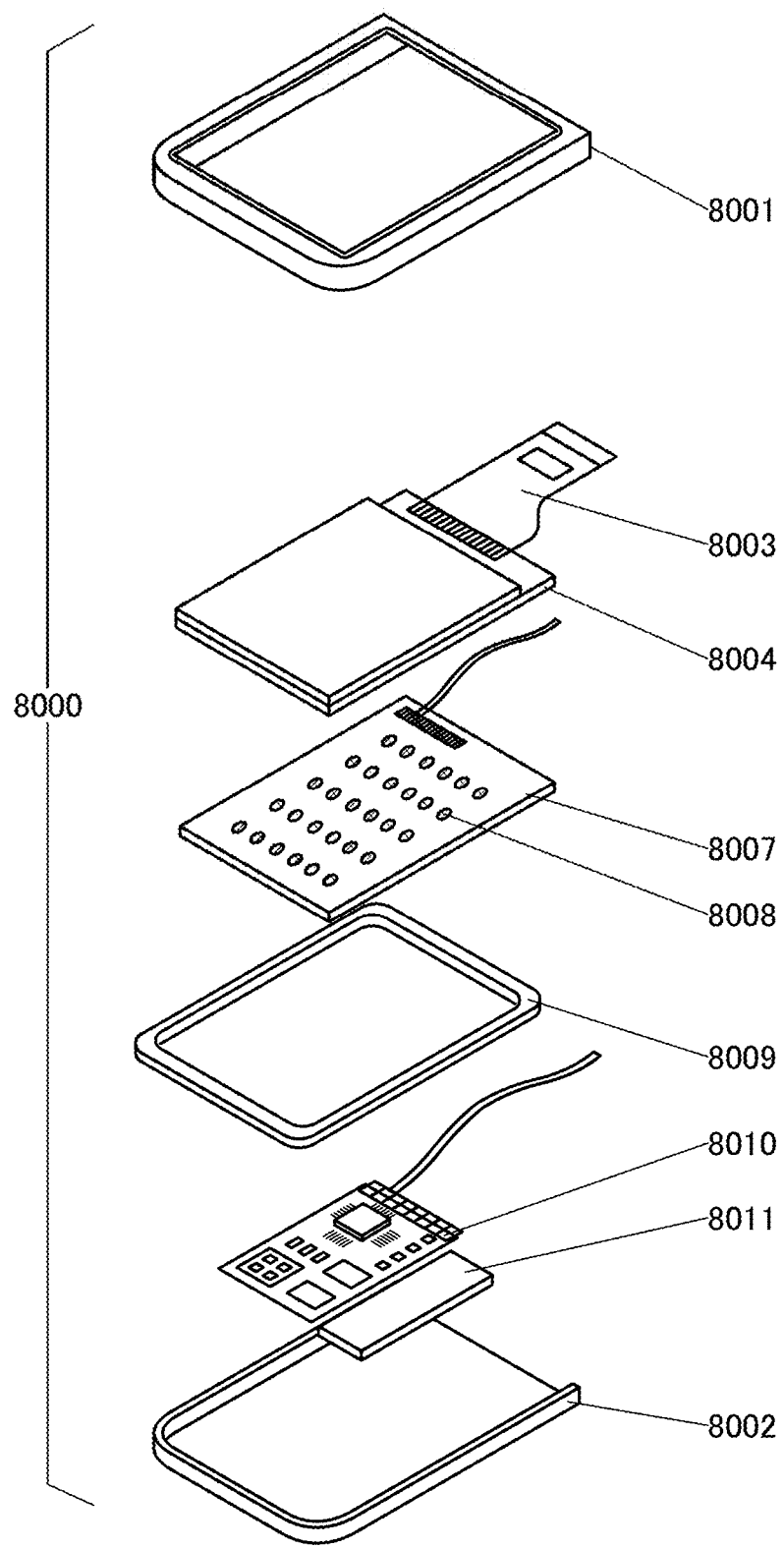
FIG. 36 illustrates an example of a touch panel module.

In a touch panel module 8000 illustrated in FIG. 36, a touch panel 8004 connected to an FPC 8003, a frame 8009, a printed circuit board 8010, and a battery 8011 are provided between a top cover 8001 and a bottom cover 8002.

The display device of one embodiment of the present invention can be used for the touch panel 8004, for example.

The shapes and sizes of the top cover 8001 and the bottom cover 8002 can be changed as appropriate in accordance with the size of the touch panel 8004.

The display device of one embodiment of the present invention can function as a touch panel. The touch panel 8004 can be a resistive touch panel or a capacitive touch panel and can be formed to overlap with the display device of one embodiment of the present invention. A counter substrate (sealing substrate) of the touch panel 8004 can have a touch panel function. A photo sensor may be provided in each pixel of the touch panel 8004 so that an optical touch panel can be obtained.

When a transmissive liquid crystal element is used, a backlight 8007 may be provided as illustrated in FIG. 36. The backlight 8007 includes a light source 8008. Although the light sources 8008 are provided over the backlight 8007 in FIG. 36, one embodiment of the present invention is not limited to this structure. For example, a structure in which the light source 8008 is provided at an end portion of the backlight 8007 and a light diffusion plate is further provided may be employed. In the case where a self-luminous light-emitting element such as an organic EL element is used or the case where a reflective panel or the like is used, the backlight 8007 is not necessarily provided.

The frame 8009 protects the touch panel 8004 and functions as an electromagnetic shield for blocking electromagnetic waves generated by the operation of the printed circuit board 8010. The frame 8009 can also function as a radiator plate.

The printed circuit board 8010 has a power supply circuit and a signal processing circuit for outputting a video signal and a clock signal. As a power source for supplying power to the power supply circuit, an external commercial power source or the battery 8011 provided separately may be used. The battery 8011 can be omitted in the case of using a commercial power source.

The touch panel 8004 can be additionally provided with a component such as a polarizer, a retardation film, or a prism sheet.

FIGS. 37A to 37H and FIGS. 38A and 38B illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (sensor having a function of measuring force, disarrangement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, smell, or infrared ray), a microphone 5008, and the like.

Figure 37A:
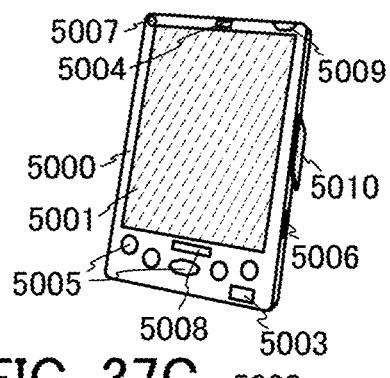
FIGS. 37A to 37H illustrate examples of electronic devices.
Figure 37B:
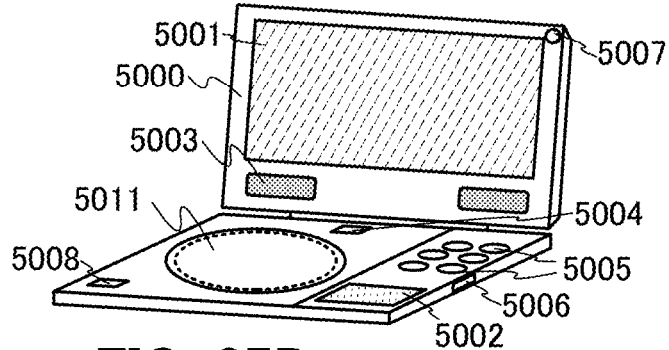
Figure 37C:
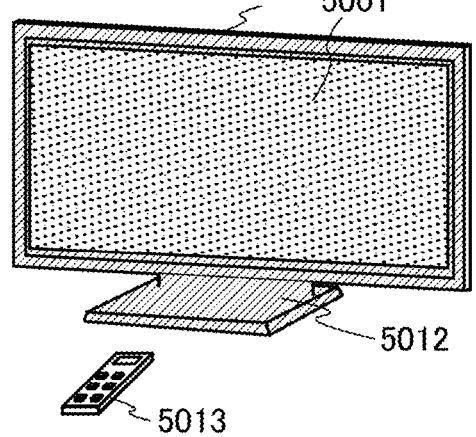
Figure 37D:
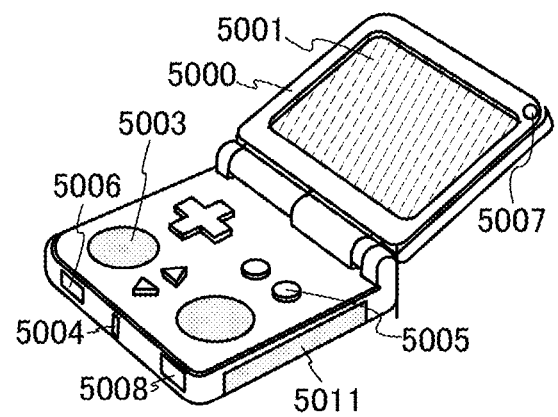
Figure 37E:
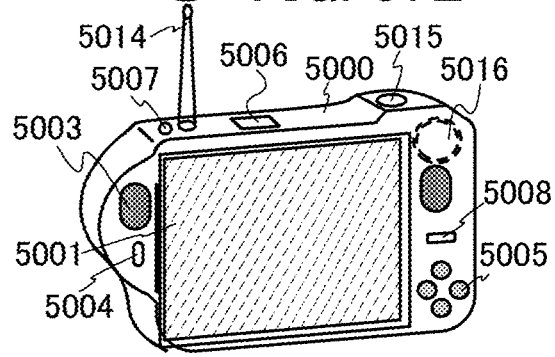
Figure 37F:
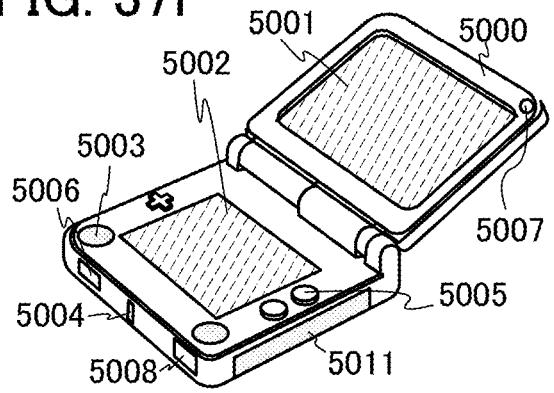
Figure 37G:
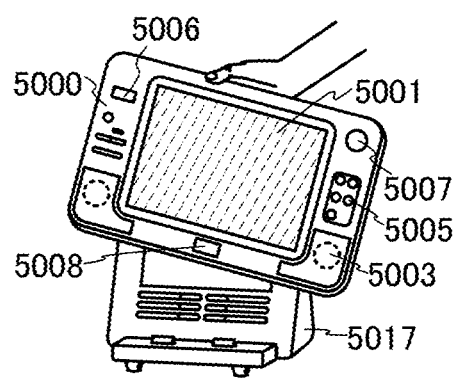
Figure 37H:
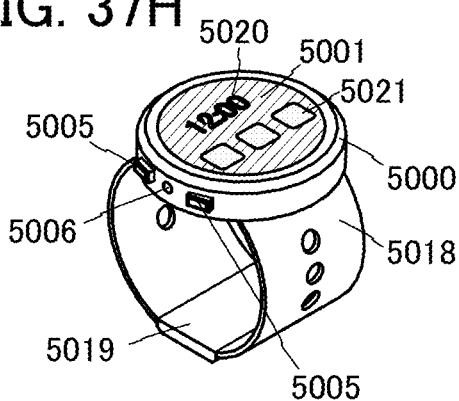
Figure 38A:
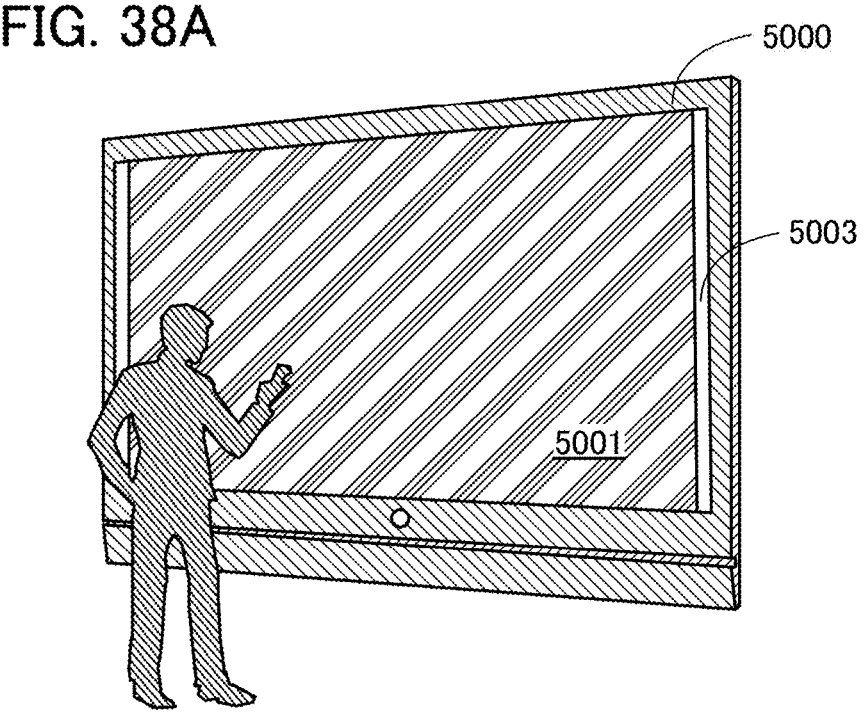
FIGS. 38A and 38B illustrate examples of electronic devices.
Figure 38B:
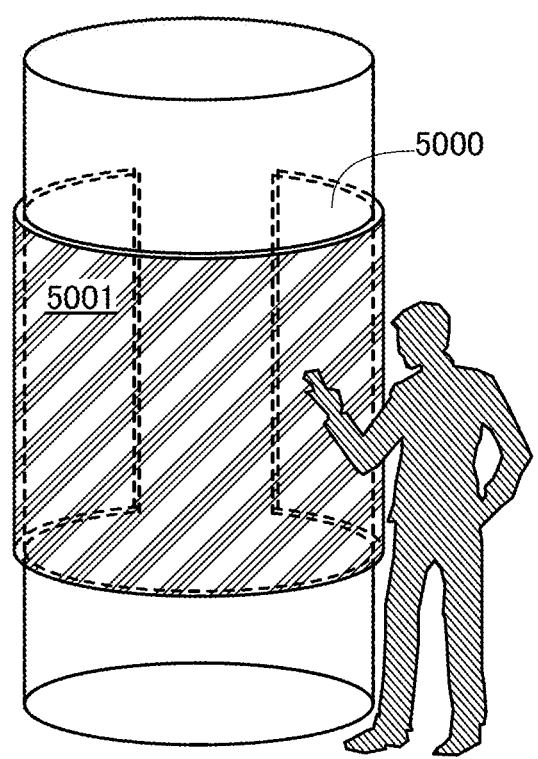

FIG. 37A illustrates a mobile computer, which can include a switch 5009, an infrared port 5010, and the like in addition to the above components. FIG. 37B illustrates a portable image reproducing device provided with a memory medium (e.g., a DVD reproducing device), which can include a second display portion 5002, a memory medium reading portion 5011, and the like in addition to the above components. FIG. 37C illustrates a television device, which can include a stand 5012 and the like in addition to the above components. The television device can be operated by an operation switch of the housing 5000 or a separate remote controller 5013. With operation keys of the remote controller 5013, channels and volume can be controlled, and images displayed on the display portion 5001 can be controlled. The remote controller 5013 may be provided with a display portion for displaying data output from the remote controller 5013. FIG. 37D illustrates a portable game machine which can include the memory medium reading portion 5011 and the like in addition to the above components. FIG. 37E illustrates a digital camera having a television reception function, which can include an antenna 5014, a shutter button 5015, an image receiving portion 5016, and the like in addition to the above components. FIG. 37F illustrates a portable game machine which can include the second display portion 5002, the memory medium reading portion 5011, and the like in addition to the above components. FIG. 37G illustrates a portable television receiver which can include a charger 5017 capable of transmitting and receiving signals, and the like in addition to the above components. FIG. 37H illustrates a wrist-watch-type information terminal, which can include a band 5018, a clasp 5019, and the like in addition to the above components. The display portion 5001 mounted in the housing 5000 also serving as a bezel includes a non-rectangular display region. The display portion 5001 can display an icon 5020 indicating time, another icon 5021, and the like. FIG. 38A illustrates a digital signage. FIG. 38B illustrates a digital signage mounted on a cylindrical pillar.

The electronic devices illustrated in FIGS. 37A to 37H and FIGS. 38A and 38B can have a variety of functions. For example, the electronic devices illustrated in FIGS. 37A to 37H and FIGS. 38A and 38B can have a variety of functions, for example, a function of displaying a variety of information (a still image, a moving image, a text image, and the like) on the display portion, a touch panel function, a function of displaying a calendar, the date, the time, and the like, a function of controlling processing with a variety of software (programs), a wireless communication function, a function of connecting to a variety of computer networks with a wireless communication function, a function of transmitting and receiving a variety of data with a wireless communication function, and a function of reading a program or data stored in a storage medium and displaying the program or data on the display portion. Furthermore, the electronic device including a plurality of display portions can have a function of displaying image information mainly on one display portion while displaying text information on another display portion, a function of displaying a three-dimensional image by displaying images where parallax is considered on a plurality of display portions, or the like. Furthermore, the electronic device including an image receiver can have a function of shooting a still image, a function of taking a moving image, a function of automatically or manually correcting a shot image, a function of storing a shot image in a memory medium (an external memory medium or a memory medium incorporated in the camera), a function of displaying a shot image on the display area, or the like. Note that the functions of the electronic devices illustrated in FIGS. 37A to 37H and FIGS. 38A and 38B are not limited thereto, and the electronic devices can have a variety of functions.

The electronic devices in this embodiment each include a display portion for displaying some kind of information. The display device of one embodiment of the present invention can be used for the display portion.

This embodiment can be combined with any of the other embodiments as appropriate.

Example 1

In this example, a liquid crystal display device of one embodiment of the present invention will be described.

<Examination of Semiconductor Materials>

In this example, an oxide semiconductor, specifically, a CAAC-OS is used for a semiconductor layer of a transistor.

A transistor using a CAAC-OS (a CAAC-OS FET) has a lower off-state current than a transistor using low-temperature polysilicon (LTPS) (an LTPS FET).

In a non-selection period after data is written, charge gradually decreases when an off-state current flows between a source and a drain of a selection transistor in a pixel. This changes the voltage applied to liquid crystal molecules and causes a change in optical characteristics to be visible. Hence, a display device with a high off-state current requires constant data writing, leading to an increase in power consumption. The CAAC-OS FET has a lower off-state current than the LTPS FET; thus, almost no charge moves in a non-selection period and the voltage applied to liquid crystals does not change. Therefore, power consumption can be prevented from increasing with the number of times of rewriting.

<Examination of Transistor Structures>

In this example, two types of 1058 ppi pixel layouts with an FFS mode were fabricated: one uses a bottom-gate top-contact (BGTC) transistor, and the other uses a top-gate self-aligned (TGSA) transistor. Then, an alignment simulation in the FFS mode was conducted on the two structures.

FIGS. 39A and 39B illustrate pixel layouts using the BGTC transistor. FIG. 39A illustrates the transistor, the pixel electrode 111, and the first common electrode 112. The BGTC transistor includes the gate 221, the semiconductor layer 231, and the conductive layers 222a and 222b serving as the source and drain electrodes. FIG. 39B is a top view in which the first common electrode 112 is omitted from the layered structure in FIG. 39A.

In FIGS. 39A and 39B, one conductive layer can be considered to serve as both the scan line 228 and the gate 221. Also in FIGS. 39A and 39B, one conductive layer can be considered to serve as both the signal line 229 and the conductive layer 222a.

The pixel layouts with the TGSA transistor are similar to those in FIGS. 3B and 3C.

In this example, design simulator for liquid crystal display devices (LCD Master 3-D Full set FEM mode) manufactured by Shintech, Inc. was used, and a periodic boundary condition was adopted. The simulation in this example was conducted on a structure including two adjacent subpixels: two subpixels illustrated in FIG. 3B or FIG. 39A are arranged side by side, the left subpixel displays white (a voltage ranging from 0 V to 6 V is applied to the pixel electrode 111), and the right subpixel displays black (a voltage of 0 V is applied to the pixel electrode 111). Each subpixel has a size of 8 μm×24 μm.

The simulation was performed under the conditions where a negative liquid crystal material ($\Delta\varepsilon=-3$) is used, the cell gap is 3.5 μm, and a voltage of 0 V is applied to the first common electrode 112.

Figure 40A:
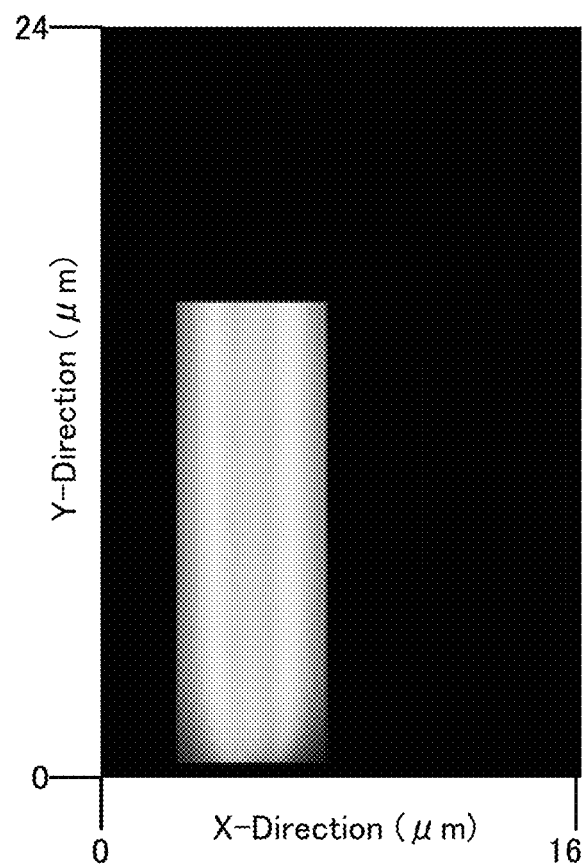
FIGS. 40A and 40B show alignment simulation results in Example 1.
Figure 40B:
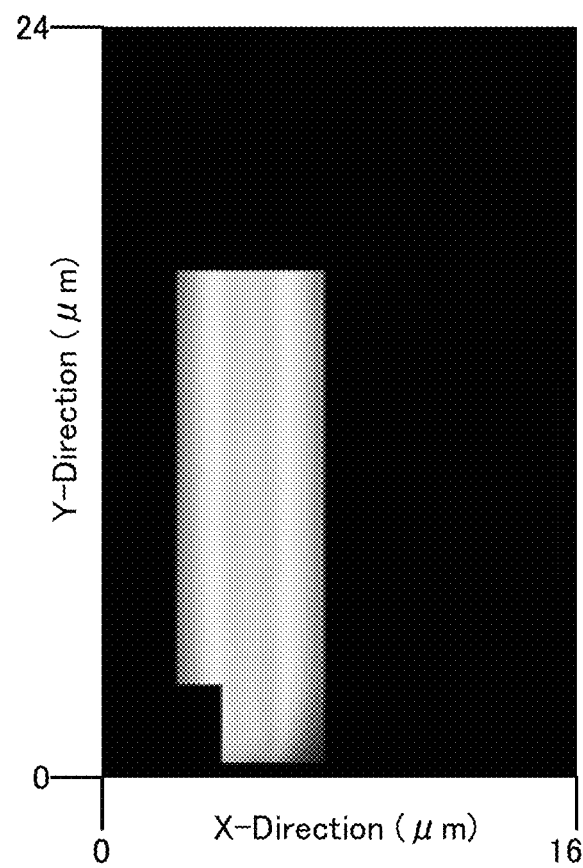

FIGS. 40A and 40B show the alignment simulation results with the BGTC transistor and the TGSA transistor, respectively. In each of FIGS. 40A and 40B, the in-plane distribution at the maximum transmittance is shown.

The alignment simulation results indicate that with the TGSA structure, a higher aperture ratio, liquid crystal transmittance, and effective transmittance can be obtained than with the BGTC structure. Specifically, the aperture ratio of the TGSA structure is 37.0%, 1.016 times as high as that (36.4%) of the BGTC structure; the liquid crystal transmittance of the TGSA structure is 1.030 times as high as that of the BGTC structure; and the effective transmittance of the TGSA structure is 1.044 times as high as that of the BGTC structure.

In view of the above results, the TGSA transistors were used in the subsequent examinations. In the following simulations in this example, two subpixels illustrated in FIG. 3B are arranged side by side, one of which on the left displays white and the other of which on the right displays black.

<Examination of Liquid Crystal Materials>

Next, an alignment simulation was conducted to compare the alignment states of a positive liquid crystal material ($\Delta\varepsilon=3.8$) and a negative liquid crystal material ($\Delta\varepsilon=-3$).

Figure 41A:
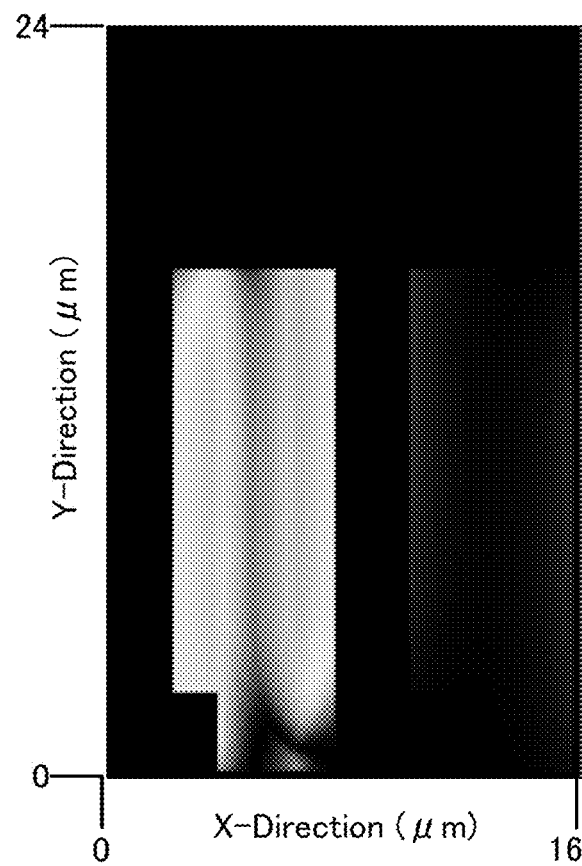
FIGS. 41A and 41B show alignment simulation results in Example 1.
Figure 41B:
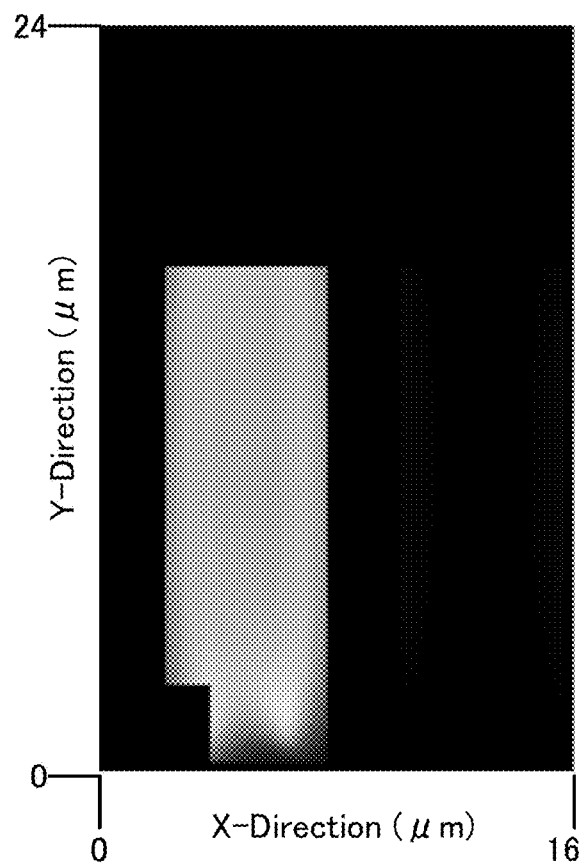

FIGS. 41A and 41B show the alignment simulating results with the positive liquid crystal material and the negative liquid crystal material, respectively. In each of FIGS. 41A and 41B, the in-plane distribution at the maximum transmittance is shown.

The simulation was performed under the conditions where the cell gap is 3.5 μm, a positive polarity is applied, and a flexoelectric effect is produced. The flexoelectric effect is a phenomenon in which polarization is induced by the distortion of orientation, and mainly depends on the shape of a molecule. The deformation causing the flexoelectric effect can be reduced in the negative liquid crystal material than in the positive liquid crystal material. The subsequent simulations in this example were all conducted under the condition with the flexoelectric effect.

As shown in FIG. 41A, with the positive liquid crystal material, a region with a lower transmittance due to alignment defects is found in the subpixel displaying white. In addition, light leakage occurs in the adjacent subpixel (the subpixel displaying black).

As shown in FIG. 41B, with the negative liquid crystal material, the white subpixel is entirely covered by a transmitting region. Furthermore, the amount of light leakage observed in the periphery of the adjacent subpixel (black subpixel) is small compared with the case where the positive liquid crystal material is used.

In view of the above results, the negative liquid crystal materials were used in the subsequent examinations.

Next, the results of the alignment simulation in which a negative liquid crystal material is used and a positive or negative polarity is applied were compared. When the positive polarity is applied, the simulation was performed under the condition where a voltage of 0 V to 6 V is applied to the pixel electrode 111 of the subpixel that displays white (the left subpixel); when the negative polarity is applied, the simulation was performed under the condition where a voltage of 0 V to −6 V is applied to the pixel electrode 111 of the subpixel that displays white.

In this example, the alignment simulation was conducted under two conditions: in a first condition, the cell gap is 3.5 μm; and in a second condition, the cell gap is 2.5 μm and the second common electrode (to which a voltage of 0 V was applied) is employed. The layout of the second common electrode is similar to that of the first common electrode 112 in FIG. 3B. That is, the first common electrode 112 and the second common electrode include openings that have the same size and are in the same position. The width of the opening (the horizontal length of the opening in the first common electrode 112 illustrated in FIG. 3B) is 3 μm.

Figure 42A:
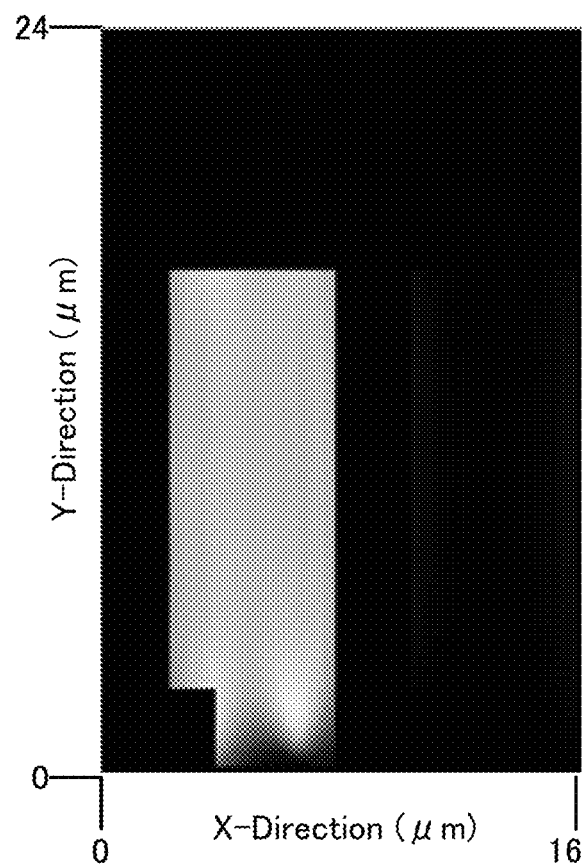
FIGS. 42A and 42B show alignment simulation results in Example 1.
Figure 42B:
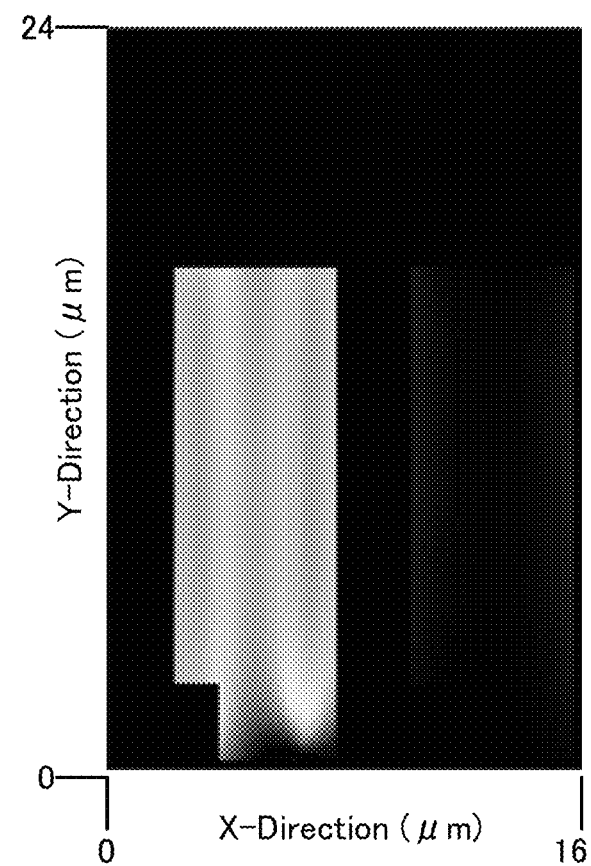
Figure 43A:
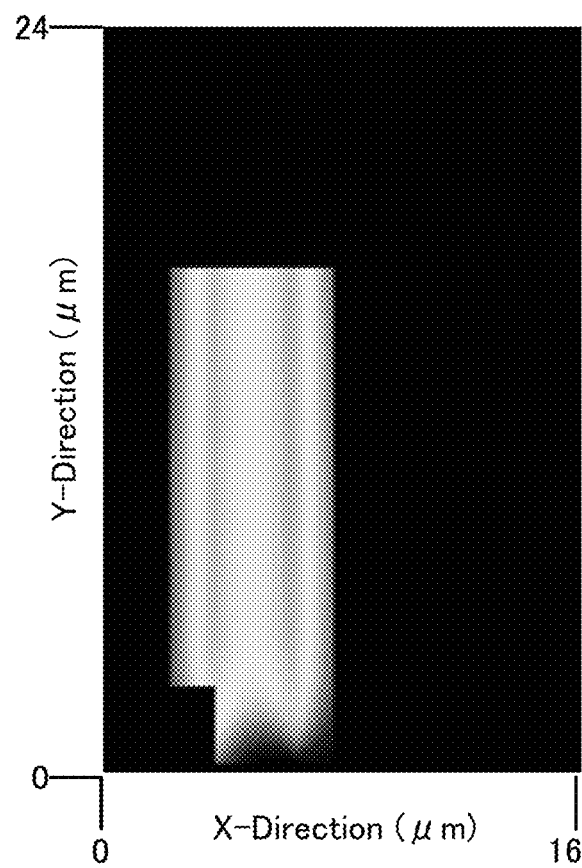
FIGS. 43A and 43B show alignment simulation results in Example 1.
Figure 43B:
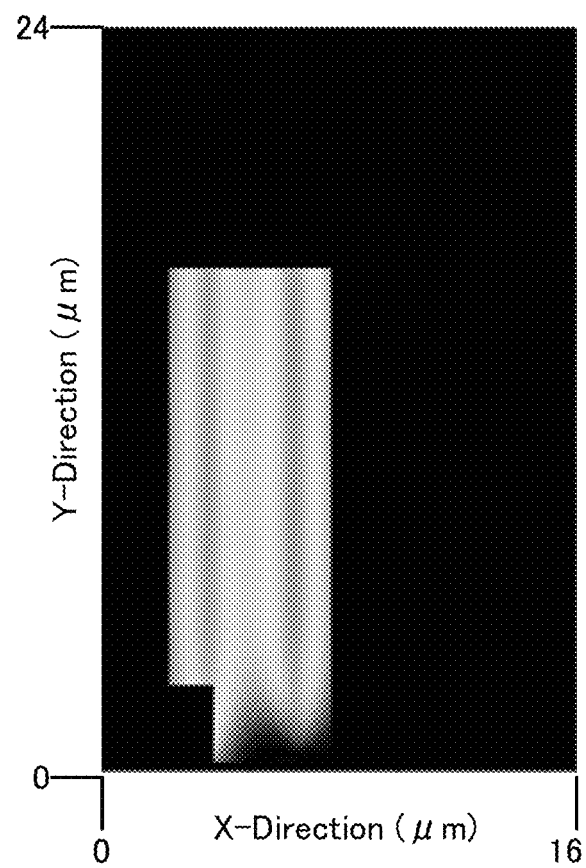

FIGS. 42A and 42B show the alignment simulation results where the cell gap is 3.5 μm. FIGS. 43A and 43B show the alignment simulation results where the cell gap is 2.5 μm and the second common electrode (to which a voltage of 0 V is applied) is employed. In each of FIGS. 42A to 43B, the in-plane distribution at the maximum transmittance is shown. FIGS. 42A and 43A show the results where a positive voltage is applied whereas FIGS. 42B and 43B show the results where a negative voltage is applied.

FIGS. 43A and 43B indicate that alignment defects in adjacent pixels can be reduced by reducing the cell gap to 2.5 μm and using the second common electrode. In addition, the distribution of the transmittance of the subpixel displaying white and the degree of light leakage between adjacent pixels do not vary with a difference in polarity. A variation in optical characteristics due to polarity is small, which suppresses flickering in the display device. In addition, a large light-blocking region is not necessary because the amount of light leakage is small, which achieves a high aperture ratio.

In this example, the aperture ratio of the pixel layout in FIG. 39A (without the second common electrode) is 36.4%, and the aperture ratio of the pixel layout in FIG. 3B (without the second common electrode) is 37.0%. By employing the second common electrode in the pixel layout in FIG. 3B, the aperture ratio increases to 41.0%.

Figure 44:
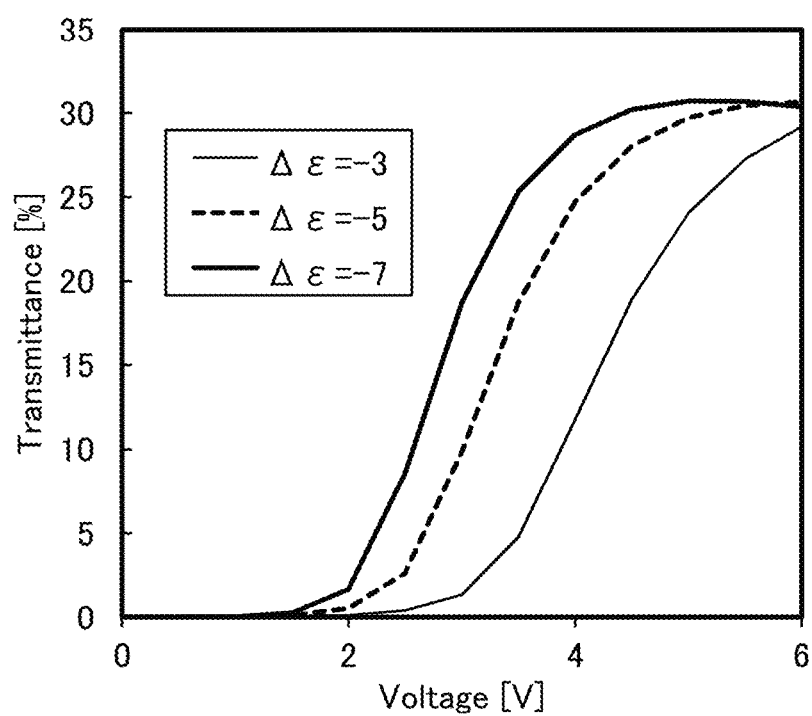
FIG. 44 shows simulation results in Example 1.

Next, the voltage-transmittance (V-T) characteristics of a pixel are examined by simulation. The dielectric anisotropy ($\Delta\varepsilon$) is −3, −5, and −7. FIG. 44 shows the simulation result.

FIG. 44 indicates that the saturated voltage decreases as the absolute value of $\Delta\varepsilon$ increases and that the curve of $\Delta\varepsilon=-7$ has maximum transmittance at approximately 4 V.

<Fabrication of Liquid Crystal Display Device>

Based on the above simulation results, a transmissive liquid crystal display device was fabricated by combining the pixel layout employing the second common electrode with a negative liquid crystal material.

The specifications of the display device are as follows. The size of a display portion is 4.16 inches in diagonal, the number of effective pixels is 3840 (H)×RGB×2160 (V), the definition is 1058 ppi, and the size of a subpixel is 8 μm (H)×24 μm (V).

As the display element, a liquid crystal element with an FFS mode was used. As the liquid crystal material, a negative liquid crystal material was used. A color filter (CF) method was used as the coloring method. The drive frequency was 60 Hz. An analog line sequential video signal format was used as the video signal format. The gate driver was incorporated. An analog switch was incorporated into the source driver and a COG was used.

A spacer with a height of approximately 2.5 μm was provided in the display device, so that the cell gap was approximately 2.5 μm. The dielectric anisotropy ($\Delta\varepsilon$) of a liquid crystal was −8 and the refractive index anisotropy ($\Delta n$) of the liquid crystal was 0.118. The width of an opening in the second common electrode was approximately 3 μm and the distance between openings in the second common electrode was approximately 5 μm.

Figure 45A:
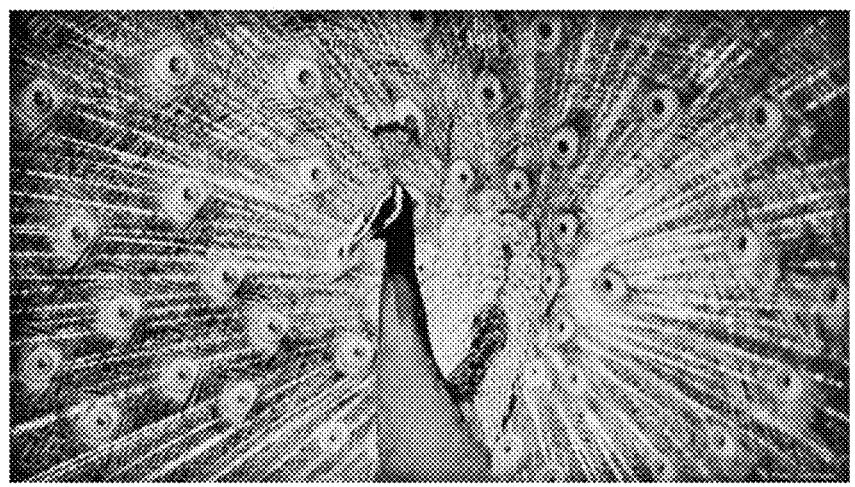
FIG. 45A is a photograph showing a display result of a display device in Example 1.
Figure 45B:
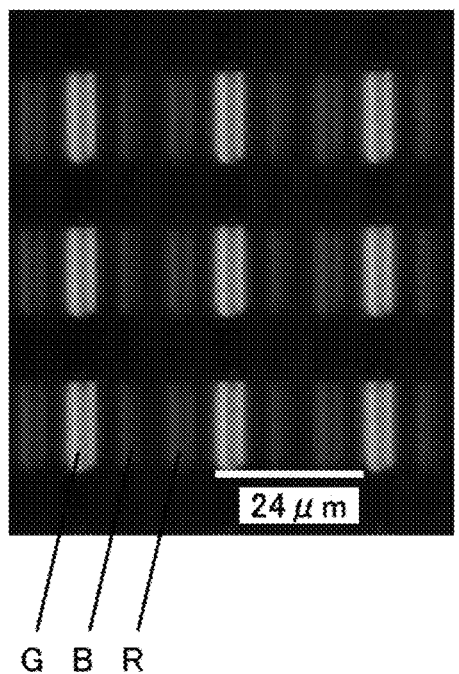
FIGS. 45B and 45C are optical micrographs of a display portion.
Figure 45C:
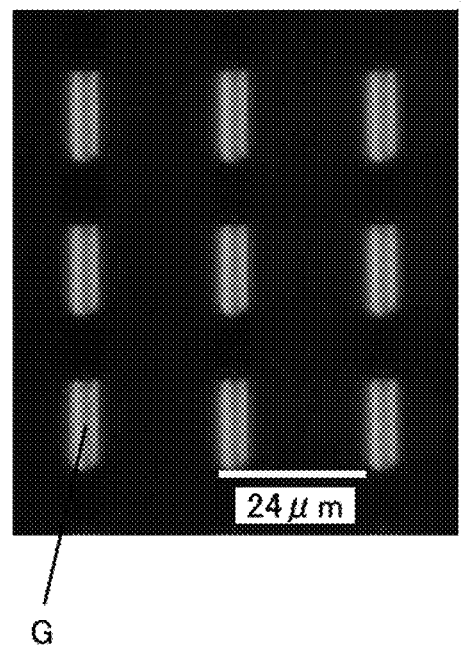

FIG. 45A is a photograph of the display device fabricated in this example that is displaying an image. FIGS. 45B and 45C are optical micrographs of the display portion: white is displayed in FIG. 45B and green is displayed in FIG. 45C.

As shown in FIG. 45B, favorable alignment was found when the pixel displays white. As shown in FIG. 45C, light leakage from subpixels other than subpixels emitting green was found to be reduced when the pixel displays green.

By combining a negative liquid crystal material, which has advantages of favorable alignment and low-voltage driving, with a top-gate CAAC-OS FET, which has advantages of low power consumption, high aperture ratio, and high transmittance, a 4K liquid crystal display device with a high definition of over 1000 ppi was fabricated.

Example 2

In Example 1, as a condition of the alignment simulation in which a negative liquid crystal material is used and a positive or negative polarity is applied, the cell gap is set to 2.5 μm and the second common electrode (to which a voltage of 0 V is applied) is employed.

This example shows the results of alignment simulations that are focused on the cell gap and the width of an opening in the second common electrode.

In this example, design simulator for liquid crystal display devices (LCD Master 3-D Full set FEM mode) manufactured by Shintech, Inc. was used, and a periodic boundary condition was adopted. The simulation in this example was conducted on a structure including two adjacent subpixels: two subpixels illustrated in FIG. 3B are arranged side by side, the left subpixel displays white (a voltage ranging from 0 V to 6 V is applied to the pixel electrode 111), and the right subpixel displays black (a voltage of 0 V is applied to the pixel electrode 111). Each subpixel has a size of 8 µm×24 µm. The width of the opening (the horizontal length of the opening in the first common electrode 112 illustrated in FIG. 3B) is 3 µm.

The simulation was performed under the conditions where a negative liquid crystal material (Δε=−3) is used, and a voltage of 0 V is applied to the first common electrode 112 and the second common electrode.

First, an alignment simulation was conducted under five conditions: the width of the opening in the second common electrode is 2 µm, 3 µm, 4 µm, 5 µm, and 8 µm. The width of the opening in the second common electrode is equal to the length L1, which is illustrated in FIGS. 1A and 1B and denotes the length of a region where the second common electrode 244 is not provided. Each subpixel has a size of 8 µm×24 µm as described above; the condition with L1=8 µm corresponds to the condition where the second common electrode is not provided in the subpixel. When L1=3 µm, the layout of the second common electrode can be considered similar to that of the first common electrode 112 illustrated in FIG. 3B. Note that the cell gap is 3 µm.

In this example, the transmittance and the contrast are calculated by the alignment simulation. The transmittance here refers to the average transmittance of subpixels that display white. The contrast is obtained by dividing the average transmittance of subpixels that display white by the average transmittance of subpixels that display black.

Figure 46A:
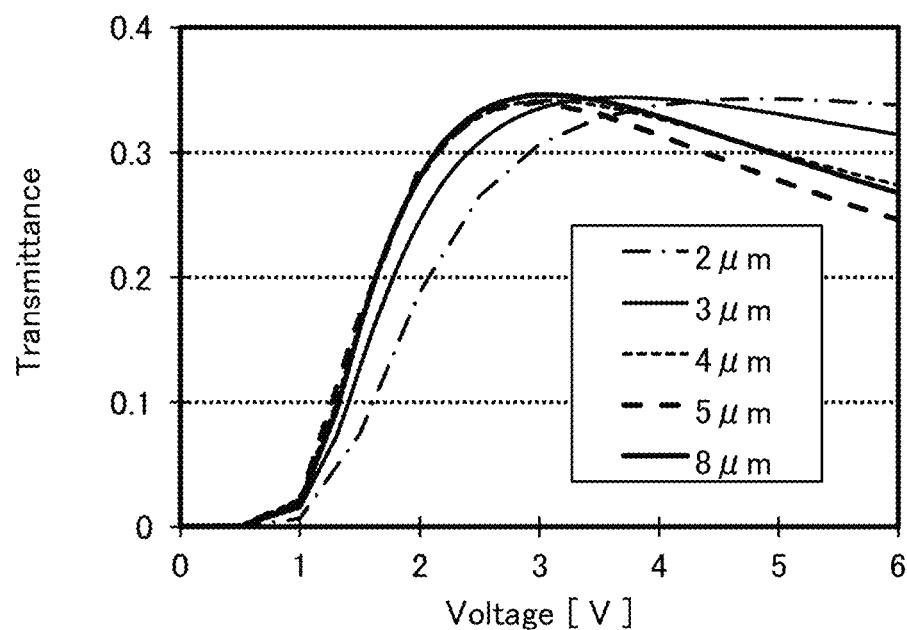
FIGS. 46A and 46B show simulation results in Example 2.
Figure 46B:
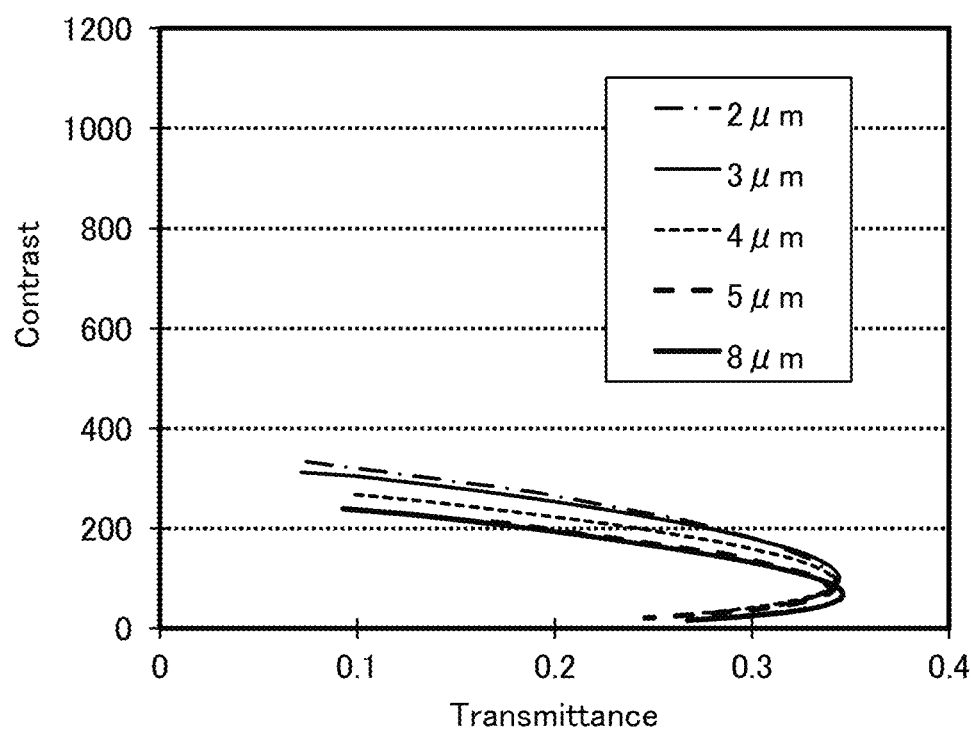

FIG. 46A shows the simulation results of voltage-transmittance characteristics and FIG. 46B shows the simulation results of transmittance-contrast characteristics. There results indicate that with the same transmittance, the contrast increases as the opening of the second common electrode has a narrower width. It is also found that as the opening of the second common electrode has a larger width, the maximum transmittance is obtained at a lower voltage.

Then, an alignment simulation was conducted under three conditions: the cell gap is 2.5 µm, 2.75 µm, and 3 µm. Note that the width of each opening in the first common electrode and the second common electrode is 3 µm.

Figure 47A:
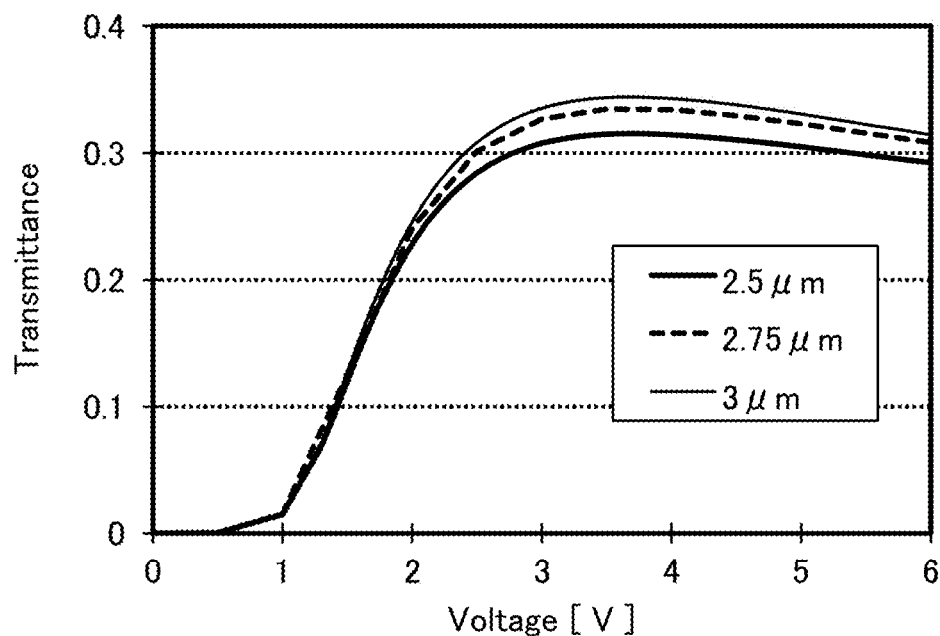
FIGS. 47A and 47B show simulation results in Example 2.
Figure 47B:
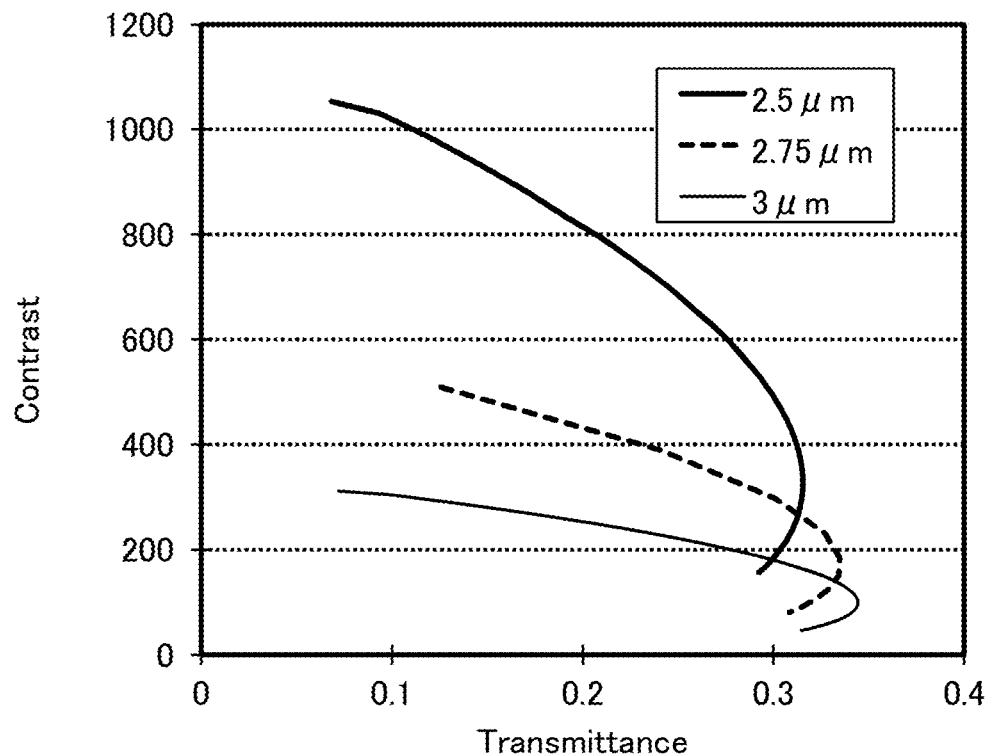

FIG. 47A shows the simulation results of voltage-transmittance characteristics and FIG. 47B shows the simulation results of transmittance-contrast characteristics. There results indicate that the contrast increases as the cell gap decreases, and that the transmittance increases as the cell gap increases.

This application is based on Japanese Patent Application serial No. 2016-050824 filed with Japan Patent Office on Mar. 15, 2016, and Japanese Patent Application serial No. 2016-101543 filed with Japan Patent Office on May 20, 2016, the entire contents of which are hereby incorporated by reference.

EXPLANATION OF REFERENCE

34: capacitor 40: liquid crystal element 45: light 51: substrate 56: conductive layer 56a: conductive layer 56b: conductive layer 57: auxiliary wiring 58: conductive layer 60: pixel 60a: subpixel 60b: subpixel 60c: subpixel 61: substrate 62: display portion 63: connection portion 64: driver circuit portion 65: wiring 66: non-display region 68: display region 68a: display region 68b: display region 69: connection portion 72: FPC 72a: FPC 72b: FPC 73: IC 73a: IC 73b: IC 81: scan line 82: signal line 100A: display device 100B: display device 100C: display device 100D: display device 100E: display device 100F: display device 111: pixel electrode 111a: pixel electrode 111b: pixel electrode 112: first common electrode 112a: first common electrode 112b: first common electrode 113: liquid crystal layer 117: spacer 119a: substrate 119b: substrate 121: overcoat 122: insulating layer 123: insulating layer 124: electrode 125: insulating layer 126: conductive layer 127: electrode 128: electrode 130: polarizer 131: coloring layer 132: light-blocking layer 132a: light-blocking layer 132b: light-blocking layer 133a: alignment film 133b: alignment film 137: wiring 138: wiring 139: auxiliary wiring 141: adhesive layer 160: protection substrate 161: backlight 162: substrate 163: adhesive layer 164: adhesive layer 165: polarizer 166: polarizer 167: adhesive layer 168: adhesive layer 169: adhesive layer 201: transistor 204: connection portion 206: transistor 211: insulating layer 212: insulating layer 213: insulating layer 214: insulating layer 215: insulating layer 216: insulating layer 220: insulating layer 221: gate 222a: conductive layer 222b: conductive layer 223: gate 228: scan line 229: signal line 231: semiconductor layer 231a: channel region 231b: low-resistance region 242: connector 242b: connector 243: connector 244: second common electrode 244a: second common electrode 244b: second common electrode 244c: second common electrode 251: conductive layer 281: conductive layer 282: conductive layer 283: conductive layer 284: conductive layer 285: conductive layer 286: conductive layer 350A: touch panel 350B: touch panel 350D: touch panel 360: region 370: display device 375: input device 376: input device 379: display device 410: transistor 411: transistor 415: input device 416: substrate 420: transistor 421: transistor 425: transistor 426: transistor 430: transistor 431: transistor 440: transistor 441: transistor 442: transistor 443: transistor 444: transistor 445: transistor 446: transistor 447: transistor 448: transistor 449: IC 450: FPC 451: transistor 451a: transistor 452: transistor 453: transistor 453a: transistor 454: transistor 454a: transistor 461: conductive film 462: conductive film 463: conductive film 464: nanowire 471: electrode 472: electrode 473: electrode 474: bridge electrode 476: wiring 477: wiring 522: insulating layer 523: electrode 524: electrode 524a: electrode 524b: electrode 525a: electrode 525b: electrode 525c: electrode 526: insulating layer 527: insulating layer 528: insulating layer 529: insulating layer 531a: opening 531b: opening 542: semiconductor layer 542a: semiconductor layer 542b: semiconductor layer 542c: semiconductor layer 542i: semiconductor layer 542t: semiconductor layer 542u: semiconductor layer 543: electrode 544a: electrode 544b: electrode 546: electrode 547a: opening 547b: opening 547c: opening 547d: opening 555: impurity 569: region 571: substrate 572: insulating layer 573: insulating layer 574: insulating layer 575: insulating layer 577: insulating layer 582: insulating layer 601: pulse voltage output circuit 602: current sensing circuit 603: capacitor 621: electrode 622: electrode 3501: wiring 3502: wiring 3510: wiring 3511: wiring 3515_1: block 3515_2: block 3516: block 5000: housing 5001: display portion 5002: display portion 5003: speaker 5004: LED lamp 5005: operation key 5006: connection terminal 5007: sensor 5008: microphone 5009: switch 5010: infrared port 5011: memory medium reading portion 5012: stand 5013: remote controller 5014: antenna 5015: shutter button 5016: image receiving portion 5017: charger 5018: band 5019: clasp 5020: icon 5021: icon 6500: touch panel module 6501: circuit unit 6502: signal line driver circuit 6503: sensor driver circuit 6504: detection circuit 6505: timing controller 6506: image processing circuit 6510: touch panel 6511: display portion 6512: input portion 6513: scan line driver circuit 6520: IC 6530: IC 6531: substrate 6532: counter substrate 6533: FPC 6534: PCB 6540: CPU 8000:

touch panel module 8001: top cover 8002: bottom cover 8003: FPC 8004: touch panel 8007: backlight 8008: light source 8009: frame 8010: printed circuit board 8011: battery.

The invention claimed is:

1. A display device comprising a pixel,
wherein the pixel comprises a plurality of subpixels,
wherein each of the subpixels comprises a display region,
wherein the display device comprises, between a pair of substrates, a pixel electrode, a first common electrode, a second common electrode, and a liquid crystal layer,
wherein the pixel electrode and the first common electrode are positioned between the liquid crystal layer and one of the substrates,
wherein the second common electrode is positioned between the liquid crystal layer and the other substrate,
wherein the same potential is supplied to the first common electrode and the second common electrode,
wherein the first common electrode includes a portion overlapping with the second common electrode between the display regions of two adjacent subpixels that exhibit different colors,
wherein at least one of the pixel electrode and the first common electrode includes a portion that does not overlap with the second common electrode in the display region of the subpixel,
wherein the second common electrode includes an opening in the display region of the subpixel,
wherein, when a thickness of the liquid crystal layer is denoted by d, a width of the opening is greater than or equal to d/6 and narrower than a width of the subpixel,
wherein, when a thickness of the liquid crystal layer is denoted by d, a distance between the openings of two adjacent subpixels is greater than or equal to d and less than or equal to 2.5d, and
wherein a thickness of the liquid crystal layer is greater than or equal to 1 μm and less than or equal to 3 μm.

2. The display device according to claim 1,
wherein the first common electrode is electrically connected to the second common electrode.

3. The display device according to claim 1,
wherein a liquid crystal included in the liquid crystal layer has a negative dielectric anisotropy.

4. The display device according to claim 1, further comprising a transistor,
wherein the transistor includes a semiconductor layer,
wherein the semiconductor layer includes an oxide semiconductor in a channel formation region, and
wherein the pixel electrode is electrically connected to the transistor.

5. The display device according to claim 4,
wherein the semiconductor layer includes indium, zinc, and one of aluminum, gallium, yttrium, and tin.

6. The display device according to claim 1, further comprising a scan line and a signal line,
wherein a direction in which the scan line extends intersects with a direction in which the signal line extends, and
wherein the plurality of subpixels exhibiting the same color are aligned in a direction intersecting with the direction in which the signal line extends.

7. A module comprising:
the display device according to claim 1; and
a flexible printed circuit board or an integrated circuit.

8. An electronic device comprising:
the module according to claim 7; and
an antenna, a battery, a housing, a camera, a speaker, a microphone, or a control button.

9. A display device comprising a pixel,
wherein the pixel comprises a plurality of subpixels,
wherein each of the subpixels comprises a display region,
wherein the display device comprises a pixel electrode, a first common electrode, a second common electrode, and a liquid crystal layer,
wherein each of the pixel electrode and the first common electrode faces the second common electrode with the liquid crystal layer therebetween in a thickness direction of the display device,
wherein the same potential is supplied to the first common electrode and the second common electrode,
wherein the first common electrode includes a portion overlapping with the second common electrode between the display regions of two adjacent subpixels that exhibit different colors,
wherein at least one of the pixel electrode and the first common electrode includes a portion that does not overlap with the second common electrode in the display region of the subpixel,
wherein the second common electrode includes an opening in the display region of the subpixel,
wherein, when a thickness of the liquid crystal layer is denoted by d, a width of the opening is greater than or equal to d/6 and narrower than a width of the subpixel,
wherein, when a thickness of the liquid crystal layer is denoted by d, a distance between the openings of two adjacent subpixels is greater than or equal to d and less than or equal to 2.5d, and
wherein a thickness of the liquid crystal layer is greater than or equal to 1 μm and less than or equal to 3 μm.

10. The display device according to claim 9,
wherein the first common electrode is electrically connected to the second common electrode.

11. The display device according to claim 9,
wherein a liquid crystal included in the liquid crystal layer has a negative dielectric anisotropy.

12. The display device according to claim 9, further comprising a transistor,
wherein the transistor includes a semiconductor layer,
wherein the semiconductor layer includes an oxide semiconductor in a channel formation region, and
wherein the pixel electrode is electrically connected to the transistor.

13. The display device according to claim 12,
wherein the semiconductor layer includes indium, zinc, and one of aluminum, gallium, yttrium, and tin.

14. The display device according to claim 9, further comprising a scan line and a signal line,
wherein a direction in which the scan line extends intersects with a direction in which the signal line extends, and
wherein the plurality of subpixels exhibiting the same color are aligned in a direction intersecting with the direction in which the signal line extends.

15. A module comprising:
the display device according to claim 9; and
a flexible printed circuit board or an integrated circuit.

16. An electronic device comprising:
the module according to claim 15; and
an antenna, a battery, a housing, a camera, a speaker, a microphone, or a control button.

* * * * *